US012656578B2

(12) United States Patent (10) Patent No.: US 12,656,578 B2
Lin et al. (45) Date of Patent: Jun. 16, 2026

(54) OPTICAL IMAGING LENS

(71) Applicant: Genius Electronic Optical (Xiamen) Co., Ltd., Xiamen (CN)

(72) Inventors: Maozong Lin, Xiamen (CN); Feng Chen, Xiamen (CN)

(73) Assignee: Genius Electronic Optical (Xiamen) Co., Ltd., Xiamen (CN)

( * ) Notice: Subject to any disclaimer, the term of this patent is extended or adjusted under 35 U.S.C. 154(b) by 297 days.

(21) Appl. No.: 18/241,261

(22) Filed: Sep. 1, 2023

(65) Prior Publication Data

US 2024/0255735 A1 Aug. 1, 2024

(30) Foreign Application Priority Data

Jan. 31, 2023 (CN) .......................... 202310084013.0

(51) Int. Cl.
G02B 13/00 (2006.01)
(52) U.S. Cl.
CPC ................................. G02B 13/0045 (2013.01)
(58) Field of Classification Search
CPC ........ G02B 9/62; G02B 9/64; G02B 13/0045;

G02B 13/0015; G02B 13/16; G02B 13/18; G02B 27/0025; G02B 27/0012; G02B 27/0172; G02B 15/146; H04N 5/222; H04N 5/2254
USPC ......... 359/656–658, 708, 713, 749, 756–762
See application file for complete search history.

(56) References Cited

U.S. PATENT DOCUMENTS

2013/0016278 A1 * 1/2013 Matsusaka ......... G02B 13/0045
359/713

* cited by examiner

*Primary Examiner* — Travis S Fissel
(74) *Attorney, Agent, or Firm* — Winston Hsu

(57) ABSTRACT

An optical imaging lens includes a first lens to a sixth lens and correspondingly forms a first focusing state and a second focusing state. The first lens element has positive refracting power, a periphery region of the image-side surface of a fifth lens element is concave, an optical axis region of the image-side surface of the sixth lens element is concave, a periphery region of the image-side surface of the sixth lens element is convex. Lens elements included by the optical imaging lens are only six lens elements. The rear lens group enables the optical imaging lens to form a first focusing state and a second focusing state to satisfy TTL*ΔHFOV/ΔG≤19.500 degrees.

20 Claims, 46 Drawing Sheets

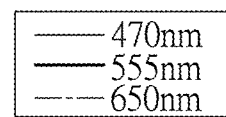
Field of view
1.0
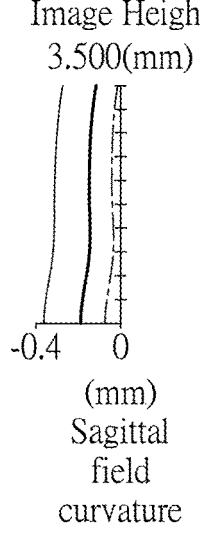
-0.4    0 0.1
(mm)
Longitudinal
spherical
aberration
FIG. 7A
Image Height
3.500(mm)
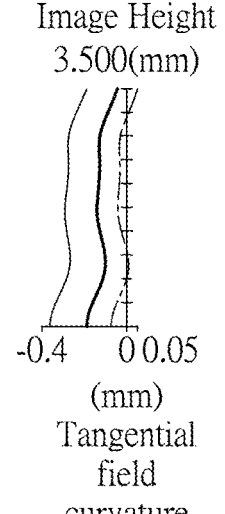
-0.4    0
(mm)
Sagittal
field
curvature
FIG. 7B
Image Height
3.500(mm)
-0.4    0 0.05
(mm)
Tangential
field
curvature
FIG. 7C
Image Height
3.500(mm)
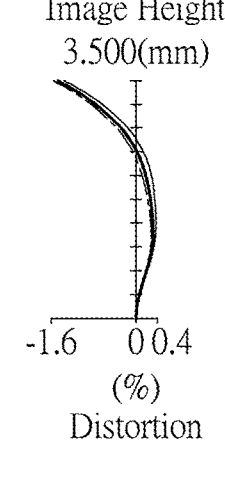
-1.6    0 0.4
(%)
Distortion
FIG. 7D
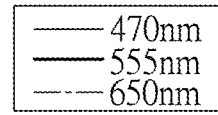
Field of view
1.0
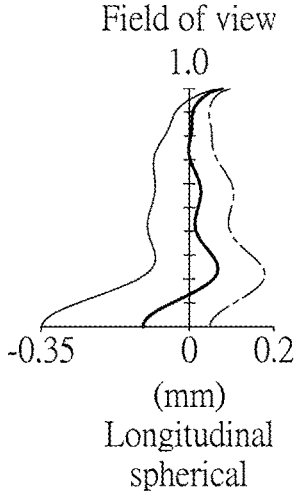
-0.35    0    0.2
(mm)
Longitudinal
spherical
aberration
FIG. 7E
Image Height
3.500(mm)
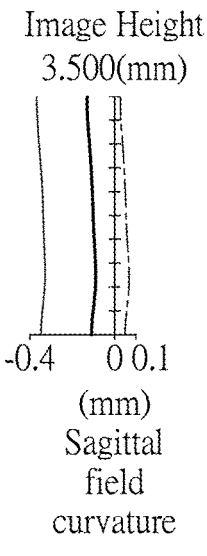
-0.4    0 0.1
(mm)
Sagittal
field
curvature
FIG. 7F
Image Height
3.500(mm)
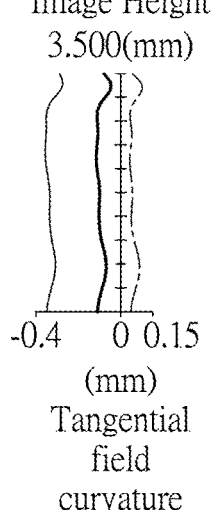
-0.4    0 0.15
(mm)
Tangential
field
curvature
FIG. 7G
Image Height
3.500(mm)
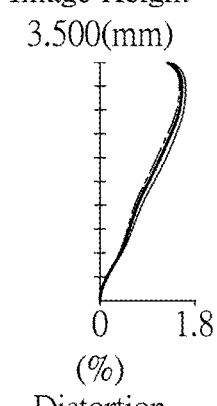
0    1.8
(%)
Distortion
FIG. 7H

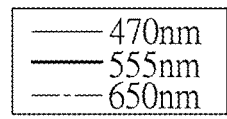
Field of view
1.0
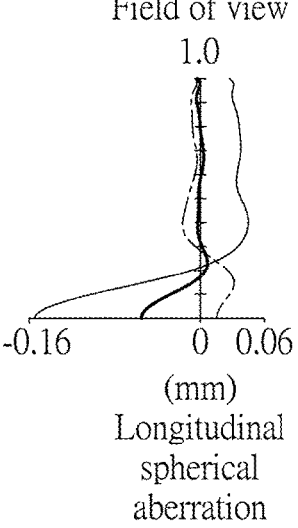
-0.16　0　0.06
(mm)
Longitudinal
spherical
aberration
FIG. 9A
Image Height
3.500(mm)
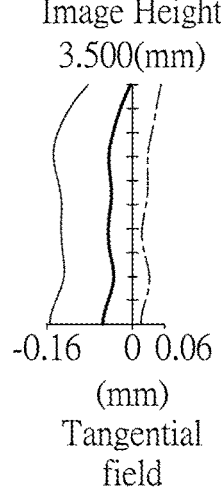
-0.16　0 0.04
(mm)
Sagittal
field
curvature
FIG. 9B
Image Height
3.500(mm)
Image Height
3.500(mm)
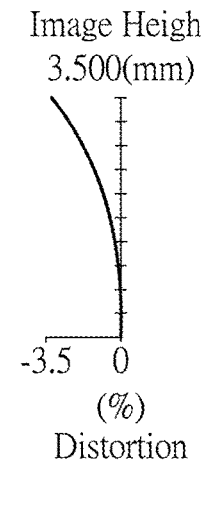
-0.16　0 0.06
(mm)
Tangential
field
curvature
FIG. 9C
-3.5　0
(%)
Distortion
FIG. 9D
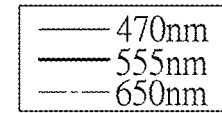
Field of view
1.0
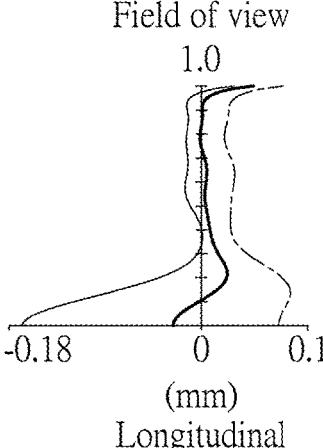
-0.18　0　0.1
(mm)
Longitudinal
spherical
aberration
FIG. 9E
Image Height
3.500(mm)
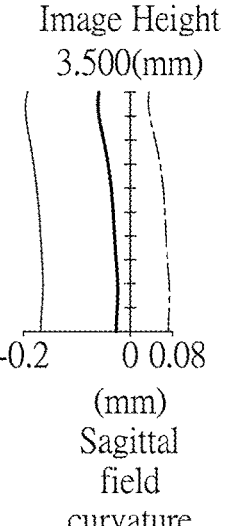
-0.2　0 0.08
(mm)
Sagittal
field
curvature
FIG. 9F
Image Height
3.500(mm)
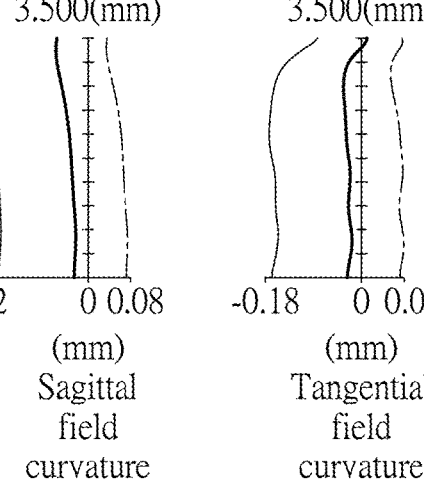
-0.18　0 0.08
(mm)
Tangential
field
curvature
FIG. 9G
Image Height
3.500(mm)
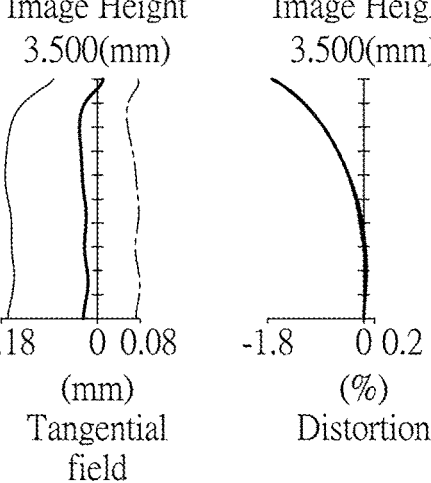
-1.8　0 0.2
(%)
Distortion
FIG. 9H

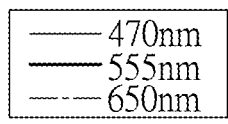
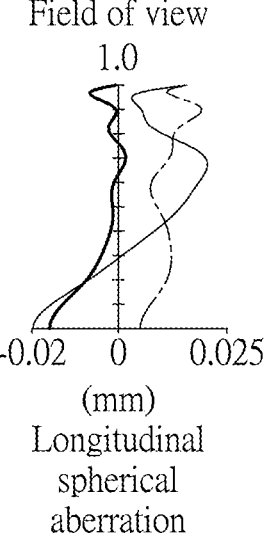
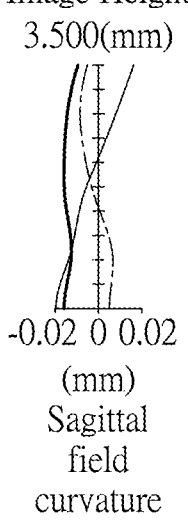
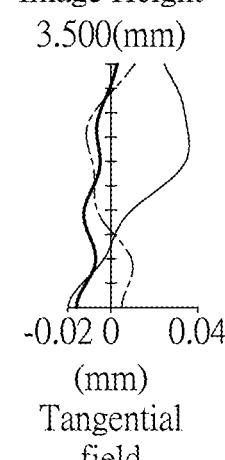
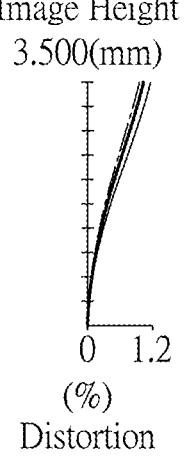
FIG. 13A   FIG. 13B   FIG. 13C   FIG. 13D
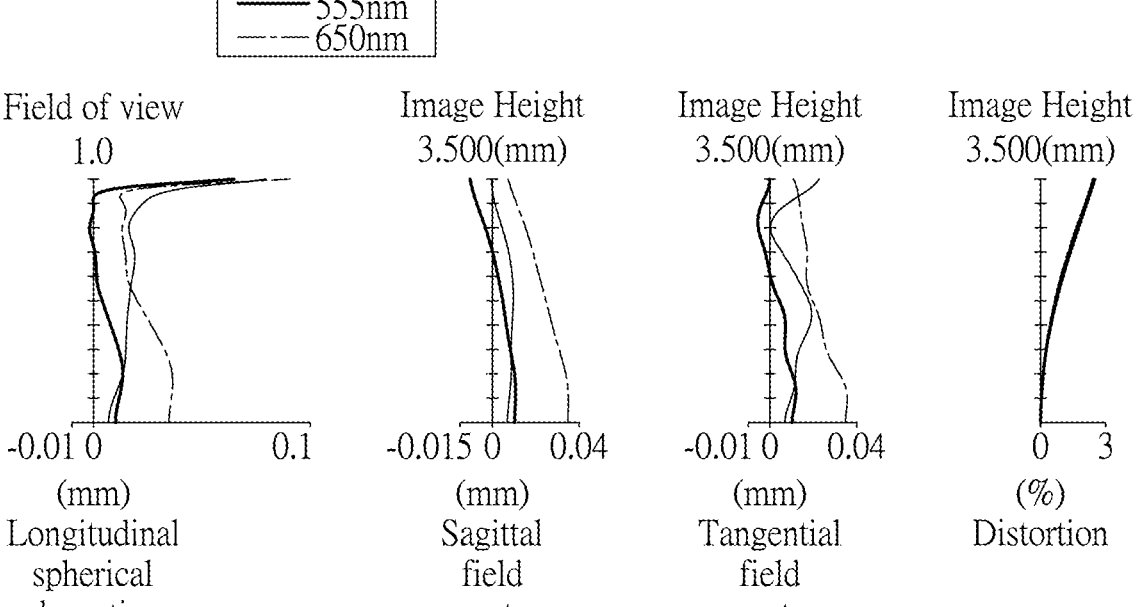
FIG. 13E   FIG. 13F   FIG. 13G   FIG. 13H

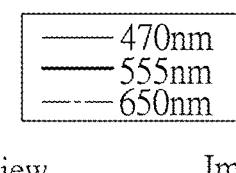
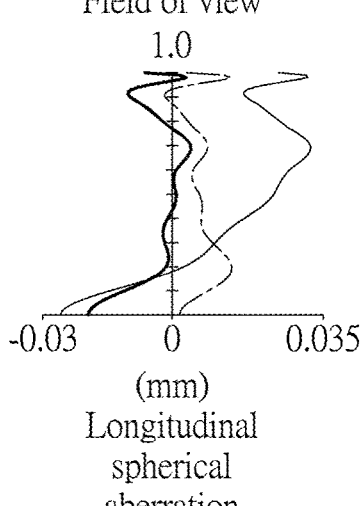
Field of view
1.0
(mm)
Longitudinal
spherical
aberration
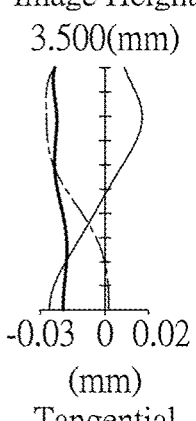
Image Height
3.500(mm)
(mm)
Sagittal
field
curvature
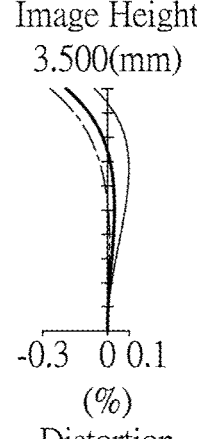
Image Height
3.500(mm)
(mm)
Tangential
field
curvature
Image Height
3.500(mm)
(%)
Distortion
FIG. 17A     FIG. 17B    FIG. 17C    FIG. 17D
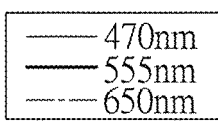
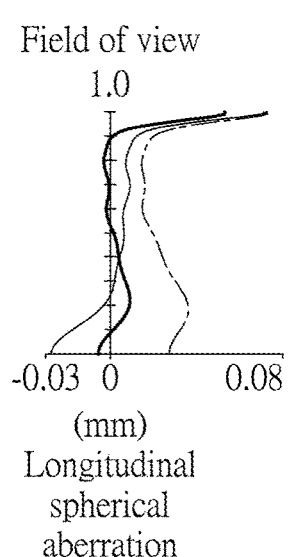
Field of view
1.0
(mm)
Longitudinal
spherical
aberration
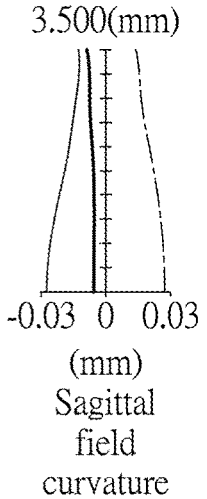
Image Height
3.500(mm)
(mm)
Sagittal
field
curvature
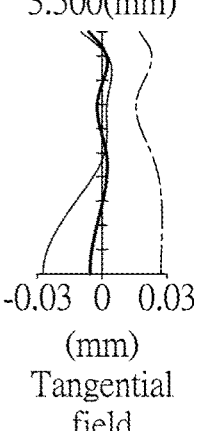
Image Height
3.500(mm)
(mm)
Tangential
field
curvature
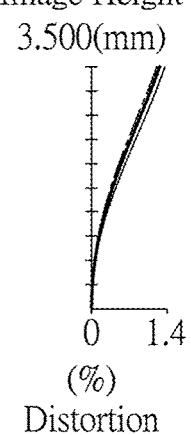
Image Height
3.500(mm)
(%)
Distortion
FIG. 17E     FIG. 17F   FIG. 17G   FIG. 17H

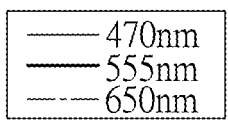
Field of view
1.0
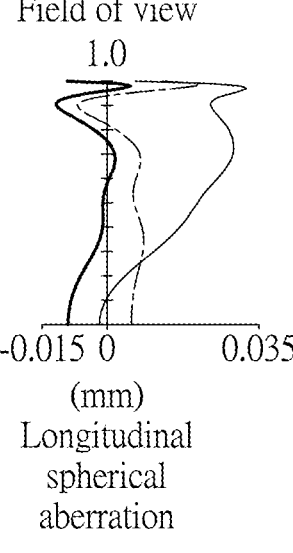
-0.015 0　　　0.035
(mm)
Longitudinal
spherical
aberration
FIG. 19A
Image Height
3.500(mm)
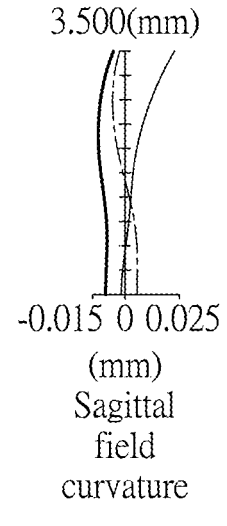
-0.015 0 0.025
(mm)
Sagittal
field
curvature
FIG. 19B
Image Height
3.500(mm)
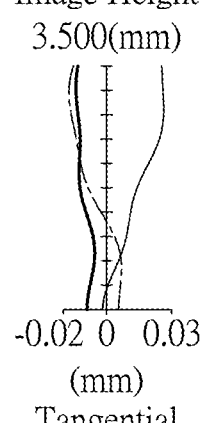
-0.02 0　0.03
(mm)
Tangential
field
curvature
FIG. 19C
Image Height
3.500(mm)
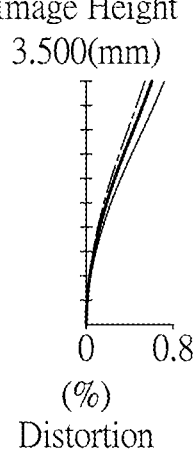
0　　0.8
(%)
Distortion
FIG. 19D
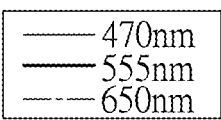
Field of view
1.0
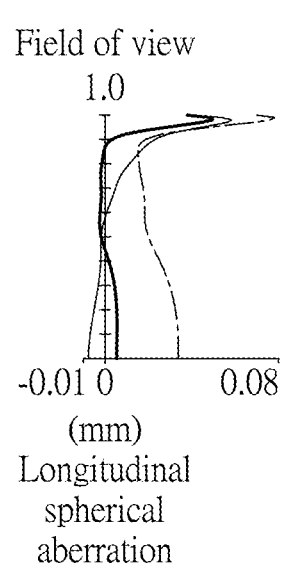
-0.01 0　　　0.08
(mm)
Longitudinal
spherical
aberration
FIG. 19E
Image Height
3.500(mm)
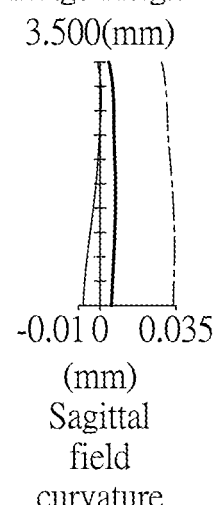
-0.01 0　0.035
(mm)
Sagittal
field
curvature
FIG. 19F
Image Height
3.500(mm)
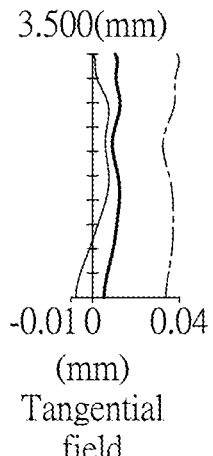
-0.01 0　　0.04
(mm)
Tangential
field
curvature
FIG. 19G
Image Height
3.500(mm)
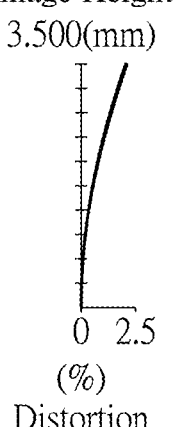
0　2.5
(%)
Distortion
FIG. 19H

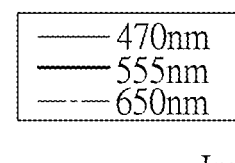
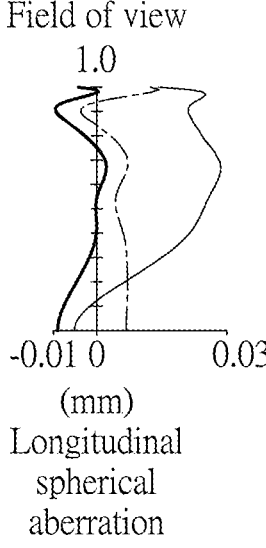
Field of view
1.0
-0.01 0      0.03
(mm)
Longitudinal
spherical
aberration
FIG. 21A
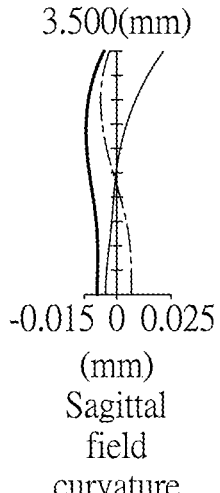
Image Height
3.500(mm)
-0.015 0 0.025
(mm)
Sagittal
field
curvature
FIG. 21B
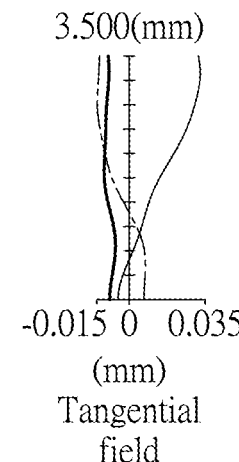
Image Height
3.500(mm)
-0.015 0  0.035
(mm)
Tangential
field
curvature
FIG. 21C
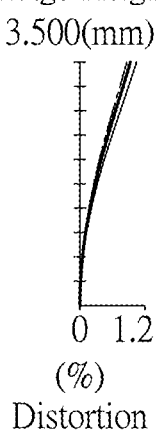
Image Height
3.500(mm)
0  1.2
(%)
Distortion
FIG. 21D
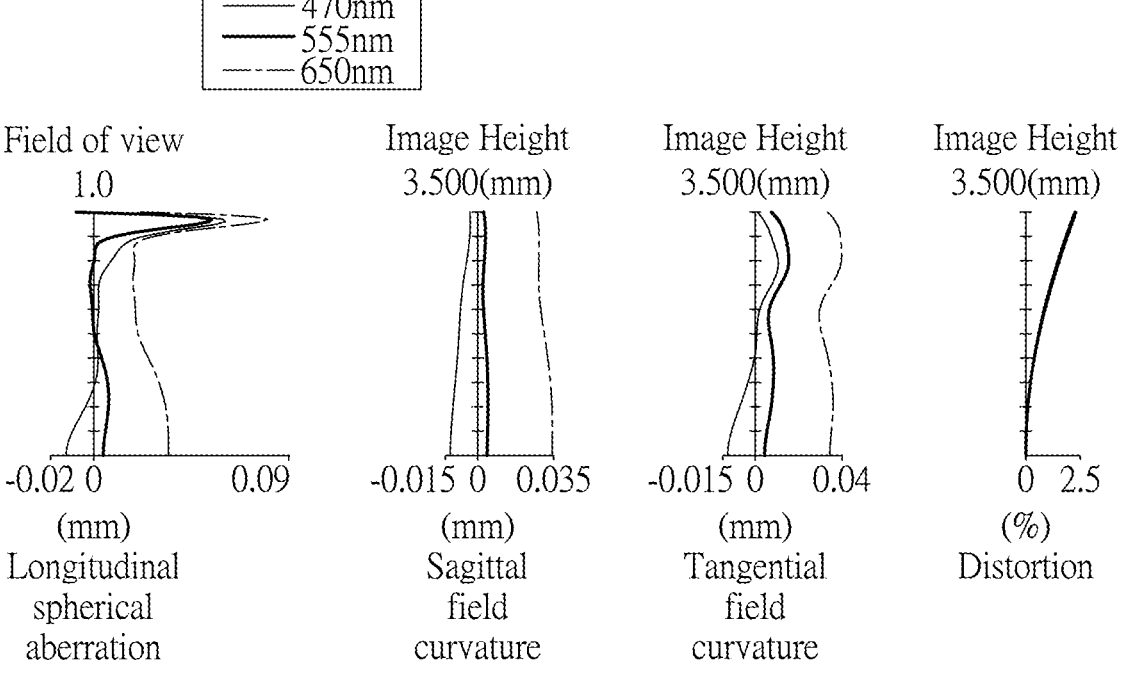
Field of view
1.0
-0.02 0       0.09
(mm)
Longitudinal
spherical
aberration
FIG. 21E
Image Height
3.500(mm)
-0.015 0   0.035
(mm)
Sagittal
field
curvature
FIG. 21F
Image Height
3.500(mm)
-0.015 0   0.04
(mm)
Tangential
field
curvature
FIG. 21G
Image Height
3.500(mm)
0  2.5
(%)
Distortion
FIG. 21H

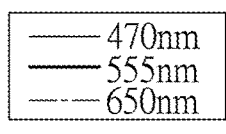
Field of view
1.0
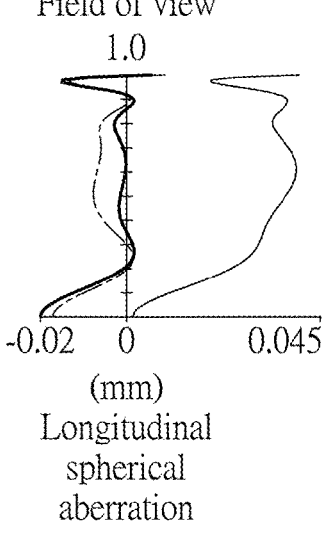
-0.02    0    0.045
(mm)
Longitudinal
spherical
aberration
FIG. 23A
Image Height
3.500(mm)
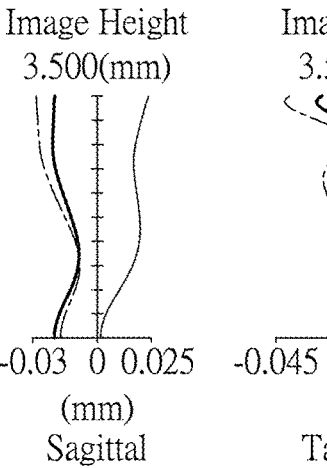
-0.03  0 0.025
(mm)
Sagittal
field
curvature
FIG. 23B
Image Height
3.500(mm)
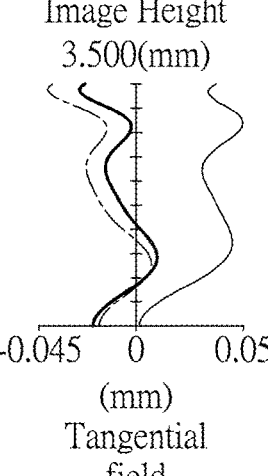
-0.045    0    0.05
(mm)
Tangential
field
curvature
FIG. 23C
Image Height
3.500(mm)
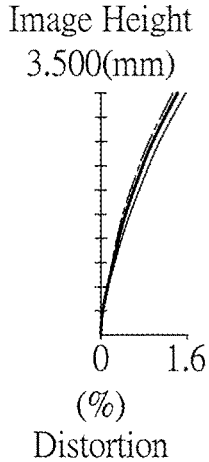
0    1.6
(%)
Distortion
FIG. 23D
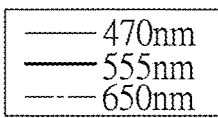
Field of view
1.0
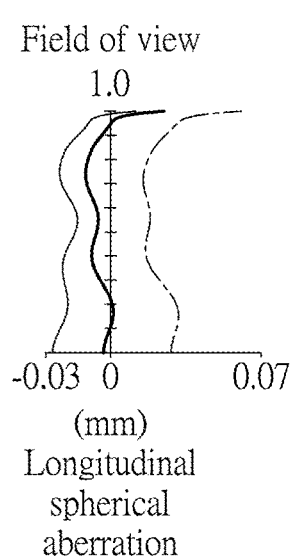
-0.03  0    0.07
(mm)
Longitudinal
spherical
aberration
FIG. 23E
Image Height
3.500(mm)
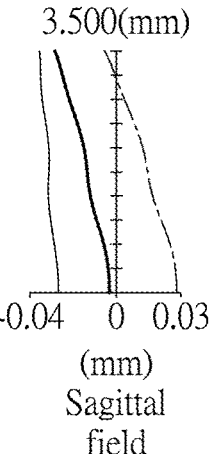
-0.04    0  0.03
(mm)
Sagittal
field
curvature
FIG. 23F
Image Height
3.500(mm)
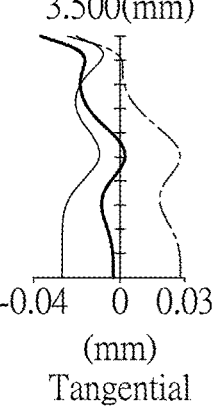
-0.04    0  0.03
(mm)
Tangential
field
curvature
FIG. 23G
Image Height
3.500(mm)
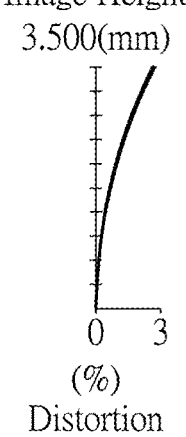
0    3
(%)
Distortion
FIG. 23H

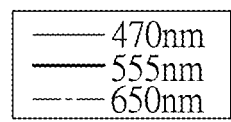
Field of view
1.0
-0.01 0     0.03
(mm)
Longitudinal
spherical
aberration
FIG. 25A
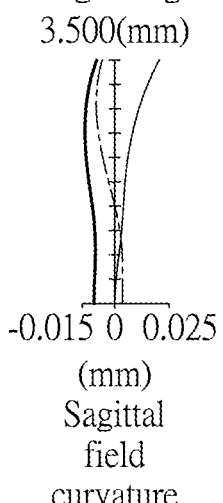
Image Height
3.500(mm)
-0.015 0 0.025
(mm)
Sagittal
field
curvature
FIG. 25B
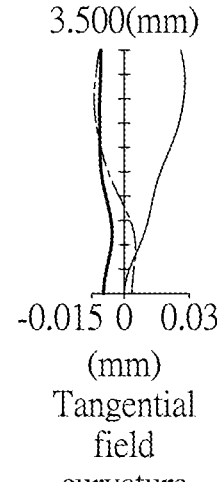
Image Height
3.500(mm)
-0.015 0   0.03
(mm)
Tangential
field
curvature
FIG. 25C
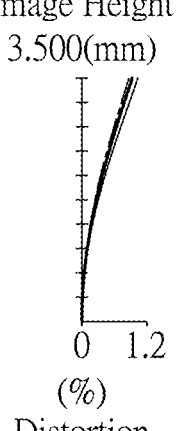
Image Height
3.500(mm)
0   1.2
(%)
Distortion
FIG. 25D
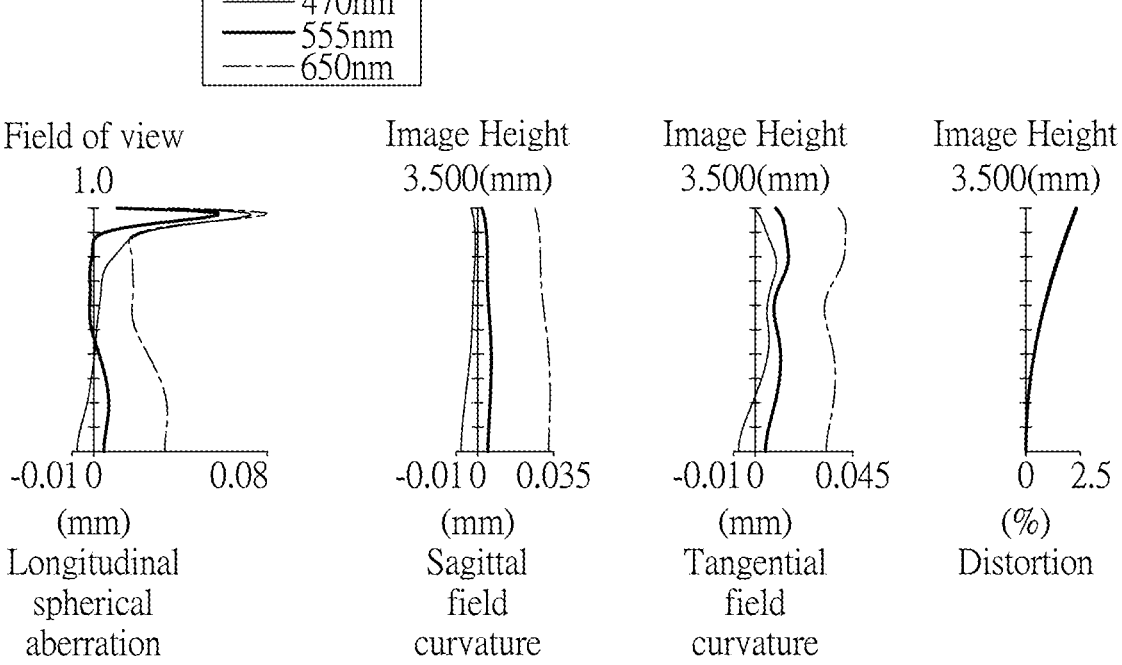
Field of view
1.0
-0.01 0     0.08
(mm)
Longitudinal
spherical
aberration
FIG. 25E
Image Height
3.500(mm)
-0.01 0   0.035
(mm)
Sagittal
field
curvature
FIG. 25F
Image Height
3.500(mm)
-0.01 0   0.045
(mm)
Tangential
field
curvature
FIG. 25G
Image Height
3.500(mm)
0   2.5
(%)
Distortion
FIG. 25H

| No. | | Radius of Curvature (mm) | Aperture Stop Distance/ Thickness/ Air Gap at first focusing state (mm) | | Aperture Stop Distance/ Thickness/ Air Gap at second focusing state (mm) | | Refractive Index | Abbe No. | Focal Length (mm) |
|---|---|---|---|---|---|---|---|---|---|
| | | | | | | | | | First Embodiment |
| | | | EFL=9.261mm, EFLA=7.342mm, Fno at first focusing state=3.070, Fno at second focusing state=2.434, HFOV at first focusing state=20.527degrees, HFOV at second focusing state=19.538degrees, TTL=10.553mm, ImgH=3.500mm | | | | | | |
| | Object | Infinity | Infinity | | 48.697 | | | | |
| 2 | Ape. Stop | Infinity | -0.148 | | -0.148 | | | | |
| 11 | First Lens element | 6.134 | 0.487 | T1 | 0.487 | T1 | 1.640 | 23.503 | 189.212 |
| 12 | | 6.258 | 0.050 | G12 | 0.050 | G12 | | | |
| 21 | Second Lens element | 3.578 | 0.644 | T2 | 0.644 | T2 | 1.545 | 55.987 | 18.161 |
| 22 | | 5.243 | 0.437 | G23 | 0.437 | G23 | | | |
| 31 | Third Lens element | 73.769 | 1.191 | T3 | 1.191 | T3 | 1.640 | 23.503 | 8.095 |
| 32 | | -5.574 | 0.795 | G34 | 2.436 | G34 | | | |
| 41 | Fourth Lens element | -5.795 | 0.322 | T4 | 0.322 | T4 | 1.640 | 23.503 | -10.115 |
| 42 | | -53.665 | 0.162 | G45 | 0.162 | G45 | | | |
| 51 | Fifth Lens element | -12.514 | 0.355 | T5 | 0.355 | T5 | 1.545 | 55.987 | -27.282 |
| 52 | | -79.181 | 0.812 | G56 | 0.812 | G56 | | | |
| 61 | Sixth Lens element | 2.457 | 1.268 | T6 | 1.268 | T6 | 1.545 | 55.987 | 21.506 |
| 62 | | 2.541 | 4.029 | G6F | 2.389 | G6F | | | |
| 3 | Filter | Infinity | 0.210 | | 0.210 | | 1.517 | 64.167 | |
| | | Infinity | 0.050 | | 0.050 | | | | |
| 4 | Image Plane | Infinity | | | | | | | |

FIG. 26

| No. | K | $a_4$ | $a_6$ | $a_8$ | $a_{10}$ |
|---|---|---|---|---|---|
| 11 | -1.358462E+00 | 1.520605E-02 | 7.148145E-03 | -7.458511E-02 | 1.197481E-01 |
| 12 | 1.211357E+01 | 3.119944E-01 | -6.735713E-01 | 7.678445E-01 | -5.296580E-01 |
| 21 | 1.133780E+00 | 3.383262E-01 | -7.510602E-01 | 8.506841E-01 | -5.784272E-01 |
| 22 | -1.169854E-01 | 2.561882E-03 | -7.463122E-02 | 5.775917E-02 | -2.147259E-02 |
| 31 | 0.000000E+00 | -8.099598E-03 | -2.055127E-02 | 7.795540E-03 | 8.498804E-03 |
| 32 | -9.264898E-01 | 1.523974E-03 | -2.478030E-03 | 2.079686E-03 | 3.444534E-04 |
| 41 | 5.467993E+00 | 4.319056E-03 | 2.490255E-02 | -4.127431E-02 | 3.649578E-02 |
| 42 | 0.000000E+00 | 1.824995E-02 | -1.158446E-02 | 2.028430E-02 | -4.252245E-02 |
| 51 | 0.000000E+00 | 2.395825E-02 | -2.605158E-02 | 5.348957E-02 | -7.002126E-02 |
| 52 | 0.000000E+00 | -3.572635E-02 | 1.807686E-02 | 1.190767E-02 | -2.237754E-02 |
| 61 | -8.489512E+00 | 2.553824E-04 | -1.236250E-02 | 4.473708E-03 | 7.013387E-04 |
| 62 | -5.872735E+00 | -3.420339E-03 | -6.529231E-03 | 3.353638E-03 | -1.024059E-03 |
| No. | $a_{12}$ | $a_{14}$ | $a_{16}$ | $a_{18}$ | $a_{20}$ |
| 11 | -9.929585E-02 | 4.773376E-02 | -1.338369E-02 | 2.030693E-03 | -1.287204E-04 |
| 12 | 2.332130E-01 | -7.040814E-02 | 1.580505E-02 | -2.558214E-03 | 2.117590E-04 |
| 21 | 2.470703E-01 | -6.676681E-02 | 1.107221E-02 | -1.027330E-03 | 4.079928E-05 |
| 22 | 7.198706E-03 | -3.979709E-03 | 1.588095E-03 | -3.033348E-04 | 2.159824E-05 |
| 31 | -8.921444E-03 | 3.972456E-03 | -1.092610E-03 | 1.870033E-04 | -1.482381E-05 |
| 32 | -3.194565E-04 | 2.423679E-05 | 9.882423E-06 | -1.877113E-06 | 9.388696E-08 |
| 41 | -1.842646E-02 | 5.684002E-03 | -1.080057E-03 | 1.177546E-04 | -5.675766E-06 |
| 42 | 4.525282E-02 | -2.572259E-02 | 8.167975E-03 | -1.374374E-03 | 9.569688E-05 |
| 51 | 5.635664E-02 | -2.721896E-02 | 7.652079E-03 | -1.153106E-03 | 7.200888E-05 |
| 52 | 1.727400E-02 | -7.659143E-03 | 1.939610E-03 | -2.592346E-04 | 1.417433E-05 |
| 61 | -1.308258E-03 | 5.524455E-04 | -1.185016E-04 | 1.312863E-05 | -5.969691E-07 |
| 62 | 2.037212E-04 | -2.623429E-05 | 2.050086E-06 | -8.580336E-08 | 1.398476E-09 |

FIG. 27

| No. | | Radius of Curvature (mm) | Aperture Stop Distance/ Thickness/ Air Gap at first focusing state (mm) | | Aperture Stop Distance/ Thickness/ Air Gap at second focusing state (mm) | | Refractive Index | Abbe No. | Focal Length (mm) |
|---|---|---|---|---|---|---|---|---|---|
| | | | | | | | | | |
| | Object | Infinity | Infinity | | 48.697 | | | | |
| 2 | Ape. Stop | Infinity | -0.030 | | -0.030 | | | | |
| 11 | First Lens element | 6.031 | 0.505 | T1 | 0.505 | T1 | 1.640 | 23.503 | 102.483 |
| 12 | | 6.420 | 0.050 | G12 | 0.050 | G12 | | | |
| 21 | Second Lens element | 3.167 | 0.500 | T2 | 0.500 | T2 | 1.545 | 55.987 | -12.819 |
| 22 | | 2.059 | 0.359 | G23 | 0.359 | G23 | | | |
| 31 | Third Lens element | 4.834 | 2.344 | T3 | 2.344 | T3 | 1.545 | 55.987 | 4.476 |
| 32 | | -4.093 | 0.889 | G34 | 2.566 | G34 | | | |
| 41 | Fourth Lens element | -7.172 | 0.552 | T4 | 0.552 | T4 | 1.640 | 23.503 | -22.592 |
| 42 | | -14.569 | 0.218 | G45 | 0.218 | G45 | | | |
| 51 | Fifth Lens element | -9.013 | 0.496 | T5 | 0.496 | T5 | 1.545 | 55.987 | -11.453 |
| 52 | | 20.791 | 0.458 | G56 | 0.458 | G56 | | | |
| 61 | Sixth Lens element | 2.833 | 1.486 | T6 | 1.486 | T6 | 1.545 | 55.987 | 25.713 |
| 62 | | 2.892 | 4.311 | G6F | 2.633 | G6F | | | |
| 3 | Filter | Infinity | 0.210 | | 0.210 | | 1.517 | 64.167 | |
| | | Infinity | 0.050 | | 0.050 | | | | |
| 4 | Image Plane | Infinity | | | | | | | |

Second Embodiment

EFL=10.022mm, EFLA=7.679mm, Fno at first focusing state=3.070, Fno at second focusing state=2.352, HFOV at first focusing state=19.734degrees, HFOV at second focusing state=19.582degrees, TTL=11.872mm, ImgH=3.500mm

FIG. 28

| No. | K | $a_4$ | $a_6$ | $a_8$ | $a_{10}$ |
|---|---|---|---|---|---|
| 11 | -2.187507E+00 | 1.096862E-02 | 8.399985E-04 | -4.506892E-02 | 7.179436E-02 |
| 12 | 1.223082E+01 | 2.747870E-01 | -5.528023E-01 | 5.761494E-01 | -3.419775E-01 |
| 21 | 1.031215E+00 | 3.032175E-01 | -6.476956E-01 | 7.061056E-01 | -4.646266E-01 |
| 22 | -1.897648E-01 | -1.201177E-02 | -2.744425E-02 | -3.180533E-02 | 8.921411E-02 |
| 31 | 0.000000E+00 | -5.709139E-03 | -8.250611E-03 | 3.193669E-03 | -1.926706E-03 |
| 32 | 2.917750E-01 | 8.524124E-04 | -5.723467E-04 | 4.303155E-04 | -2.124315E-04 |
| 41 | 5.509348E+00 | 1.617628E-02 | -9.676837E-03 | 1.069983E-02 | -7.412779E-03 |
| 42 | 0.000000E+00 | 2.114958E-02 | -2.731672E-02 | 1.840837E-02 | -4.208616E-03 |
| 51 | 0.000000E+00 | 2.290553E-02 | -1.628898E-02 | -2.136491E-03 | 1.755362E-02 |
| 52 | 8.911104E+01 | -3.981886E-02 | 4.090781E-02 | -3.353271E-02 | 2.431618E-02 |
| 61 | -1.205040E+01 | -8.125200E-03 | -5.736434E-03 | 4.665102E-03 | -1.748658E-03 |
| 62 | -7.741455E+00 | -1.816874E-03 | -5.270633E-03 | 2.715964E-03 | -8.124930E-04 |
| No. | $a_{12}$ | $a_{14}$ | $a_{16}$ | $a_{18}$ | $a_{20}$ |
| 11 | -5.735169E-02 | 2.659847E-02 | -7.238879E-03 | 1.072242E-03 | -6.663398E-05 |
| 12 | 1.054099E-01 | -7.187216E-03 | -5.565442E-03 | 1.700883E-03 | -1.562832E-04 |
| 21 | 1.932442E-01 | -5.112062E-02 | 8.332240E-03 | -7.619289E-04 | 2.987291E-05 |
| 22 | -7.753364E-02 | 3.497846E-02 | -8.832776E-03 | 1.189015E-03 | -6.681973E-05 |
| 31 | 4.843641E-03 | -4.482650E-03 | 1.846043E-03 | -3.554375E-04 | 2.615801E-05 |
| 32 | 6.458079E-05 | -1.095421E-05 | 1.009920E-06 | -4.740741E-08 | 8.856660E-10 |
| 41 | 3.708278E-03 | -1.345983E-03 | 3.383168E-04 | -5.148171E-05 | 3.465833E-06 |
| 42 | -1.106371E-03 | 9.558375E-04 | -2.516537E-04 | 3.176164E-05 | -1.695448E-06 |
| 51 | -1.480722E-02 | 6.184228E-03 | -1.460629E-03 | 1.881071E-04 | -1.034371E-05 |
| 52 | -1.221104E-02 | 3.889453E-03 | -7.591542E-04 | 8.318417E-05 | -3.928424E-06 |
| 61 | 4.394282E-04 | -8.843428E-05 | 1.404706E-05 | -1.465531E-06 | 6.730361E-08 |
| 62 | 1.574189E-04 | -1.995809E-05 | 1.582864E-06 | -7.146069E-08 | 1.418287E-09 |

FIG. 29

| No. | | Radius of Curvature (mm) | Aperture Stop Distance/ Thickness/ Air Gap at first focusing state (mm) | | Aperture Stop Distance/ Thickness/ Air Gap at second focusing state (mm) | | Refractive Index | Abbe No. | Focal Length (mm) |
|---|---|---|---|---|---|---|---|---|---|
| | | | Third Embodiment | | | | | | |
| | | EFL=13.827mm, EFLA=9.266mm, Fno at first focusing state=3.070, Fno at second focusing state=2.143, HFOV at first focusing state=14.132degrees, HFOV at second focusing state=13.823degrees, TTL=14.668mm, ImgH=3.500mm | | | | | | | |
| | Object | Infinity | Infinity | | 48.697 | | | | |
| 2 | Ape. Stop | Infinity | -0.488 | | -0.488 | | | | |
| 11 | First Lens element | 4.741 | 1.896 | T1 | 1.896 | T1 | 1.545 | 55.987 | 12.000 |
| 12 | | 14.741 | 0.082 | G12 | 0.082 | G12 | | | |
| 21 | Second Lens element | 6.030 | 0.581 | T2 | 0.581 | T2 | 1.640 | 23.503 | -8.726 |
| 22 | | 2.799 | 0.514 | G23 | 0.514 | G23 | | | |
| 31 | Third Lens element | 13.901 | 2.044 | T3 | 2.044 | T3 | 1.545 | 55.987 | 6.210 |
| 32 | | -4.250 | 0.781 | G34 | 3.504 | G34 | | | |
| 41 | Fourth Lens element | -9.281 | 0.530 | T4 | 0.530 | T4 | 1.573 | 37.666 | 9.601 |
| 42 | | -3.512 | 0.290 | G45 | 0.290 | G45 | | | |
| 51 | Fifth Lens element | -3.054 | 0.528 | T5 | 0.528 | T5 | 1.545 | 55.987 | -4.847 |
| 52 | | 20.978 | 0.530 | G56 | 0.530 | G56 | | | |
| 61 | Sixth Lens element | 6.088 | 1.583 | T6 | 1.583 | T6 | 1.545 | 55.987 | 636.419 |
| 62 | | 5.628 | 5.310 | G6F | 2.586 | G6F | | | |
| 3 | Filter | Infinity | 0.210 | | 0.210 | | 1.517 | 64.167 | |
| | | Infinity | 0.251 | | 0.251 | | | | |
| 4 | Image Plane | Infinity | | | | | | | |

FIG. 30

| No. | K | $a_4$ | $a_6$ | $a_8$ | $a_{10}$ |
|---|---|---|---|---|---|
| 11 | 3.591774E-01 | -3.884986E-04 | 3.186441E-04 | -2.871739E-04 | 1.081311E-04 |
| 12 | 8.656821E+00 | -5.160191E-03 | 2.300709E-02 | -2.869306E-02 | 1.878416E-02 |
| 21 | -2.607656E+00 | -2.235481E-02 | 2.855862E-02 | -3.440761E-02 | 2.348642E-02 |
| 22 | 3.352969E-01 | -2.770762E-02 | 1.210234E-02 | -1.470772E-02 | 1.084432E-02 |
| 31 | -5.362926E+01 | -1.796159E-03 | 2.737770E-04 | -1.034908E-03 | 1.095925E-04 |
| 32 | 9.613178E-01 | -4.837245E-05 | -4.442797E-04 | 4.440428E-04 | -4.158124E-04 |
| 41 | 2.356832E+00 | 1.577564E-02 | 1.063069E-03 | -6.321369E-04 | -4.727476E-04 |
| 42 | -9.246199E+00 | 9.731359E-03 | 6.680621E-03 | -8.273157E-03 | 3.817898E-03 |
| 51 | -6.246766E+00 | -1.257411E-03 | 1.403240E-02 | -2.100111E-02 | 1.320489E-02 |
| 52 | 9.631549E+01 | -3.537182E-02 | 2.676332E-02 | -2.156675E-02 | 1.251314E-02 |
| 61 | -5.543955E+01 | -1.380529E-02 | -5.950702E-03 | 5.265224E-03 | -2.967825E-03 |
| 62 | -2.865260E+01 | 2.753525E-03 | -5.654011E-03 | 2.595796E-03 | -8.402684E-04 |
| No. | $a_{12}$ | $a_{14}$ | $a_{16}$ | $a_{18}$ | $a_{20}$ |
| 11 | -1.719670E-05 | -1.161103E-06 | 8.436683E-07 | -1.143568E-07 | 5.171007E-09 |
| 12 | -6.858485E-03 | 1.318124E-03 | -9.212215E-05 | -6.870313E-06 | 1.041189E-06 |
| 21 | -9.139309E-03 | 1.960133E-03 | -1.911664E-04 | 1.448616E-07 | 9.277835E-07 |
| 22 | -4.429417E-03 | 8.870757E-04 | -3.587317E-05 | -1.440334E-05 | 1.652907E-06 |
| 31 | 4.634533E-04 | -3.287652E-04 | 9.370231E-05 | -1.147865E-05 | 4.242387E-07 |
| 32 | 2.413262E-04 | -8.739290E-05 | 1.884206E-05 | -2.206288E-06 | 1.070925E-07 |
| 41 | 1.942486E-04 | 1.407774E-04 | -9.863678E-05 | 2.144655E-05 | -1.602583E-06 |
| 42 | -1.564925E-03 | 8.677182E-04 | -3.211104E-04 | 5.714276E-05 | -3.738361E-06 |
| 51 | -4.558260E-03 | 1.135358E-03 | -2.499810E-04 | 3.913871E-05 | -2.646573E-06 |
| 52 | -4.560807E-03 | 1.113933E-03 | -1.938819E-04 | 2.234278E-05 | -1.236167E-06 |
| 61 | 1.238978E-03 | -3.259350E-04 | 4.772418E-05 | -3.322303E-06 | 6.393066E-08 |
| 62 | 1.978867E-04 | -3.239226E-05 | 3.401237E-06 | -2.036572E-07 | 5.263310E-09 |

FIG. 31

| No. | | Radius of Curvature (mm) | Aperture Stop Distance/ Thickness/ Air Gap at first focusing state (mm) | | Aperture Stop Distance/ Thickness/ Air Gap at second focusing state (mm) | | Refractive Index | Abbe No. | Focal Length (mm) |
|---|---|---|---|---|---|---|---|---|---|
| | Object | Infinity | Infinity | | 48.697 | | | | |
| 2 | Ape. Stop | Infinity | -0.601 | | -0.601 | | | | |
| 11 | First Lens element | 4.980 | 2.532 | T1 | 2.532 | T1 | 1.545 | 55.987 | 11.046 |
| 12 | | 23.495 | 0.228 | G12 | 0.228 | G12 | | | |
| 21 | Second Lens element | 6.659 | 0.605 | T2 | 0.605 | T2 | 1.640 | 23.503 | -8.026 |
| 22 | | 2.807 | 0.458 | G23 | 0.458 | G23 | | | |
| 31 | Third Lens element | 13.191 | 2.060 | T3 | 2.060 | T3 | 1.545 | 55.987 | 6.186 |
| 32 | | -4.287 | 0.643 | G34 | 3.412 | G34 | | | |
| 41 | Fourth Lens element | -9.726 | 0.632 | T4 | 0.632 | T4 | 1.640 | 23.503 | 16.707 |
| 42 | | -5.238 | 0.342 | G45 | 0.342 | G45 | | | |
| 51 | Fifth Lens element | -4.157 | 0.540 | T5 | 0.540 | T5 | 1.545 | 55.987 | -6.306 |
| 52 | | 20.917 | 0.446 | G56 | 0.446 | G56 | | | |
| 61 | Sixth Lens element | 5.195 | 1.020 | T6 | 1.020 | T6 | 1.545 | 55.987 | -226.384 |
| 62 | | 4.640 | 5.384 | G6F | 2.615 | G6F | | | |
| 3 | Filter | Infinity | 0.210 | | 0.210 | | 1.517 | 64.167 | |
| | | Infinity | 0.512 | | 0.512 | | | | |
| 4 | Image Plane | Infinity | | | | | | | |

Table header:

Fourth Embodiment

EFL=14.683mm, EFLA=9.563mm, Fno at first focusing state=3.070,
Fno at second focusing state=2.025, HFOV at first focusing state=13.255degrees,
HFOV at second focusing state=12.829degrees, TTL=14.890mm, ImgH=3.500mm

FIG. 32

| No. | K | $a_4$ | $a_6$ | $a_8$ | $a_{10}$ |
|---|---|---|---|---|---|
| 11 | 4.550050E-01 | -2.742298E-04 | 9.848230E-05 | -8.460464E-05 | 3.208985E-05 |
| 12 | 2.361164E+01 | 1.109435E-03 | 2.102375E-03 | -1.466722E-03 | -6.289368E-04 |
| 21 | -3.267432E+00 | -1.589103E-02 | 6.363998E-03 | -5.166507E-03 | 1.524121E-03 |
| 22 | 3.419425E-01 | -2.507103E-02 | 6.162919E-03 | -5.635375E-03 | 1.594331E-03 |
| 31 | -3.713044E+01 | -1.085535E-03 | -2.419273E-04 | 6.140577E-04 | -2.382052E-03 |
| 32 | 1.002963E+00 | -1.356051E-04 | -4.510194E-04 | 3.833974E-04 | -3.177176E-04 |
| 41 | 1.520833E+00 | 1.725149E-02 | -1.784711E-03 | 1.707122E-03 | -1.647954E-03 |
| 42 | -1.194480E+01 | 1.201810E-02 | 9.263041E-04 | -2.032179E-03 | 7.885269E-04 |
| 51 | -5.024904E+00 | -4.384882E-03 | 1.170119E-02 | -1.516503E-02 | 9.688714E-03 |
| 52 | 9.571025E+01 | -3.332819E-02 | 2.621734E-02 | -2.200645E-02 | 1.387828E-02 |
| 61 | -4.282369E+01 | -1.069353E-02 | -8.753658E-03 | 5.317399E-03 | -1.867569E-03 |
| 62 | -2.486545E+01 | 4.145379E-03 | -1.056650E-02 | 5.490358E-03 | -1.936592E-03 |
| No. | $a_{12}$ | $a_{14}$ | $a_{16}$ | $a_{18}$ | $a_{20}$ |
| 11 | -6.274614E-06 | 5.055159E-07 | 2.134030E-08 | -6.357830E-09 | 2.923530E-10 |
| 12 | 1.389661E-03 | -7.859638E-04 | 2.185067E-04 | -3.074562E-05 | 1.750516E-06 |
| 21 | 9.584217E-04 | -9.112066E-04 | 3.022738E-04 | -4.725804E-05 | 2.912933E-06 |
| 22 | 1.499977E-03 | -1.464372E-03 | 5.306159E-04 | -9.104226E-05 | 6.133251E-06 |
| 31 | 2.388883E-03 | -1.185436E-03 | 3.194559E-04 | -4.418651E-05 | 2.416369E-06 |
| 32 | 1.599322E-04 | -5.082615E-05 | 9.715555E-06 | -1.010945E-06 | 4.272102E-08 |
| 41 | 8.834903E-04 | -2.546470E-04 | 3.885742E-05 | -2.691884E-06 | 4.623272E-08 |
| 42 | -3.459583E-04 | 2.373070E-04 | -7.650219E-05 | 9.132429E-06 | -1.688800E-07 |
| 51 | -3.937190E-03 | 1.265378E-03 | -3.013547E-04 | 4.116309E-05 | -2.206341E-06 |
| 52 | -5.997349E-03 | 1.857455E-03 | -3.933727E-04 | 4.900241E-05 | -2.641846E-06 |
| 61 | 3.951526E-04 | 1.606906E-06 | -2.290138E-05 | 4.665072E-06 | -3.102920E-07 |
| 62 | 4.819509E-04 | -8.149008E-05 | 8.713058E-06 | -5.274420E-07 | 1.373329E-08 |

FIG. 33

| No. | | Radius of Curvature (mm) | Aperture Stop Distance/ Thickness/ Air Gap at first focusing state (mm) | | Aperture Stop Distance/ Thickness/ Air Gap at second focusing state (mm) | | Refractive Index | Abbe No. | Focal Length (mm) |
|---|---|---|---|---|---|---|---|---|---|
| | | | | | | Fifth Embodiment | | | |
| | | | EFL=13.936mm, EFLA=9.071mm, Fno at first focusing state=3.070, Fno at second focusing state=2.053, HFOV at first focusing state=13.965degrees, HFOV at second focusing state=13.688degrees, TTL=14.511mm, ImgH=3.500mm | | | | | | |
| | Object | Infinity | Infinity | | 48.697 | | | | |
| 2 | Ape. Stop | Infinity | -0.369 | | -0.369 | | | | |
| 11 | First Lens element | 4.795 | 2.647 | T1 | 2.647 | T1 | 1.545 | 55.987 | 11.359 |
| 12 | | 17.044 | 0.095 | G12 | 0.095 | G12 | | | |
| 21 | Second Lens element | 6.337 | 0.423 | T2 | 0.423 | T2 | 1.640 | 23.503 | -8.241 |
| 22 | | 2.813 | 0.492 | G23 | 0.492 | G23 | | | |
| 31 | Third Lens element | 13.454 | 1.642 | T3 | 1.642 | T3 | 1.545 | 55.987 | 6.172 |
| 32 | | -4.300 | 0.858 | G34 | 3.821 | G34 | | | |
| 41 | Fourth Lens element | -9.197 | 0.670 | T4 | 0.670 | T4 | 1.640 | 23.503 | 18.444 |
| 42 | | -5.332 | 0.351 | G45 | 0.351 | G45 | | | |
| 51 | Fifth Lens element | -4.330 | 0.414 | T5 | 0.414 | T5 | 1.545 | 55.987 | -6.594 |
| 52 | | 22.027 | 0.365 | G56 | 0.365 | G56 | | | |
| 61 | Sixth Lens element | 5.217 | 1.242 | T6 | 1.242 | T6 | 1.545 | 55.987 | -894.989 |
| 62 | | 4.728 | 5.312 | G6F | 2.349 | G6F | | | |
| 3 | Filter | Infinity | 0.210 | | 0.210 | | 1.517 | 64.167 | |
| | | Infinity | 0.144 | | 0.144 | | | | |
| 4 | Image Plane | Infinity | | | | | | | |

FIG. 34

| No. | K | $a_4$ | $a_6$ | $a_8$ | $a_{10}$ |
|---|---|---|---|---|---|
| 11 | 2.878338E-01 | -5.043320E-04 | -1.326378E-04 | 1.864252E-04 | -1.750831E-04 |
| 12 | 1.746630E+01 | -6.027296E-03 | 3.508936E-02 | -5.286364E-02 | 4.289640E-02 |
| 21 | -3.406983E+00 | -2.829265E-02 | 4.877592E-02 | -6.982112E-02 | 5.648142E-02 |
| 22 | 3.455654E-01 | -3.161539E-02 | 2.621055E-02 | -3.797976E-02 | 3.186500E-02 |
| 31 | -3.578355E+01 | -9.072309E-04 | 2.930569E-03 | -5.063809E-03 | 3.310388E-03 |
| 32 | 1.172919E+00 | -2.468221E-04 | -4.094817E-04 | 3.457426E-04 | -4.576659E-04 |
| 41 | 3.625810E+00 | 1.663380E-02 | -2.340145E-03 | 1.117092E-03 | -3.171873E-04 |
| 42 | -9.959005E+00 | 1.606297E-02 | -8.940852E-03 | 4.136947E-03 | 7.856633E-05 |
| 51 | -4.869803E+00 | 1.150859E-02 | -2.542353E-02 | 1.945688E-02 | -6.718629E-03 |
| 52 | 9.245162E+01 | -1.924871E-02 | -6.159785E-03 | 1.081129E-02 | -4.974403E-03 |
| 61 | -3.347949E+01 | -1.041255E-02 | -8.729796E-03 | 6.806134E-03 | -2.772712E-03 |
| 62 | -1.975310E+01 | 2.698628E-03 | -6.571177E-03 | 3.055115E-03 | -9.559848E-04 |
| No. | $a_{12}$ | $a_{14}$ | $a_{16}$ | $a_{18}$ | $a_{20}$ |
| 11 | 8.991068E-05 | -2.750435E-05 | 4.985255E-06 | -4.946088E-07 | 2.067273E-08 |
| 12 | -2.106564E-02 | 6.469335E-03 | -1.214515E-03 | 1.272355E-04 | -5.686438E-06 |
| 21 | -2.764606E-02 | 8.454631E-03 | -1.581749E-03 | 1.654145E-04 | -7.392974E-06 |
| 22 | -1.626682E-02 | 5.218393E-03 | -1.034883E-03 | 1.166294E-04 | -5.745757E-06 |
| 31 | -1.335982E-03 | 3.779378E-04 | -8.170838E-05 | 1.257239E-05 | -9.530129E-07 |
| 32 | 3.034897E-04 | -1.184147E-04 | 2.676672E-05 | -3.242008E-06 | 1.595164E-07 |
| 41 | 9.388351E-05 | -5.883275E-05 | 2.527732E-05 | -4.859429E-06 | 3.375984E-07 |
| 42 | -9.901328E-04 | 4.831734E-04 | -1.117343E-04 | 1.357506E-05 | -7.091229E-07 |
| 51 | 2.635727E-04 | 6.662899E-04 | -2.514922E-04 | 3.937989E-05 | -2.358356E-06 |
| 52 | 9.709043E-04 | 5.735239E-05 | -6.619265E-05 | 1.167589E-05 | -6.896389E-07 |
| 61 | 7.233036E-04 | -1.148797E-04 | 9.584337E-06 | -3.104356E-07 | -4.050642E-09 |
| 62 | 2.078282E-04 | -3.030115E-05 | 2.758574E-06 | -1.405082E-07 | 3.045228E-09 |

FIG. 35

| No. | | Radius of Curvature (mm) | Aperture Stop Distance/ Thickness/ Air Gap at first focusing state (mm) | | Aperture Stop Distance/ Thickness/ Air Gap at second focusing state (mm) | | Refractive Index | Abbe No. | Focal Length (mm) |
|---|---|---|---|---|---|---|---|---|---|
| | | | | | | | | | |
| | Object | Infinity | Infinity | | 48.697 | | | | |
| 2 | Ape. Stop | Infinity | -0.030 | | -0.030 | | | | |
| 11 | First Lens element | 4.305 | 1.225 | T1 | 1.225 | T1 | 1.545 | 55.987 | 13.534 |
| 12 | | 9.280 | 0.065 | G12 | 0.065 | G12 | | | |
| 21 | Second Lens element | 5.177 | 0.653 | T2 | 0.653 | T2 | 1.545 | 55.987 | -12.395 |
| 22 | | 2.802 | 0.526 | G23 | 0.526 | G23 | | | |
| 31 | Third Lens element | 15.646 | 0.561 | T3 | 0.561 | T3 | 1.640 | 23.503 | -10.244 |
| 32 | | 4.576 | 0.189 | G34 | 0.189 | G34 | | | |
| 41 | Fourth Lens element | 5.228 | 1.294 | T4 | 1.294 | T4 | 1.545 | 55.987 | 4.254 |
| 42 | | -3.811 | 1.247 | G45 | 3.665 | G45 | | | |
| 51 | Fifth Lens element | -12.221 | 1.327 | T5 | 1.327 | T5 | 1.640 | 23.503 | 23.256 |
| 52 | | -7.016 | 0.481 | G56 | 0.481 | G56 | | | |
| 61 | Sixth Lens element | -6.730 | 1.536 | T6 | 1.536 | T6 | 1.545 | 55.987 | -6.144 |
| 62 | | 7.223 | 4.892 | G6F | 2.475 | G6F | | | |
| 3 | Filter | Infinity | 0.210 | | 0.210 | | 1.517 | 64.167 | |
| | | Infinity | 0.050 | | 0.050 | | | | |
| 4 | Image Plane | Infinity | | | | | | | |

*Sixth Embodiment*

EFL=12.910mm, EFLA=8.696mm, Fno at first focusing state=3.070,
Fno at second focusing state=2.118, HFOV at first focusing state=15.167degrees,
HFOV at second focusing state=15.198degrees, TTL=13.997mm, ImgH=3.500mm

FIG. 36

| No. | K | $a_4$ | $a_6$ | $a_8$ | $a_{10}$ |
|---|---|---|---|---|---|
| 11 | 5.482832E-01 | 4.901372E-04 | 1.143306E-03 | -1.828457E-03 | 1.242472E-03 |
| 12 | 6.288292E+00 | -1.672669E-02 | 8.192976E-02 | -1.286238E-01 | 1.045066E-01 |
| 21 | -2.331405E+00 | -4.375533E-02 | 1.112893E-01 | -1.640036E-01 | 1.310083E-01 |
| 22 | 3.236641E-01 | -5.383292E-02 | 6.104314E-02 | -7.510853E-02 | 5.734001E-02 |
| 31 | 0.000000E+00 | -3.464107E-02 | 3.077238E-02 | -2.848554E-02 | 1.786309E-02 |
| 32 | -1.920822E+01 | 5.924029E-03 | -1.716177E-03 | -2.512899E-03 | 3.982793E-03 |
| 41 | -7.652974E+00 | 6.808714E-03 | -1.032646E-02 | 7.879863E-03 | -4.063271E-03 |
| 42 | 8.113075E-01 | 2.123662E-03 | -1.905512E-03 | 1.351214E-03 | -7.524626E-04 |
| 51 | 1.476292E+01 | 1.050575E-02 | -4.106463E-04 | 5.793388E-04 | -5.237777E-04 |
| 52 | -8.674572E+00 | 8.088313E-03 | -4.403388E-04 | 1.366256E-03 | -1.581832E-03 |
| 61 | 5.256575E+00 | -7.411546E-03 | 4.308163E-04 | 1.058716E-03 | -1.508084E-03 |
| 62 | -1.444243E+01 | -9.051473E-03 | 1.332555E-03 | -3.127696E-04 | 7.583066E-05 |
| No. | $a_{12}$ | $a_{14}$ | $a_{16}$ | $a_{18}$ | $a_{20}$ |
| 11 | -4.871710E-04 | 1.175785E-04 | -1.722411E-05 | 1.395867E-06 | -4.765644E-08 |
| 12 | -5.046888E-02 | 1.519782E-02 | -2.820739E-03 | 2.967084E-04 | -1.356813E-05 |
| 21 | -6.252932E-02 | 1.857249E-02 | -3.388795E-03 | 3.493763E-04 | -1.562149E-05 |
| 22 | -2.636747E-02 | 7.366147E-03 | -1.220743E-03 | 1.098836E-04 | -4.168648E-06 |
| 31 | -6.476144E-03 | 1.210283E-03 | -7.953769E-05 | -5.119535E-06 | 5.679968E-07 |
| 32 | -2.240415E-03 | 6.367409E-04 | -9.912647E-05 | 8.140302E-06 | -2.792989E-07 |
| 41 | 1.537932E-03 | -4.165826E-04 | 7.278492E-05 | -7.152535E-06 | 2.981754E-07 |
| 42 | 2.819117E-04 | -6.671039E-05 | 9.690953E-06 | -8.209822E-07 | 3.240169E-08 |
| 51 | 2.731135E-04 | -8.194719E-05 | 1.433071E-05 | -1.357475E-06 | 5.397845E-08 |
| 52 | 9.411930E-04 | -3.334895E-04 | 7.299654E-05 | -9.207708E-06 | 5.199936E-07 |
| 61 | 9.351044E-04 | -3.379174E-04 | 7.491923E-05 | -9.555735E-06 | 5.460383E-07 |
| 62 | -1.676705E-05 | 3.092373E-06 | -4.089594E-07 | 3.207804E-08 | -1.085946E-09 |

FIG. 37

| No. | | Radius of Curvature (mm) | Aperture Stop Distance/ Thickness/ Air Gap at first focusing state (mm) | | Aperture Stop Distance/ Thickness/ Air Gap at second focusing state (mm) | | Refractive Index | Abbe No. | Focal Length (mm) |
|---|---|---|---|---|---|---|---|---|---|
| | | | | | Seventh Embodiment | | | | |
| | | | EFL=14.138mm, EFLA=9.052mm, Fno at first focusing state=3.070, Fno at second focusing state=2.009, HFOV at first focusing state=13.811degrees, HFOV at second focusing state=13.831degrees, TTL=14.693mm, ImgH=3.500mm | | | | | | |
| | Object | Infinity | Infinity | | 48.697 | | | | |
| 2 | Ape. Stop | Infinity | -0.608 | | -0.608 | | | | |
| 11 | First Lens element | 4.102 | 1.441 | T1 | 1.441 | T1 | 1.545 | 55.987 | 12.365 |
| 12 | | 9.162 | 0.754 | G12 | 0.754 | G12 | | | |
| 21 | Second Lens element | 5.386 | 0.543 | T2 | 0.543 | T2 | 1.640 | 23.503 | -8.815 |
| 22 | | 2.654 | 0.684 | G23 | 0.684 | G23 | | | |
| 31 | Third Lens element | 13.179 | 0.929 | T3 | 0.929 | T3 | 1.545 | 55.987 | 15.419 |
| 32 | | -22.702 | 0.108 | G34 | 0.108 | G34 | | | |
| 41 | Fourth Lens element | -15.233 | 0.983 | T4 | 0.983 | T4 | 1.545 | 55.987 | 9.331 |
| 42 | | -3.904 | 0.883 | G45 | 3.724 | G45 | | | |
| 51 | Fifth Lens element | -14.124 | 1.224 | T5 | 1.224 | T5 | 1.640 | 23.503 | 24.700 |
| 52 | | -7.735 | 0.607 | G56 | 0.607 | G56 | | | |
| 61 | Sixth Lens element | -6.954 | 1.206 | T6 | 1.206 | T6 | 1.545 | 55.987 | -6.312 |
| 62 | | 7.244 | 5.330 | G6F | 2.489 | G6F | | | |
| 3 | Filter | Infinity | 0.210 | | 0.210 | | 1.517 | 64.167 | |
| | | Infinity | 0.093 | | 0.093 | | | | |
| 4 | Image Plane | Infinity | | | | | | | |

FIG. 38

| No. | K | $a_4$ | $a_6$ | $a_8$ | $a_{10}$ |
|---|---|---|---|---|---|
| 11 | 6.316847E-01 | -3.192088E-04 | -1.971861E-04 | 3.047692E-04 | -2.560269E-04 |
| 12 | 7.184538E+00 | -6.730917E-04 | 4.673240E-04 | 3.099388E-04 | -4.173208E-04 |
| 21 | -2.537711E+00 | -2.182840E-02 | 7.634465E-03 | -3.805423E-03 | 2.644423E-03 |
| 22 | 3.647008E-01 | -3.538240E-02 | 1.408953E-02 | -1.007922E-02 | 7.365173E-03 |
| 31 | -7.806922E+01 | -1.013085E-02 | 9.455713E-03 | -7.674308E-03 | 3.458925E-03 |
| 32 | 7.894060E+01 | -2.195603E-02 | 3.857349E-02 | -2.769616E-02 | 1.029342E-02 |
| 41 | -1.150835E+01 | -1.728959E-02 | 3.359897E-02 | -2.394998E-02 | 8.616778E-03 |
| 42 | 9.208524E-01 | 4.449559E-06 | 6.684897E-04 | -1.261277E-04 | -3.257938E-04 |
| 51 | 1.847619E+01 | 1.047593E-02 | -6.087611E-04 | 8.160144E-04 | -6.929020E-04 |
| 52 | -1.318201E+01 | 8.665867E-03 | -1.081002E-03 | 2.047950E-03 | -1.975259E-03 |
| 61 | 5.330839E+00 | -8.501894E-03 | 8.142301E-04 | 5.694027E-04 | -8.818357E-04 |
| 62 | -1.351370E+01 | -1.109779E-02 | 2.159294E-03 | -6.804044E-04 | 2.275206E-04 |
| No. | $a_{12}$ | $a_{14}$ | $a_{16}$ | $a_{18}$ | $a_{20}$ |
| 11 | 1.348557E-04 | -4.223232E-05 | 7.769529E-06 | -7.750256E-07 | 3.243663E-08 |
| 12 | 3.609426E-04 | -1.647184E-04 | 4.126213E-05 | -5.423092E-06 | 2.964187E-07 |
| 21 | -1.199509E-03 | 3.196190E-04 | -5.197722E-05 | 5.021638E-06 | -2.232934E-07 |
| 22 | -3.662146E-03 | 1.212277E-03 | -2.778910E-04 | 3.981782E-05 | -2.589075E-06 |
| 31 | -7.570832E-04 | 4.813507E-05 | 5.066781E-06 | -1.250408E-07 | -1.048964E-07 |
| 32 | -2.071751E-03 | 1.929835E-04 | -6.388531E-06 | 1.497801E-06 | -2.416119E-07 |
| 41 | -1.635661E-03 | 1.182164E-04 | 5.558338E-06 | -2.480607E-07 | -1.152113E-07 |
| 42 | 2.460532E-04 | -8.773784E-05 | 1.755701E-05 | -1.897864E-06 | 8.775057E-08 |
| 51 | 3.619325E-04 | -1.166298E-04 | 2.300540E-05 | -2.540591E-06 | 1.201330E-07 |
| 52 | 1.141089E-03 | -4.125854E-04 | 9.242136E-05 | -1.172410E-05 | 6.508431E-07 |
| 61 | 5.627117E-04 | -2.140210E-04 | 5.008629E-05 | -6.651334E-06 | 3.904110E-07 |
| 62 | -6.243483E-05 | 1.208922E-05 | -1.499486E-06 | 1.058511E-07 | -3.216406E-09 |

FIG. 39

| No. | | Radius of Curvature (mm) | Aperture Stop Distance/ Thickness/ Air Gap at first focusing state (mm) | | Aperture Stop Distance/ Thickness/ Air Gap at second focusing state (mm) | | Refractive Index | Abbe No. | Focal Length (mm) |
|---|---|---|---|---|---|---|---|---|---|
| | Object | Infinity | Infinity | | 48.697 | | | | |
| 2 | Ape. Stop | Infinity | -0.030 | | -0.030 | | | | |
| 11 | First Lens element | 4.056 | 1.525 | T1 | 1.525 | T1 | 1.545 | 55.987 | 11.903 |
| 12 | | 9.366 | 0.264 | G12 | 0.264 | G12 | | | |
| 21 | Second Lens element | 5.538 | 0.729 | T2 | 0.729 | T2 | 1.640 | 23.503 | -8.729 |
| 22 | | 2.646 | 0.703 | G23 | 0.703 | G23 | | | |
| 31 | Third Lens element | 12.999 | 0.761 | T3 | 0.761 | T3 | 1.545 | 55.987 | 15.200 |
| 32 | | -22.454 | 0.061 | G34 | 0.061 | G34 | | | |
| 41 | Fourth Lens element | -14.695 | 1.052 | T4 | 1.052 | T4 | 1.545 | 55.987 | 9.297 |
| 42 | | -3.867 | 0.783 | G45 | 3.545 | G45 | | | |
| 51 | Fifth Lens element | -14.024 | 1.078 | T5 | 1.078 | T5 | 1.640 | 23.503 | 28.779 |
| 52 | | -8.224 | 0.740 | G56 | 0.740 | G56 | | | |
| 61 | Sixth Lens element | -7.295 | 1.084 | T6 | 1.084 | T6 | 1.545 | 55.987 | -6.639 |
| 62 | | 7.577 | 5.276 | G6F | 2.514 | G6F | | | |
| 3 | Filter | Infinity | 0.210 | | 0.210 | | 1.517 | 64.167 | |
| | | Infinity | 0.054 | | 0.054 | | | | |
| 4 | Image Plane | Infinity | | | | | | | |

Eighth Embodiment

EFL=13.496mm, EFLA=8.844mm, Fno at first focusing state=3.070,

Fno at second focusing state=2.021, HFOV at first focusing state=14.396degrees,

HFOV at second focusing state=14.464degrees, TTL=14.055mm, ImgH=3.500mm

FIG. 40

| No. | K | $a_4$ | $a_6$ | $a_8$ | $a_{10}$ |
|---|---|---|---|---|---|
| 11 | 6.222286E-01 | -4.151697E-04 | 4.077386E-04 | -4.178062E-04 | 2.771374E-04 |
| 12 | 8.141297E+00 | -8.166640E-03 | 1.197183E-02 | -1.057203E-02 | 7.111722E-03 |
| 21 | -2.127812E+00 | -2.635374E-02 | 1.904185E-02 | -1.466746E-02 | 9.089580E-03 |
| 22 | 3.560395E-01 | -3.514400E-02 | 1.838819E-02 | -1.415177E-02 | 8.444261E-03 |
| 31 | 0.000000E+00 | -1.629956E-02 | 7.204748E-03 | 5.023167E-04 | -6.665008E-03 |
| 32 | 8.206972E+01 | -2.216713E-02 | 2.264051E-02 | 1.729128E-02 | -4.328528E-02 |
| 41 | -1.384714E+01 | -1.604115E-02 | 1.873356E-02 | 1.700743E-02 | -3.992964E-02 |
| 42 | 9.511861E-01 | 8.561473E-04 | -6.055357E-04 | 1.283215E-03 | -1.424935E-03 |
| 51 | 1.717033E+01 | 1.112742E-02 | -6.847051E-04 | 8.084146E-04 | -7.372507E-04 |
| 52 | -1.775379E+01 | 8.908090E-03 | -1.498000E-04 | 3.717596E-04 | -3.938189E-04 |
| 61 | 5.342222E+00 | -7.504238E-03 | 1.557390E-03 | -1.478074E-03 | 1.081431E-03 |
| 62 | -1.237229E+01 | -1.051302E-02 | 1.934784E-03 | -6.963025E-04 | 2.572768E-04 |
| No. | $a_{12}$ | $a_{14}$ | $a_{16}$ | $a_{18}$ | $a_{20}$ |
| 11 | -1.145675E-04 | 3.004262E-05 | -4.797241E-06 | 4.242892E-07 | -1.587920E-08 |
| 12 | -3.252254E-03 | 9.972200E-04 | -1.982688E-04 | 2.320836E-05 | -1.207512E-06 |
| 21 | -3.880071E-03 | 1.104242E-03 | -2.060061E-04 | 2.325427E-05 | -1.204353E-06 |
| 22 | -3.399506E-03 | 9.321700E-04 | -1.885049E-04 | 2.656086E-05 | -1.840262E-06 |
| 31 | 6.273209E-03 | -2.871031E-03 | 7.287937E-04 | -9.940198E-05 | 5.709609E-06 |
| 32 | 3.254367E-02 | -1.288200E-02 | 2.883002E-03 | -3.448762E-04 | 1.715961E-05 |
| 41 | 2.952860E-02 | -1.157190E-02 | 2.568773E-03 | -3.047022E-04 | 1.501747E-05 |
| 42 | 8.120433E-04 | -2.706937E-04 | 5.270255E-05 | -5.537330E-06 | 2.430065E-07 |
| 51 | 4.119277E-04 | -1.394081E-04 | 2.853548E-05 | -3.244231E-06 | 1.567932E-07 |
| 52 | 1.855378E-04 | -4.037248E-05 | 2.914128E-06 | 3.623638E-07 | -5.241466E-08 |
| 61 | -5.967313E-04 | 2.225134E-04 | -5.101974E-05 | 6.484014E-06 | -3.452695E-07 |
| 62 | -7.325836E-05 | 1.449012E-05 | -1.843294E-06 | 1.346061E-07 | -4.268298E-09 |

FIG. 41

| No. | | Radius of Curvature (mm) | Aperture Stop Distance/ Thickness/ Air Gap at first focusing state (mm) | | Aperture Stop Distance/ Thickness/ Air Gap at second focusing state (mm) | | Refractive Index | Abbe No. | Focal Length (mm) |
|---|---|---|---|---|---|---|---|---|---|
| | | | | | | | | | |
| | Object | Infinity | Infinity | | 48.697 | | | | |
| 2 | Ape. Stop | Infinity | -0.030 | | -0.030 | | | | |
| 11 | First Lens element | 54.206 | 2.018 | T1 | 2.018 | T1 | 1.545 | 55.987 | 29.433 |
| 12 | | -22.530 | 0.915 | G12 | 0.915 | G12 | | | |
| 21 | Second Lens element | 5.492 | 1.024 | T2 | 1.024 | T2 | 1.640 | 23.503 | -11.661 |
| 22 | | 2.941 | 0.635 | G23 | 0.635 | G23 | | | |
| 31 | Third Lens element | 10.067 | 0.990 | T3 | 0.990 | T3 | 1.545 | 55.987 | 12.241 |
| 32 | | -19.175 | 0.176 | G34 | 0.176 | G34 | | | |
| 41 | Fourth Lens element | -13.151 | 1.178 | T4 | 1.178 | T4 | 1.545 | 55.987 | 7.878 |
| 42 | | -3.343 | 1.481 | G45 | 3.486 | G45 | | | |
| 51 | Fifth Lens element | -8.863 | 1.396 | T5 | 1.396 | T5 | 1.640 | 23.503 | -174.677 |
| 52 | | -10.214 | 0.378 | G56 | 0.378 | G56 | | | |
| 61 | Sixth Lens element | 11.639 | 1.248 | T6 | 1.248 | T6 | 1.545 | 55.987 | -9.753 |
| 62 | | 3.514 | 4.891 | G6F | 2.886 | G6F | | | |
| 3 | Filter | Infinity | 0.210 | | 0.210 | | 1.517 | 64.167 | |
| | | Infinity | 0.050 | | 0.050 | | | | |
| 4 | Image Plane | Infinity | | | | | | | |

Ninth Embodiment

EFL=11.624mm, EFLA=8.463mm, Fno at first focusing state=3.070,
Fno at second focusing state=2.235, HFOV at first focusing state=16.508degrees,
HFOV at second focusing state=17.386degrees, TTL=16.330mm, ImgH=3.500mm

FIG. 42

| No. | K | $a_4$ | $a_6$ | $a_8$ | $a_{10}$ |
|---|---|---|---|---|---|
| 11 | 0.000000E+00 | 1.059387E-03 | 1.460563E-03 | -2.823913E-03 | 3.031724E-03 |
| 12 | 0.000000E+00 | 2.308403E-03 | -4.369089E-04 | -7.342807E-05 | 5.596549E-04 |
| 21 | -3.090205E+00 | -9.728195E-03 | -2.239770E-03 | 3.543637E-04 | 1.072214E-03 |
| 22 | 2.766884E-01 | -1.865999E-02 | -5.206694E-03 | -9.171145E-04 | 4.547667E-03 |
| 31 | -2.805266E+01 | 1.881721E-03 | 3.915609E-03 | -1.161986E-02 | 8.978531E-03 |
| 32 | 1.060636E+01 | -2.155646E-02 | 5.408608E-02 | -5.781781E-02 | 3.613526E-02 |
| 41 | 2.240389E+01 | -2.791741E-02 | 5.808650E-02 | -5.857016E-02 | 3.611148E-02 |
| 42 | 6.119580E-01 | -3.548585E-03 | 8.210284E-03 | -6.776913E-03 | 3.629400E-03 |
| 51 | 9.907493E+00 | 1.162007E-02 | 5.824326E-03 | -7.414187E-03 | 4.716403E-03 |
| 52 | 0.000000E+00 | 6.123545E-03 | 1.631733E-02 | -1.877220E-02 | 1.159898E-02 |
| 61 | 0.000000E+00 | -2.727120E-02 | 1.985090E-02 | -2.014206E-02 | 1.218226E-02 |
| 62 | 0.000000E+00 | -3.167618E-02 | 6.204669E-03 | -2.442605E-03 | 9.249692E-04 |
| No. | $a_{12}$ | $a_{14}$ | $a_{16}$ | $a_{18}$ | $a_{20}$ |
| 11 | -1.964213E-03 | 7.906243E-04 | -1.933464E-04 | 2.628493E-05 | -1.522400E-06 |
| 12 | -4.228692E-04 | 1.554231E-04 | -3.132641E-05 | 3.286968E-06 | -1.393152E-07 |
| 21 | -7.214569E-04 | 1.901851E-04 | -1.813897E-05 | -9.677355E-07 | 2.150844E-07 |
| 22 | -3.092647E-03 | 1.050051E-03 | -1.979156E-04 | 1.947897E-05 | -7.639952E-07 |
| 31 | -3.646087E-03 | 8.572216E-04 | -1.124480E-04 | 6.879741E-06 | -9.789961E-08 |
| 32 | -1.445439E-02 | 3.716889E-03 | -5.917672E-04 | 5.296580E-05 | -2.034836E-06 |
| 41 | -1.445325E-02 | 3.726759E-03 | -5.943927E-04 | 5.322777E-05 | -2.042678E-06 |
| 42 | -1.256217E-03 | 2.766376E-04 | -3.705109E-05 | 2.725736E-06 | -8.279721E-08 |
| 51 | -1.809073E-03 | 4.348027E-04 | -6.395467E-05 | 5.262919E-06 | -1.854276E-07 |
| 52 | -4.369990E-03 | 1.035069E-03 | -1.500939E-04 | 1.214544E-05 | -4.182810E-07 |
| 61 | -4.529474E-03 | 1.058559E-03 | -1.513567E-04 | 1.206321E-05 | -4.085630E-07 |
| 62 | -2.471849E-04 | 4.274424E-05 | -4.568877E-06 | 2.741583E-07 | -7.059862E-09 |

FIG. 43

| No. | | Radius of Curvature (mm) | Aperture Stop Distance/ Thickness/ Air Gap at first focusing state (mm) | | Aperture Stop Distance/ Thickness/ Air Gap at second focusing state (mm) | | Refractive Index | Abbe No. | Focal Length (mm) |
|---|---|---|---|---|---|---|---|---|---|
| | | | Tenth Embodiment | | | | | | |
| | | EFL=13.809mm, EFLA=8.963mm, Fno at first focusing state=3.070, Fno at second focusing state=2.029, HFOV at first focusing state=14.083degrees, HFOV at second focusing state=14.128degrees, TTL=14.241mm, ImgH=3.500mm | | | | | | | |
| | Object | Infinity | Infinity | | 48.697 | | | | |
| 2 | Ape. Stop | Infinity | -0.030 | | -0.030 | | | | |
| 11 | First Lens element | 4.072 | 1.547 | T1 | 1.547 | T1 | 1.545 | 55.987 | 12.120 |
| 12 | | 9.171 | 0.366 | G12 | 0.366 | G12 | | | |
| 21 | Second Lens element | 5.448 | 0.588 | T2 | 0.588 | T2 | 1.640 | 23.503 | -8.782 |
| 22 | | 2.657 | 0.577 | G23 | 0.577 | G23 | | | |
| 31 | Third Lens element | 13.304 | 0.822 | T3 | 0.822 | T3 | 1.545 | 55.987 | 15.493 |
| 32 | | -22.699 | 0.122 | G34 | 0.122 | G34 | | | |
| 41 | Fourth Lens element | -14.861 | 1.119 | T4 | 1.119 | T4 | 1.545 | 55.987 | 9.264 |
| 42 | | -3.873 | 0.923 | G45 | 3.712 | G45 | | | |
| 51 | Fifth Lens element | -13.448 | 1.008 | T5 | 1.008 | T5 | 1.640 | 23.503 | 28.434 |
| 52 | | -7.981 | 0.710 | G56 | 0.710 | G56 | | | |
| 61 | Sixth Lens element | -7.072 | 1.152 | T6 | 1.152 | T6 | 1.545 | 55.987 | -6.580 |
| 62 | | 7.717 | 5.307 | G6F | 2.518 | G6F | | | |
| 3 | Filter | Infinity | 0.210 | | 0.210 | | 1.517 | 64.167 | |
| | | Infinity | 0.108 | | 0.108 | | | | |
| 4 | Image Plane | Infinity | | | | | | | |

FIG. 44

| No. | K | $a_4$ | $a_6$ | $a_8$ | $a_{10}$ |
|---|---|---|---|---|---|
| 11 | 5.905782E-01 | -2.434077E-04 | 1.104963E-05 | -1.094132E-04 | 9.000044E-05 |
| 12 | 7.610602E+00 | -2.194524E-04 | 1.163874E-04 | -9.991991E-04 | 1.433399E-03 |
| 21 | -2.332899E+00 | -1.766603E-02 | 3.242719E-03 | -3.031999E-03 | 3.545568E-03 |
| 22 | 3.619875E-01 | -3.037169E-02 | 7.170796E-03 | -5.808282E-03 | 4.368105E-03 |
| 31 | -8.860697E+01 | -9.171467E-03 | 7.326610E-03 | -3.190201E-03 | -2.618897E-03 |
| 32 | 7.769914E+01 | -1.978762E-02 | 2.894558E-02 | -9.218708E-03 | -8.388002E-03 |
| 41 | -9.621410E+00 | -1.535386E-02 | 2.409062E-02 | -7.463357E-03 | -6.977326E-03 |
| 42 | 9.353708E-01 | 1.063316E-04 | 8.582019E-05 | 7.375706E-04 | -1.020341E-03 |
| 51 | 1.270198E+01 | 1.166002E-02 | -7.956161E-04 | 1.190244E-03 | -1.095586E-03 |
| 52 | -1.714522E+01 | 8.597778E-03 | -2.801328E-04 | 1.206423E-03 | -1.203149E-03 |
| 61 | 5.614294E+00 | -8.828829E-03 | 1.887834E-03 | -8.938015E-04 | 3.662411E-04 |
| 62 | -1.323360E+01 | -1.099421E-02 | 2.353083E-03 | -8.597125E-04 | 2.986536E-04 |
| No. | $a_{12}$ | $a_{14}$ | $a_{16}$ | $a_{18}$ | $a_{20}$ |
| 11 | -3.435927E-05 | 7.682678E-06 | -9.976229E-07 | 6.799306E-08 | -1.753027E-09 |
| 12 | -7.171907E-04 | 1.982950E-04 | -3.498803E-05 | 4.008629E-06 | -2.261050E-07 |
| 21 | -1.694507E-03 | 3.898336E-04 | -4.299074E-05 | 1.802739E-06 | -3.133414E-09 |
| 22 | -1.391037E-03 | 7.221634E-05 | 4.777922E-05 | -8.262843E-06 | 2.472268E-07 |
| 31 | 3.581345E-03 | -1.671256E-03 | 3.860621E-04 | -4.352801E-05 | 1.810190E-06 |
| 32 | 9.028558E-03 | -3.819083E-03 | 8.595933E-04 | -1.009726E-04 | 4.867611E-06 |
| 41 | 7.284877E-03 | -3.033021E-03 | 6.754571E-04 | -7.864898E-05 | 3.762015E-06 |
| 42 | 5.974701E-04 | -1.985076E-04 | 3.852772E-05 | -4.075867E-06 | 1.823894E-07 |
| 51 | 5.972159E-04 | -1.975241E-04 | 3.957092E-05 | -4.406679E-06 | 2.089006E-07 |
| 52 | 6.243765E-04 | -1.894113E-04 | 3.460336E-05 | -3.512000E-06 | 1.585949E-07 |
| 61 | -1.876076E-04 | 8.304527E-05 | -2.203487E-05 | 3.075631E-06 | -1.683027E-07 |
| 62 | -8.015586E-05 | 1.524336E-05 | -1.894650E-06 | 1.365043E-07 | -4.291700E-09 |

FIG. 45

| Embodiment | 1st | 2nd | 3rd | 4th | 5th | 6th | 7th | 8th | 9th | 10th |
|---|---|---|---|---|---|---|---|---|---|---|
| Focusing State | 1st | 1st | 1st | 1st | 1st | 1st | 1st | 1st | 1st | 1st |
| T1 | 0.487 | 0.505 | 1.896 | 2.532 | 2.647 | 1.225 | 1.441 | 1.525 | 2.018 | 1.547 |
| G12 | 0.050 | 0.050 | 0.082 | 0.228 | 0.095 | 0.065 | 0.754 | 0.264 | 0.915 | 0.366 |
| T2 | 0.644 | 0.500 | 0.581 | 0.605 | 0.423 | 0.653 | 0.543 | 0.729 | 1.024 | 0.588 |
| G23 | 0.437 | 0.359 | 0.514 | 0.458 | 0.492 | 0.526 | 0.684 | 0.703 | 0.635 | 0.577 |
| T3 | 1.191 | 2.344 | 2.044 | 2.060 | 1.642 | 0.561 | 0.929 | 0.761 | 0.990 | 0.822 |
| G34 | 0.795 | 0.889 | 0.781 | 0.643 | 0.858 | 0.189 | 0.108 | 0.061 | 0.176 | 0.122 |
| T4 | 0.322 | 0.552 | 0.530 | 0.632 | 0.670 | 1.294 | 0.983 | 1.052 | 1.178 | 1.119 |
| G45 | 0.162 | 0.218 | 0.290 | 0.342 | 0.351 | 1.247 | 0.883 | 0.783 | 1.481 | 0.923 |
| T5 | 0.355 | 0.496 | 0.528 | 0.540 | 0.414 | 1.327 | 1.224 | 1.078 | 1.396 | 1.008 |
| G56 | 0.812 | 0.458 | 0.530 | 0.446 | 0.365 | 0.481 | 0.607 | 0.740 | 0.378 | 0.710 |
| T6 | 1.268 | 1.486 | 1.583 | 1.020 | 1.242 | 1.536 | 1.206 | 1.084 | 1.248 | 1.152 |
| G6F | 4.029 | 4.311 | 5.310 | 5.384 | 5.312 | 4.892 | 5.330 | 5.276 | 4.891 | 5.307 |
| TF | 0.210 | 0.210 | 0.210 | 0.210 | 0.210 | 0.210 | 0.210 | 0.210 | 0.210 | 0.210 |
| GFP | 0.050 | 0.050 | 0.251 | 0.512 | 0.144 | 0.050 | 0.093 | 0.054 | 0.050 | 0.108 |
| EFL | 9.261 | 10.022 | 13.827 | 14.683 | 13.936 | 12.910 | 14.138 | 13.496 | 11.624 | 13.809 |
| Fno | 3.070 | 3.070 | 3.070 | 3.070 | 3.070 | 3.070 | 3.070 | 3.070 | 3.070 | 3.070 |
| HFOV | 20.527 | 19.734 | 14.132 | 13.255 | 13.965 | 15.167 | 13.811 | 14.396 | 16.508 | 14.083 |
| BFL | 4.289 | 4.571 | 5.771 | 6.106 | 5.666 | 5.152 | 5.633 | 5.540 | 5.151 | 5.626 |
| TL | 6.523 | 7.856 | 9.358 | 9.506 | 9.199 | 9.105 | 9.363 | 8.779 | 11.439 | 8.934 |
| TTL | 10.553 | 12.167 | 14.668 | 14.890 | 14.511 | 13.997 | 14.693 | 14.055 | 16.330 | 14.241 |
| ALT | 4.268 | 5.883 | 7.162 | 7.389 | 7.037 | 6.596 | 6.327 | 6.229 | 7.854 | 6.236 |
| AAG$_1$ | 2.256 | 1.973 | 2.196 | 2.117 | 2.162 | 2.509 | 3.036 | 2.551 | 3.585 | 2.698 |
| Tmax | 1.268 | 2.344 | 2.044 | 2.532 | 2.647 | 1.536 | 1.441 | 1.525 | 2.018 | 1.547 |
| Tmin | 0.322 | 0.496 | 0.528 | 0.540 | 0.414 | 0.561 | 0.543 | 0.729 | 0.990 | 0.588 |
| Tavg | 0.711 | 0.981 | 1.194 | 1.231 | 1.173 | 1.099 | 1.054 | 1.038 | 1.309 | 1.039 |
| υ4 | 23.503 | 23.503 | 37.666 | 23.503 | 23.503 | 55.987 | 55.987 | 55.987 | 55.987 | 55.987 |
| υ5 | 55.987 | 55.987 | 55.987 | 55.987 | 55.987 | 23.503 | 23.503 | 23.503 | 23.503 | 23.503 |
| υ6 | 55.987 | 55.987 | 55.987 | 55.987 | 55.987 | 55.987 | 55.987 | 55.987 | 55.987 | 55.987 |
| ΔHFOV | 0.989 | 0.152 | 0.309 | 0.426 | 0.277 | 0.031 | 0.020 | 0.068 | 0.878 | 0.045 |
| ΔG | 1.641 | 1.677 | 2.724 | 2.769 | 2.963 | 2.418 | 2.841 | 2.762 | 2.005 | 2.789 |

FIG. 46

| Embodiment | 1st | 2nd | 3rd | 4th | 5th | 6th | 7th | 8th | 9th | 10th |
|---|---|---|---|---|---|---|---|---|---|---|
| Focusing State | 2nd | 2nd | 2nd | 2nd | 2nd | 2nd | 2nd | 2nd | 2nd | 2nd |
| T1 | 0.487 | 0.505 | 1.896 | 2.532 | 2.647 | 1.225 | 1.441 | 1.525 | 2.018 | 1.547 |
| G12 | 0.050 | 0.050 | 0.082 | 0.228 | 0.095 | 0.065 | 0.754 | 0.264 | 0.915 | 0.366 |
| T2 | 0.644 | 0.500 | 0.581 | 0.605 | 0.423 | 0.653 | 0.543 | 0.729 | 1.024 | 0.588 |
| G23 | 0.437 | 0.359 | 0.514 | 0.458 | 0.492 | 0.526 | 0.684 | 0.703 | 0.635 | 0.577 |
| T3 | 1.191 | 2.344 | 2.044 | 2.060 | 1.642 | 0.561 | 0.929 | 0.761 | 0.990 | 0.822 |
| G34 | 2.436 | 2.566 | 3.504 | 3.412 | 3.821 | 0.189 | 0.108 | 0.061 | 0.176 | 0.122 |
| T4 | 0.322 | 0.552 | 0.530 | 0.632 | 0.670 | 1.294 | 0.983 | 1.052 | 1.178 | 1.119 |
| G45 | 0.162 | 0.218 | 0.290 | 0.342 | 0.351 | 3.665 | 3.724 | 3.545 | 3.486 | 3.712 |
| T5 | 0.355 | 0.496 | 0.528 | 0.540 | 0.414 | 1.327 | 1.224 | 1.078 | 1.396 | 1.008 |
| G56 | 0.812 | 0.458 | 0.530 | 0.446 | 0.365 | 0.481 | 0.607 | 0.740 | 0.378 | 0.710 |
| T6 | 1.268 | 1.486 | 1.583 | 1.020 | 1.242 | 1.536 | 1.206 | 1.084 | 1.248 | 1.152 |
| G6F | 2.389 | 2.633 | 2.586 | 2.615 | 2.349 | 2.475 | 2.489 | 2.514 | 2.886 | 2.518 |
| TF | 0.210 | 0.210 | 0.210 | 0.210 | 0.210 | 0.210 | 0.210 | 0.210 | 0.210 | 0.210 |
| GFP | 0.050 | 0.050 | 0.251 | 0.512 | 0.144 | 0.050 | 0.093 | 0.054 | 0.050 | 0.108 |
| EFLA | 7.342 | 7.679 | 9.266 | 9.563 | 9.071 | 8.696 | 9.052 | 8.844 | 8.463 | 8.963 |
| Fno | 2.434 | 2.352 | 2.143 | 2.025 | 2.053 | 2.118 | 2.009 | 2.021 | 2.235 | 2.029 |
| HFOV | 19.538 | 19.582 | 13.823 | 12.829 | 13.688 | 15.198 | 13.831 | 14.464 | 17.386 | 14.128 |
| BFL | 2.649 | 2.893 | 3.047 | 3.337 | 2.703 | 2.735 | 2.791 | 2.778 | 3.146 | 2.837 |
| TL | 8.164 | 9.534 | 12.082 | 12.275 | 12.162 | 11.523 | 12.204 | 11.541 | 13.444 | 11.723 |
| TTL | 10.553 | 12.167 | 14.668 | 14.890 | 14.511 | 13.997 | 14.693 | 14.055 | 16.330 | 14.241 |
| ALT | 4.268 | 5.883 | 7.162 | 7.389 | 7.037 | 6.596 | 6.327 | 6.229 | 7.854 | 6.236 |
| AAG$_2$ | 3.896 | 3.651 | 4.920 | 4.886 | 5.125 | 4.927 | 5.877 | 5.313 | 5.590 | 5.487 |
| Tmax | 1.268 | 2.344 | 2.044 | 2.532 | 2.647 | 1.536 | 1.441 | 1.525 | 2.018 | 1.547 |
| Tmin | 0.322 | 0.496 | 0.528 | 0.540 | 0.414 | 0.561 | 0.543 | 0.729 | 0.990 | 0.588 |
| Tavg | 0.711 | 0.981 | 1.194 | 1.231 | 1.173 | 1.099 | 1.054 | 1.038 | 1.309 | 1.039 |
| υ4 | 23.503 | 23.503 | 37.666 | 23.503 | 23.503 | 55.987 | 55.987 | 55.987 | 55.987 | 55.987 |
| υ5 | 55.987 | 55.987 | 55.987 | 55.987 | 55.987 | 23.503 | 23.503 | 23.503 | 23.503 | 23.503 |
| υ6 | 55.987 | 55.987 | 55.987 | 55.987 | 55.987 | 55.987 | 55.987 | 55.987 | 55.987 | 55.987 |
| ΔHFOV | 0.989 | 0.152 | 0.309 | 0.426 | 0.277 | 0.031 | 0.020 | 0.068 | 0.878 | 0.045 |
| ΔG | 1.641 | 1.677 | 2.724 | 2.769 | 2.963 | 2.418 | 2.841 | 2.762 | 2.005 | 2.789 |

FIG. 47

| Embodiment | 1st | 2nd | 3rd | 4th | 5th | 6th | 7th | 8th | 9th | 10th |
|---|---|---|---|---|---|---|---|---|---|---|
| Focusing State | 1st | 1st | 1st | 1st | 1st | 1st | 1st | 1st | 1st | 1st |
| TTL*ΔHFOV/ΔG | 6.361 | 1.103 | 1.664 | 2.291 | 1.357 | 0.179 | 0.103 | 0.346 | 7.151 | 0.230 |
| (u4+u5)/u6 | 1.420 | 1.420 | 1.673 | 1.420 | 1.420 | 1.420 | 1.420 | 1.420 | 1.420 | 1.420 |
| (T1+G12+T2)/T6 | 0.932 | 0.710 | 1.617 | 3.298 | 2.549 | 1.266 | 2.270 | 2.324 | 3.171 | 2.171 |
| (T2+G23+T3)/G56 | 2.799 | 6.999 | 5.925 | 6.999 | 6.999 | 3.618 | 3.551 | 2.964 | 6.999 | 2.799 |
| (T3+T4)/(G23+T5) | 1.911 | 3.388 | 2.472 | 2.695 | 2.551 | 1.001 | 1.002 | 1.018 | 1.068 | 1.224 |
| ALT/(G34+T4) | 3.819 | 4.085 | 5.463 | 5.799 | 4.606 | 4.447 | 5.799 | 5.597 | 5.799 | 5.025 |
| TTL/BFL | 2.460 | 2.662 | 2.542 | 2.439 | 2.561 | 2.717 | 2.608 | 2.537 | 3.170 | 2.532 |
| T1/(G12+G23) | 1.001 | 1.234 | 3.182 | 3.691 | 4.504 | 2.071 | 1.002 | 1.577 | 1.303 | 1.641 |
| AAG1/T2 | 3.501 | 3.944 | 3.783 | 3.501 | 5.112 | 3.840 | 5.587 | 3.501 | 3.501 | 4.588 |
| TL/(G23+T4) | 8.594 | 8.626 | 8.964 | 8.722 | 7.912 | 5.001 | 5.614 | 5.001 | 6.310 | 5.270 |
| (G34+T4+G45)/T6 | 1.009 | 1.116 | 1.011 | 1.585 | 1.513 | 1.778 | 1.636 | 1.750 | 2.272 | 1.878 |
| TTL/(T2+G23) | 9.762 | 14.156 | 13.407 | 14.006 | 15.855 | 11.865 | 11.967 | 9.817 | 9.844 | 12.226 |
| T6/Tmin | 3.935 | 2.999 | 2.999 | 1.888 | 2.999 | 2.738 | 2.220 | 1.487 | 1.261 | 1.959 |
| ALT/Tmin | 13.244 | 11.870 | 13.568 | 13.674 | 16.999 | 11.764 | 11.643 | 8.549 | 7.936 | 10.603 |
| TTL/(AAG1+BFL) | 1.612 | 1.859 | 1.841 | 1.811 | 1.854 | 1.827 | 1.695 | 1.737 | 1.869 | 1.711 |
| EFL/(T2+G23) | 8.567 | 11.660 | 12.638 | 13.812 | 15.227 | 10.943 | 11.515 | 9.427 | 7.007 | 11.855 |
| T6/G56 | 1.562 | 3.247 | 2.989 | 2.286 | 3.399 | 3.192 | 1.986 | 1.465 | 3.298 | 1.623 |
| AAG1/(T3+T5) | 1.459 | 0.695 | 0.854 | 0.814 | 1.052 | 1.329 | 1.410 | 1.387 | 1.503 | 1.474 |
| TTL/ALT | 2.473 | 2.068 | 2.048 | 2.015 | 2.062 | 2.122 | 2.322 | 2.256 | 2.079 | 2.284 |
| EFL/EFLA | 1.262 | 1.305 | 1.492 | 1.535 | 1.536 | 1.485 | 1.562 | 1.526 | 1.374 | 1.541 |
| TTL/Tavg | 14.836 | 12.409 | 12.288 | 12.091 | 12.372 | 12.732 | 13.934 | 13.539 | 12.475 | 13.702 |
| TL/(Tmax+Tmin) | 6.636 | 4.284 | 5.703 | 4.846 | 4.741 | 6.677 | 7.404 | 6.236 | 5.429 | 6.670 |
| BFL/Tmax | 3.383 | 1.950 | 2.823 | 2.411 | 2.141 | 3.355 | 3.909 | 3.631 | 2.552 | 3.636 |

FIG. 48

| Embodiment | 1st | 2nd | 3rd | 4th | 5th | 6th | 7th | 8th | 9th | 10th |
|---|---|---|---|---|---|---|---|---|---|---|
| Focusing State | 2nd | 2nd | 2nd | 2nd | 2nd | 2nd | 2nd | 2nd | 2nd | 2nd |
| $TTL*\Delta HFOV/\Delta G$ | 6.361 | 1.103 | 1.664 | 2.291 | 1.357 | 0.179 | 0.103 | 0.346 | 7.151 | 0.230 |
| $(u4+u5)/u6$ | 1.420 | 1.420 | 1.673 | 1.420 | 1.420 | 1.420 | 1.420 | 1.420 | 1.420 | 1.420 |
| $(T1+G12+T2)/T6$ | 0.932 | 0.710 | 1.617 | 3.298 | 2.549 | 1.266 | 2.270 | 2.324 | 3.171 | 2.171 |
| $(T2+G23+T3)/G56$ | 2.799 | 6.999 | 5.925 | 6.999 | 6.999 | 3.618 | 3.551 | 2.964 | 6.999 | 2.799 |
| $(T3+T4)/(G23+T5)$ | 1.911 | 3.388 | 2.472 | 2.695 | 2.551 | 1.001 | 1.002 | 1.018 | 1.068 | 1.224 |
| $ALT/(G34+T4)$ | 1.547 | 1.887 | 1.775 | 1.827 | 1.567 | 4.447 | 5.799 | 5.597 | 5.799 | 5.025 |
| $TTL/BFL$ | 3.984 | 4.205 | 4.814 | 4.462 | 5.368 | 5.119 | 5.264 | 5.060 | 5.191 | 5.020 |
| $T1/(G12+G23)$ | 1.001 | 1.234 | 3.182 | 3.691 | 4.504 | 2.071 | 1.002 | 1.577 | 1.303 | 1.641 |
| $AAG_2/T2$ | 6.048 | 7.296 | 8.474 | 8.080 | 12.119 | 7.540 | 10.817 | 7.292 | 5.459 | 9.330 |
| $TL/(G23+T4)$ | 10.756 | 10.468 | 11.573 | 11.262 | 10.460 | 6.329 | 7.318 | 6.574 | 7.416 | 6.915 |
| $(G34+T4+G45)/T6$ | 2.303 | 2.244 | 2.732 | 4.299 | 3.900 | 3.353 | 3.991 | 4.299 | 3.879 | 4.299 |
| $TTL/(T2+G23)$ | 9.762 | 14.156 | 13.407 | 14.006 | 15.855 | 11.865 | 11.967 | 9.817 | 9.844 | 12.226 |
| $T6/Tmin$ | 3.935 | 2.999 | 2.999 | 1.888 | 2.999 | 2.738 | 2.220 | 1.487 | 1.261 | 1.959 |
| $ALT/Tmin$ | 13.244 | 11.870 | 13.568 | 13.674 | 16.999 | 11.764 | 11.643 | 8.549 | 7.936 | 10.603 |
| $TTL/(AAG_2+BFL)$ | 1.612 | 1.859 | 1.841 | 1.811 | 1.854 | 1.827 | 1.695 | 1.737 | 1.869 | 1.711 |
| $EFLA/(T2+G23)$ | 6.791 | 8.934 | 8.469 | 8.996 | 9.911 | 7.371 | 7.373 | 6.177 | 5.102 | 7.694 |
| $T6/G56$ | 1.562 | 3.247 | 2.989 | 2.286 | 3.399 | 3.192 | 1.986 | 1.465 | 3.298 | 1.623 |
| $AAG_2/(T3+T5)$ | 2.520 | 1.285 | 1.913 | 1.879 | 2.493 | 2.610 | 2.730 | 2.889 | 2.343 | 2.998 |
| $TTL/ALT$ | 2.473 | 2.068 | 2.048 | 2.015 | 2.062 | 2.122 | 2.322 | 2.256 | 2.079 | 2.284 |
| $EFL/EFLA$ | 1.262 | 1.305 | 1.492 | 1.535 | 1.536 | 1.485 | 1.562 | 1.526 | 1.374 | 1.541 |
| $TTL/Tavg$ | 14.836 | 12.409 | 12.288 | 12.091 | 12.372 | 12.732 | 13.934 | 13.539 | 12.475 | 13.702 |
| $TL/(Tmax+Tmin)$ | 6.636 | 4.284 | 5.703 | 4.846 | 4.741 | 6.677 | 7.404 | 6.236 | 5.429 | 6.670 |
| $BFL/Tmax$ | 2.089 | 1.234 | 1.491 | 1.318 | 1.021 | 1.781 | 1.937 | 1.821 | 1.559 | 1.834 |

FIG. 49

OPTICAL IMAGING LENS

BACKGROUND OF THE INVENTION

1. Field of the Invention

The present invention generally relates to an optical imaging lens. Specifically speaking, the present invention is directed to an optical imaging lens for use in portable electronic devices, such as a mobile phone, a camera, a tablet personal computer, or for use in a vehicle device, in a head-mounted display device (AR, VR, MR) and for taking pictures or for recording videos.

2. Description of the Prior Art

Over the years, an optical imaging lens is evolving and has a wider range of applications. In addition to being small in size, the demands for a video recording function of electronic products are also increasing.

However, the arrangement of multiple lenses takes up more space when a photographic system is composed of multiple lenses of different functions and further supplemented by software processing so a picture discontinuation may occur when lenses of different functions switch in the recording process. Therefore, using a single lens to meet different photographic needs and to design a lens which is light, thin, small and short, to have an infinite object distance, and to be capable of macro focusing as well has become a present issue which is urgently needed to be solved.

SUMMARY OF THE INVENTION

In the light of the above, various embodiments of the present invention propose an optical imaging lens of six lens elements which is light, thin, small and short, has excellent imaging quality, has good optical performance, has an infinite object distance, is capable of macro focusing and is technically possible. The optical imaging lens of the present invention from an object side to an image side in order along an optical axis has a first lens element, a second lens element, a third lens element, a fourth lens element, a fifth lens element and a sixth lens element. Each of the first lens element, the second lens element, the third lens element, the fourth lens element, the fifth lens element and the sixth lens element respectively has an object-side surface which faces toward the object side and allows imaging rays to pass through as well as an image-side surface which faces toward the image side and allows the imaging rays to pass through. The distances of the air gaps between adjacent the first lens element, the second lens element, the third lens element, the fourth lens element, the fifth lens element and the sixth lens element may be variable so the optical imaging lens is able to correspondingly form a first focusing state and a second focusing state when an object moves from an infinite distance to a close distance.

In one embodiment of the present application, the first lens element has positive refracting power, a periphery region of the image-side surface of a fifth lens element is concave, an optical axis region of the image-side surface of the sixth lens element is concave and a periphery region of the image-side surface of the sixth lens element is convex. Lens elements included by the optical imaging lens are only six lens elements to satisfy TTL*ΔHFOV/ΔG≤19.500 degrees.

In another embodiment of the present application, the first lens element has positive refracting power, an optical axis region of the object-side surface of the second lens element is convex, an optical axis region of the object-side surface of the fifth lens element is concave, a periphery region of the image-side surface of a fifth lens element is concave and a periphery region of the image-side surface of the sixth lens element is convex. Lens elements included by the optical imaging lens are only six lens elements to satisfy TTL*ΔHFOV/ΔG≤19.500 degrees.

In still another embodiment of the present application, the first lens element has positive refracting power, a periphery region of the object-side surface of the second lens element is convex, an optical axis region of the object-side surface of the fifth lens element is concave, a periphery region of the image-side surface of a fifth lens element is concave and a periphery region of the image-side surface of the sixth lens element is convex. Lens elements included by the optical imaging lens are only six lens elements to satisfy TTL*ΔHFOV/ΔG≤19.500 degrees.

In still another embodiment of the present application, the first lens element has positive refracting power, the third lens element has positive refracting power or an optical axis region of the image-side surface of the third lens element is convex or a periphery region of the image-side surface of a fifth lens element is concave, an optical axis region of the image-side surface of the sixth lens element is concave and a periphery region of the image-side surface of the sixth lens element is convex. Lens elements included by the optical imaging lens are only six lens elements to satisfy EFL/EFLA≥1.300.

In still another embodiment of the present application, the second lens element has negative refracting power, an optical axis region of the image-side surface of the sixth lens element is concave and a periphery region of the image-side surface of the sixth lens element is convex. Lens elements included by the optical imaging lens are only six lens elements to satisfy EFL/EFLA≥1.300.

In the optical imaging lens of the present invention, the embodiments may also selectively satisfy the following numerical conditions:

$$TTL/(AAG+BFL) \leq 1.900;$$

$$(T1+G12+T2)/T6 \leq 3.300;$$

$$ALT/(G34+T4) \leq 5.800;$$

$$AAG/(T3+T5) \leq 3.000;$$

$$(T2+G23+T3)/G56 \leq 7.000;$$

$$T6/Tmin \leq 3.000;$$

$$TTL/(T2+G23) \geq 10.000;$$

$$(G34+T4+G45)/T6 \leq 4.300;$$

$$TL/(G23+T4) \geq 5.000;$$

$$AAG/T2 \geq 3.500;$$

$$T1/(G12+G23) \geq 1.000;$$

$$(\upsilon4+\upsilon5)/\upsilon6 \leq 1.700;$$

$$TTL/BFL \leq 5.500;$$

$$T6/G56 \leq 3.400;$$

$EFL/(T2+G23) \geq 7.000;$ $ALT/Tmin \leq 17.000;$ $(T3+T4)/(G23+T5) \geq 1.000;$ $TTL/ALT \leq 2.800;$ $TTL/Tavg \leq 15.000;$ $TL/(Tmax+Tmin) \leq 7.500;$ $BFL/Tmax \leq 4.000.$ Wherein, T1 is a thickness of the first lens element along the optical axis; T2 is a thickness of the second lens element along the optical axis; T3 is a thickness of the third lens element along the optical axis; T4 is a thickness of the fourth lens element along the optical axis; T5 is a thickness of the fifth lens element along the optical axis; and T6 is a thickness of the sixth lens element along the optical axis. G12 is an air gap between the first lens element and the second lens element along the optical axis; G23 is an air gap between the second lens element and the third lens element along the optical axis; G34 is an air gap between the third lens element and the fourth lens element along the optical axis; G45 is an air gap between the fourth lens element and the fifth lens element along the optical axis; G56 is an air gap between the fifth lens element and the sixth lens element along the optical axis. AAG is a sum of five air gaps from the first lens element to the sixth lens element along the optical axis. $\Delta G$ is an absolute value of a difference of a sum of five air gaps of the optical imaging lens between the first focusing state $AAG_1$ and the second focusing state $AAG_2$, i.e. $\Delta G=|AAG_1-AAG_2|$.

It is further defined that $\upsilon4$ is an Abbe number of the fourth lens element, $\upsilon5$ is an Abbe number of the fifth lens element and $\upsilon6$ is an Abbe number of the sixth lens element. ALT is a sum of thicknesses of all the six lens elements along the optical axis. Tmax is the maximal thickness of the six lens elements from the first lens element to the sixth lens element along the optical axis, i.e. the maximal thickness of T1, T2, T3, T4, T5 and T6. Tmin is the minimal thickness of the six lens elements from the first lens element to the sixth lens element along the optical axis, i.e. the minimal thickness of T1, T2, T3, T4, T5 and T6. Tavg is an average value of the six lens elements from the first lens element to the sixth lens element along the optical axis, i.e. Tavg=ALT/6. TL is a distance from the object-side surface of the first lens element to the image-side surface of the sixth lens element along the optical axis. TTL is a distance from the object-side surface of the first lens element to an image plane along the optical axis. BFL is a distance from the image-side surface of the sixth lens element to the image plane along the optical axis. EFL is an effective focal length of the first focusing state and EFLA is an effective focal length of the second focusing state. $\Delta$HFOV is an absolute value of a difference of the half field of view of the optical imaging lens between the first focusing state and the second focusing state.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 7A illustrates the longitudinal spherical aberration on the image plane at the first focusing state of the first embodiment.

FIG. 7B illustrates the field curvature aberration on the sagittal direction at the first focusing state of the first embodiment.

FIG. 7C illustrates the field curvature aberration on the tangential direction at the first focusing state of the first embodiment.

FIG. 7D illustrates the distortion aberration at the first focusing state of the first embodiment.

FIG. 7E illustrates the longitudinal spherical aberration on the image plane at the second focusing state of the first embodiment.

FIG. 7F illustrates the field curvature aberration on the sagittal direction at the second focusing state of the first embodiment.

FIG. 7G illustrates the field curvature aberration on the tangential direction at the second focusing state of the first embodiment.

FIG. 7H illustrates the distortion aberration at the second focusing state of the first embodiment.

FIG. 9A illustrates the longitudinal spherical aberration on the image plane at the first focusing state of the second embodiment.

FIG. 9B illustrates the field curvature aberration on the sagittal direction at the first focusing state of the second embodiment.

FIG. 9C illustrates the field curvature aberration on the tangential direction at the first focusing state of the second embodiment.

FIG. 9D illustrates the distortion aberration at the first focusing state of the second embodiment.

FIG. 9E illustrates the longitudinal spherical aberration on the image plane at the second focusing state of the second embodiment.

FIG. 9F illustrates the field curvature aberration on the sagittal direction at the second focusing state of the second embodiment.

FIG. 9G illustrates the field curvature aberration on the tangential direction at the second focusing state of the second embodiment.

FIG. 9H illustrates the distortion aberration at the second focusing state of the second embodiment.

FIG. 13A illustrates the longitudinal spherical aberration on the image plane at the first focusing state of the fourth embodiment.

FIG. 13B illustrates the field curvature aberration on the sagittal direction at the focusing state of the fourth embodiment.

FIG. 13C illustrates the field curvature aberration on the tangential direction at the first focusing state of the fourth embodiment.

FIG. 13D illustrates the distortion aberration at the first focusing state of the fourth embodiment.

FIG. 13E illustrates the longitudinal spherical aberration on the image plane at the second focusing state of the fourth embodiment.

FIG. 13F illustrates the field curvature aberration on the sagittal direction at the second focusing state of the fourth embodiment.

FIG. 13G illustrates the field curvature aberration on the tangential direction at the second focusing state of the fourth embodiment.

FIG. 13H illustrates the distortion aberration at the second focusing state of the fourth embodiment.

FIG. 17A illustrates the longitudinal spherical aberration on the image plane at the first focusing state of the sixth embodiment.

FIG. 17B illustrates the field curvature aberration on the sagittal direction at the first focusing state of the sixth embodiment.

FIG. 17C illustrates the field curvature aberration on the tangential direction at the first focusing state of the sixth embodiment.

FIG. 17D illustrates the distortion aberration at the first focusing state of the sixth embodiment.

FIG. 17E illustrates the longitudinal spherical aberration on the image plane at the second focusing state of the sixth embodiment.

FIG. 17F illustrates the field curvature aberration on the sagittal direction at the second focusing state of the sixth embodiment.

FIG. 17G illustrates the field curvature aberration on the tangential direction at the second focusing state of the sixth embodiment.

FIG. 17H illustrates the distortion aberration at the second focusing state of the sixth embodiment.

FIG. 19A illustrates the longitudinal spherical aberration on the image plane at the first focusing state of the seventh embodiment.

FIG. 19B illustrates the field curvature aberration on the sagittal direction at the first focusing state of the seventh embodiment.

FIG. 19C illustrates the field curvature aberration on the tangential direction at the first focusing state of the seventh embodiment.

FIG. 19D illustrates the distortion aberration at the first focusing state of the seventh embodiment.

FIG. 19E illustrates the longitudinal spherical aberration on the image plane at the second focusing state of the seventh embodiment.

FIG. 19F illustrates the field curvature aberration on the sagittal direction at the second focusing state of the seventh embodiment.

FIG. 19G illustrates the field curvature aberration on the tangential direction at the second focusing state of the seventh embodiment.

FIG. 19H illustrates the distortion aberration at the second focusing state of the seventh embodiment.

FIG. 21A illustrates the longitudinal spherical aberration on the image plane at the first focusing state of the eighth embodiment.

FIG. 21B illustrates the field curvature aberration on the sagittal direction at the first focusing state of the eighth embodiment.

FIG. 21C illustrates the field curvature aberration on the tangential direction at the first focusing state of the eighth embodiment.

FIG. 21D illustrates the distortion aberration at the first focusing state of the eighth embodiment.

FIG. 21E illustrates the longitudinal spherical aberration on the image plane at the second focusing state of the eighth embodiment.

FIG. 21F illustrates the field curvature aberration on the sagittal direction at the second focusing state of the eighth embodiment.

FIG. 21G illustrates the field curvature aberration on the tangential direction at the second focusing state of the eighth embodiment.

FIG. 21H illustrates the distortion aberration at the second focusing state of the eighth embodiment.

FIG. 23A illustrates the longitudinal spherical aberration on the image plane at the first focusing state of the ninth embodiment.

FIG. 23B illustrates the field curvature aberration on the sagittal direction at the first focusing state of the ninth embodiment.

FIG. 23C illustrates the field curvature aberration on the tangential direction at the first focusing state of the ninth embodiment.

FIG. 23D illustrates the distortion aberration at the first focusing state of the ninth embodiment.

FIG. 23E illustrates the longitudinal spherical aberration on the image plane at the second focusing state of the ninth embodiment.

FIG. 23F illustrates the field curvature aberration on the sagittal direction at the second focusing state of the ninth embodiment.

FIG. 23G illustrates the field curvature aberration on the tangential direction at the second focusing state of the ninth embodiment.

FIG. 23H illustrates the distortion aberration at the second focusing state of the ninth embodiment.

FIG. 25A illustrates the longitudinal spherical aberration on the image plane at the first focusing state of the tenth embodiment.

FIG. 25B illustrates the field curvature aberration on the sagittal direction at the first focusing state of the tenth embodiment.

FIG. 25C illustrates the field curvature aberration on the tangential direction at the first focusing state of the tenth embodiment.

FIG. 25D illustrates the distortion aberration at the first focusing state of the tenth embodiment.

FIG. 25E illustrates the longitudinal spherical aberration on the image plane at the second focusing state of the tenth embodiment.

FIG. 25F illustrates the field curvature aberration on the sagittal direction at the second focusing state of the tenth embodiment.

FIG. 25G illustrates the field curvature aberration on the tangential direction at the second focusing state of the tenth embodiment.

FIG. 25H illustrates the distortion aberration at the second focusing state of the tenth embodiment.

FIG. 26 shows the optical data of the first embodiment of the optical imaging lens.

FIG. 27 shows the aspheric surface data of the first embodiment.

FIG. 28 shows the optical data of the second embodiment of the optical imaging lens.

FIG. 29 shows the aspheric surface data of the second embodiment.

FIG. 30 shows the optical data of the third embodiment of the optical imaging lens.

FIG. 31 shows the aspheric surface data of the third embodiment.

FIG. 32 shows the optical data of the fourth embodiment of the optical imaging lens.

FIG. 33 shows the aspheric surface data of the fourth embodiment.

FIG. 34 shows the optical data of the fifth embodiment of the optical imaging lens.

FIG. 35 shows the aspheric surface data of the fifth embodiment.

FIG. 36 shows the optical data of the sixth embodiment of the optical imaging lens.

FIG. 37 shows the aspheric surface data of the sixth embodiment.

FIG. 38 shows the optical data of the seventh embodiment of the optical imaging lens.

FIG. 39 shows the aspheric surface data of the seventh embodiment.

FIG. 40 shows the optical data of the eighth embodiment of the optical imaging lens.

FIG. 41 shows the aspheric surface data of the eighth embodiment.

FIG. 42 shows the optical data of the ninth embodiment of the optical imaging lens.

FIG. 43 shows the aspheric surface data of the ninth embodiment.

FIG. 44 shows the optical data of the tenth embodiment of the optical imaging lens.

FIG. 45 shows the aspheric surface data of the tenth embodiment.

FIG. 46 shows some important parameter and ratios in the embodiments of the first focusing state.

FIG. 47 shows some important parameter and ratios in the embodiments of the first focusing state.

FIG. 48 shows some important parameter and ratios in the embodiments of the second focusing state.

FIG. 49 shows some important parameter and ratios in the embodiments of the second focusing state.

DETAILED DESCRIPTION

The terms "optical axis region", "periphery region", "concave", and "convex" used in this specification and claims should be interpreted based on the definition listed in the specification by the principle of lexicographer.

Figure 1:
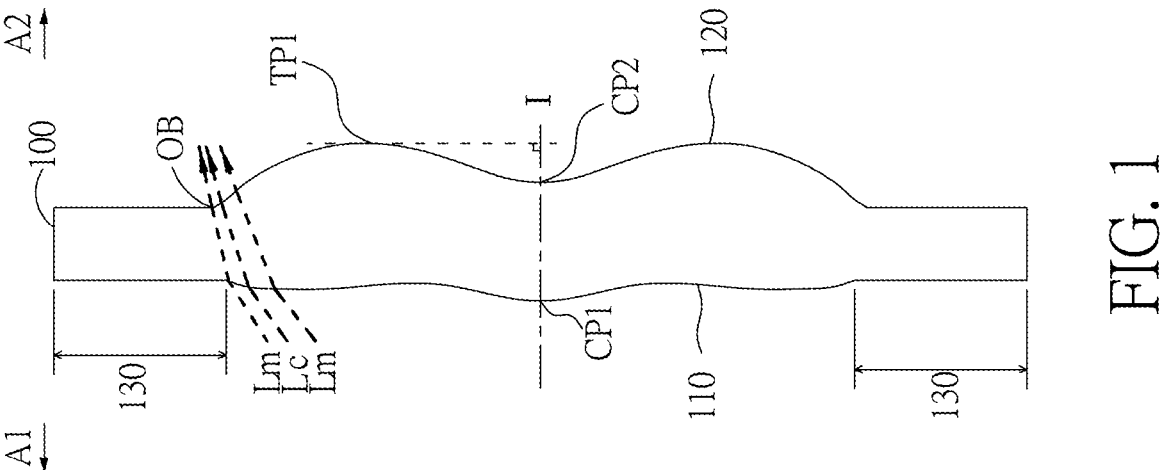

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figures 3, 4, 5:
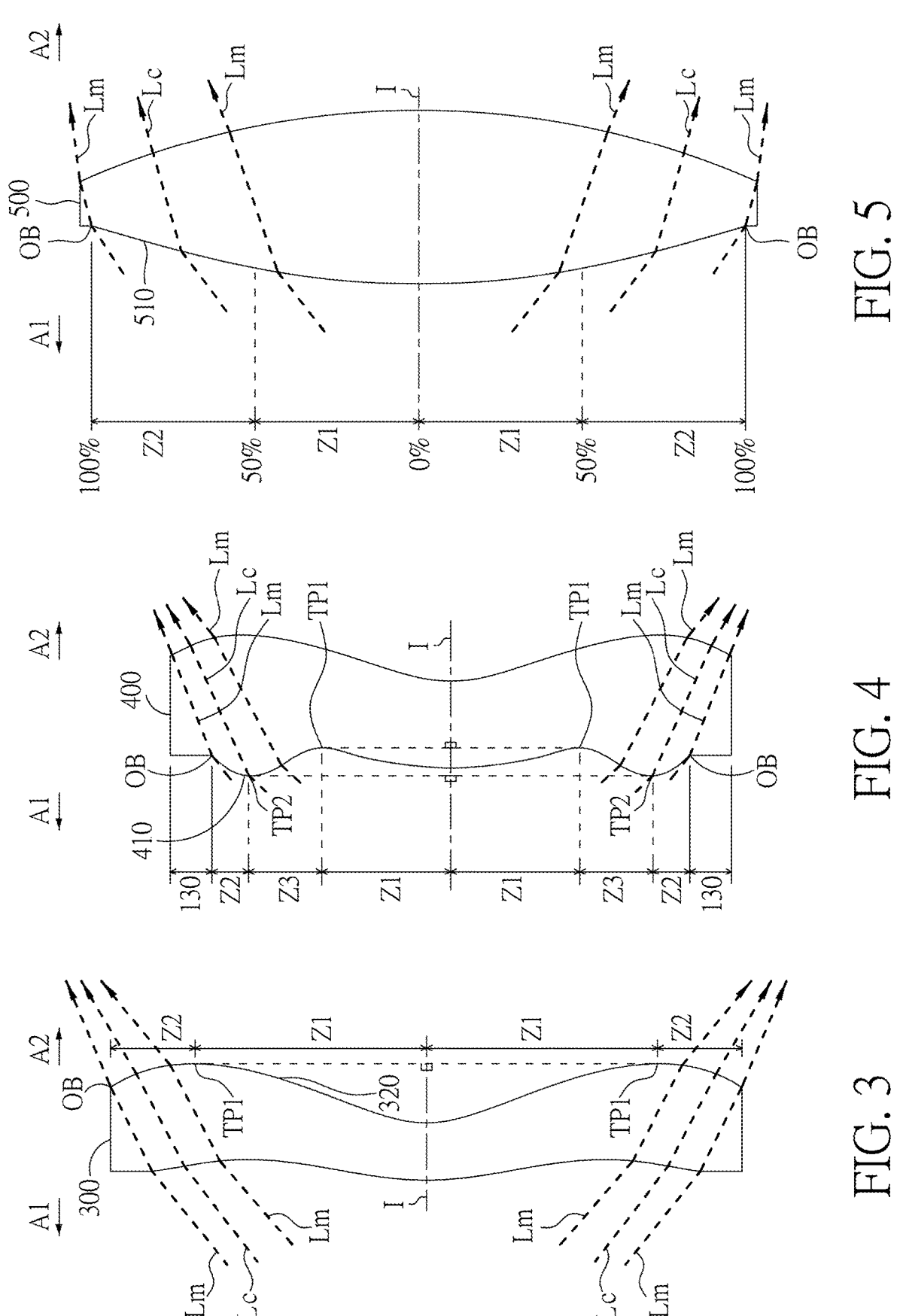

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. A surface of the lens element 100 may have no transition point or have at least one transition point. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

When a surface of the lens element has at least one transition point, the region of the surface of the lens element from the central point to the first transition point TP1 is defined as the optical axis region, which includes the central point. The region located radially outside of the farthest transition point (the Nth transition point) from the optical axis I to the optical boundary OB of the surface of the lens element is defined as the periphery region. In some embodiments, there may be intermediate regions present between the optical axis region and the periphery region, with the number of intermediate regions depending on the number of the transition points. When a surface of the lens element has no transition point, the optical axis region is defined as a region of 0%-50% of the distance between the optical axis I and the optical boundary OB of the surface of the lens element, and the periphery region is defined as a region of 50%-100% of the distance between the optical axis I and the optical boundary OB of the surface of the lens element.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
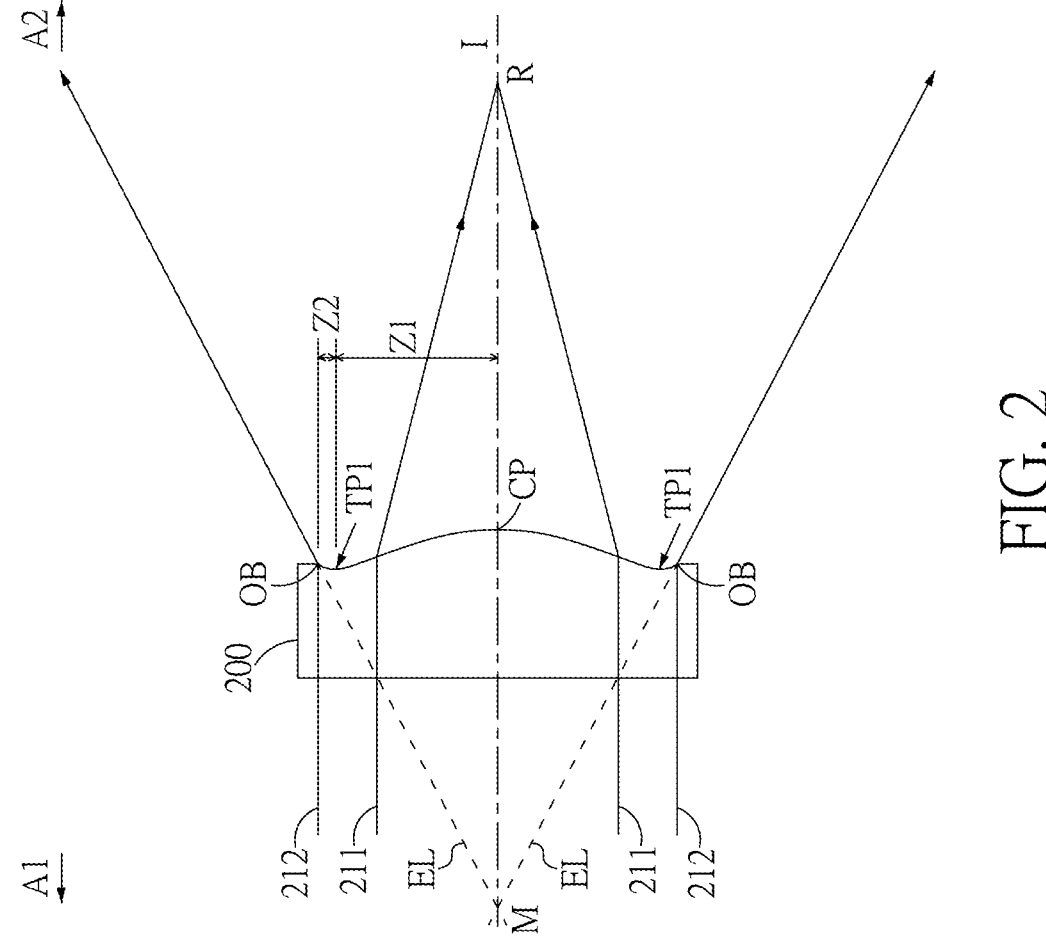
FIGS. 1-5 illustrate the methods for determining the surface shapes and for determining an optical axis region and a periphery region of one lens element.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges d after passing through periphery region Z2. The extension line EL of collimated ray 212 after passing through periphery region Z2 intersects the optical axis I on the object side A1 of lens element 200, i.e., the focal point of collimated ray 212 after passing through periphery region 22 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius of curvature" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex- (concave-) region," can be used alternatively.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region (s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region 22 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region of 0%-50% of the distance between the optical axis I and the optical boundary OB of the surface of the lens element and the periphery region is defined as the region of 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

Figure 6:
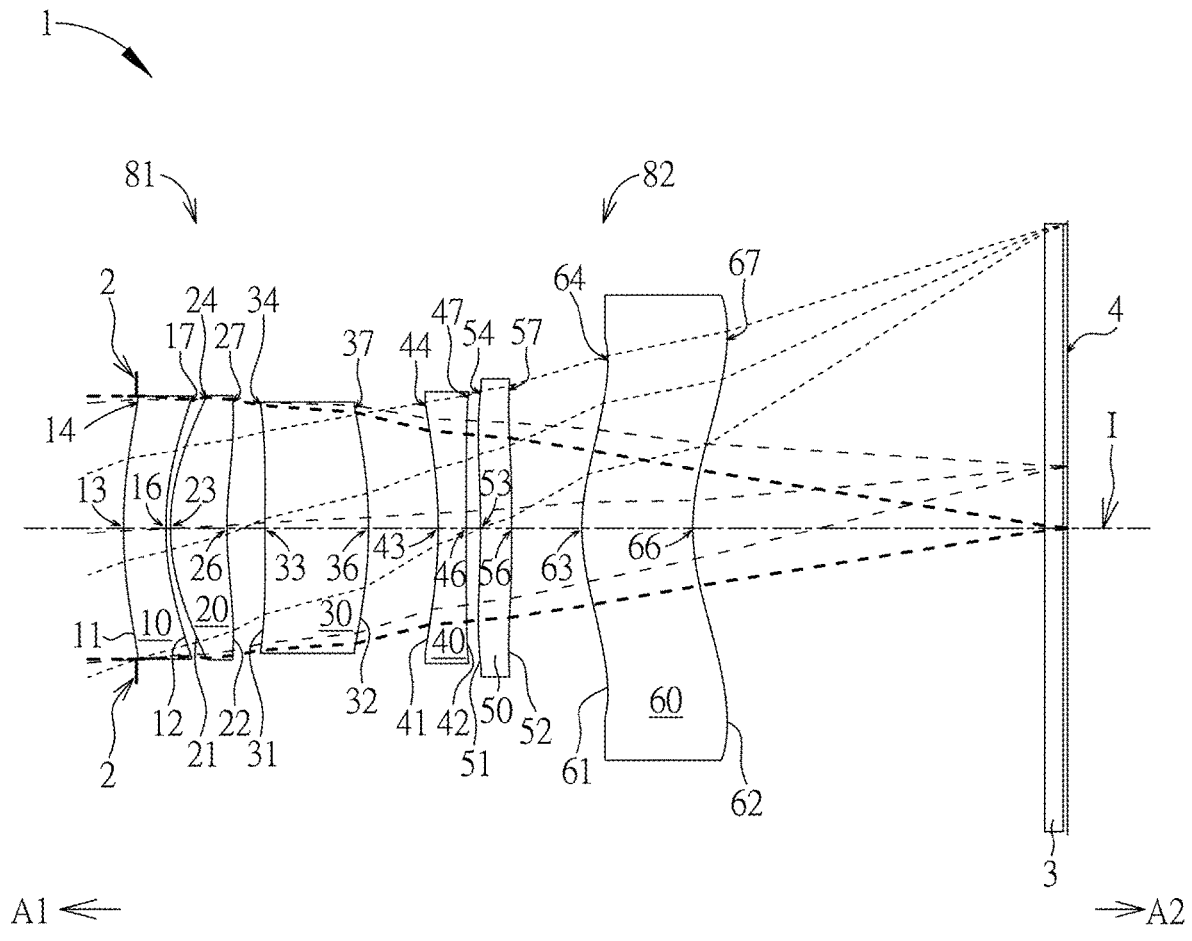
FIG. 6 illustrates a first embodiment of the optical imaging lens of the present invention.

As shown in FIG. 6, the optical imaging lens 1 of six lens elements of the present invention, located from an object side A1 (where an object is located) to an image side A2 along an optical axis I, is mainly composed of six lens elements, sequentially has an aperture stop 2, a first lens element 10, a second lens element 20, a third lens element 30, a fourth lens element 40, a fifth lens element 50, a sixth lens element 60 and an image plane 4. In one embodiment of the present invention, the optical imaging lens 1 sequentially has an aperture stop 2, a front lens group 81, a rear lens group 82 and an image plane 4. The number of lens elements in the front lens group 81 or in the rear lens group 82 in the optical imaging lens 1 may be variable. In another embodiment of the present invention, the front lens group 81 may include at least two lens elements. For instance, the front lens group 81 may include at least the first lens element 10 and the second lens element 20, but the present invention is not limited thereto. In another embodiment of the present invention, the rear lens group 82 may include at least two lens elements. For example, the rear lens group 82 may include at least the fifth lens element 50 and the sixth lens element 60, but the present invention is not limited thereto.

The rear lens group 82 may enable the optical imaging lens 1 to form different focusing states, for example to form a first focusing state and a second focusing state by moving along the optical axis I. The first focusing state and the second focusing state may be one of an infinite object distance and a finite object distance. In one embodiment of the present invention, the first focusing state may have the infinite object distance. In another embodiment of the present invention, the second focusing state may have the finite object distance, for example a macro focusing state, but the present invention is not limited thereto.

Generally speaking, the first lens element 10, the second lens element 20, the third lens element 30, the fourth lens element 40, the fifth lens element 50 and the sixth lens element 60 may be made of a transparent plastic material but the present invention is not limited to this. In the optical imaging lens 1 of the present invention, lens elements having refracting power included by the optical imaging lens 1 are only the six lens elements (the first lens element 10, the second lens element 20, the third lens element 30, the fourth lens element 40, the fifth lens element 50 and the sixth lens element 60) described above. The optical axis I is the optical axis of the entire optical imaging lens 1, and the optical axis of each of the lens elements coincides with the optical axis I of the optical imaging lens 1.

Furthermore, the optical imaging lens 1 further includes an aperture stop (ape. stop) 2 disposed in an appropriate position. In FIG. 6, the aperture stop 2 is disposed at the side of the first lens element 10 facing the object side A1, in other words, between the object side A1 and the first lens element 10. When imaging rays emitted or reflected by an object (not shown) which is located at the object side A1 enters the optical imaging lens 1 of the present invention, the imaging rays form a clear and sharp image on the image plane 4 at the image side A2 after passing through the aperture stop 2, the first lens element 10, the second lens element 20, the third lens element 30, the fourth lens element 40, the fifth lens element 50, the sixth lens element 60, and a filter 3. In various embodiments of the present invention, the filter 3 may be a filter of various suitable functions, placed between the sixth lens element 60 and the image plane 4 to filter out light of a specific wavelength, for some embodiments, the filter 3 may be an infrared cut filter (infrared cut-off filter), to keep the infrared light in the imaging rays from reaching the image plane 4 to jeopardize the imaging quality.

Each lens element of the optical imaging lens 1 has an object-side surface facing toward the object side A1 and allowing imaging rays to pass through as well as an image-side surface facing toward the image side A2 and allowing the imaging rays to pass through. In addition, each lens element of the optical imaging lens 1 has an optical axis region and a periphery region. For example, the first lens element 10 has an object-side surface 11 and an image-side surface 12; the second lens element 20 has an object-side surface 21 and an image-side surface 22; the third lens element 30 has an object-side surface 31 and an image-side surface 32; the fourth lens element 40 has an object-side surface 41 and an image-side surface 42; the fifth lens element 50 has an object-side surface 51 and an image-side surface 52; the sixth lens element 60 has an object-side surface 61 and an image-side surface 62. Furthermore, each object-side surface and image-side surface of lens elements in the optical imaging lens of present invention has an optical axis region and a periphery region.

Each lens element in the optical imaging lens 1 of the present invention further has a thickness T along the optical axis I. For embodiment, the first lens element 10 has a first lens element thickness T1, the second lens element 20 has a second lens element thickness T2, the third lens element 30 has a third lens element thickness T3, the fourth lens element 40 has a fourth lens element thickness T4, the fifth lens element 50 has a fifth lens element thickness T5, and the sixth lens element 60 has a sixth lens element thickness T6. Therefore, a sum of thicknesses of all the six lens elements from the first lens element 10 to the sixth lens element 60 in the optical imaging lens 1 along the optical axis I is ALT. In other words, ALT=T1+T2+T3+T4+T5+T6. Tmax is the maximal thickness of the six lens elements from the first lens element to the sixth lens element along the optical axis, i.e. the maximal thickness of T1, T2, T3, T4, T5 and T6. Tmin is the minimal thickness of the six lens elements from the first lens element to the sixth lens element along the optical axis, i.e. the minimal thickness of T1, T2, T3, T4, T5 and T6. Tavg is an average value of the six lens elements from the first lens element to the sixth lens element along the optical axis, i.e. Tavg=ALT/6.

In addition, between two adjacent lens elements in the optical imaging lens 1 of the present invention there may be an air gap along the optical axis I. For example, there is an air gap G12 between the first lens element 10 and the second lens element 20, an air gap G23 between the second lens element 20 and the third lens element 30, an air gap G34 between the third lens element 30 and the fourth lens element 40, an air gap G45 between the fourth lens element 40 and the fifth lens element 50 as well as an air gap G56 between the fifth lens element 50 and the sixth lens element 60. Therefore, a sum of five air gaps from the first lens element 10 to the sixth lens element 60 along the optical axis I is AAG. In other words, AAG=G12+G23+G34+G45+G56. $AAG_1$ is a sum of the air gap distances of the optical imaging lens 1 along the optical axis I at the first focusing state, and $AAG_2$ is a sum of the air gap distances of the optical imaging lens 1 along the optical axis I at the second focusing state while ΔG is an absolute value of a difference of a sum of the air gap distances of the optical imaging lens 1 between the first focusing state $AAG_1$ and the second focusing state $AAG_2$, i.e. $ΔG=|AAG_1-AAG_2|$.

In addition, a distance from the object-side surface 11 of the first lens element 10 to the image plane 4, namely a system length of the optical imaging lens 1 along the optical axis I is TTL. A distance from the object-side surface 11 of the first lens element 10 to the image-side surface 62 of the sixth lens element 60 along the optical axis I is TL. ImgH is an image height of the optical imaging lens 1. Fno is the f-number of the optical imaging lens 1. EFL is an effective focal length of the optical imaging lens 1 at the first focusing state and EFLA is an effective focal length of the optical imaging lens 1 at the second focusing state when the rear lens group 82 in the optical imaging lens 1 moves along the optical axis I. HFOV stands for the half field of view of the optical imaging lens 1, i.e. half of the field of view. ΔHFOV is an absolute value of a difference of the half field of view of the optical imaging lens 1 between the first focusing state and the second focusing state. The focal length of the front lens group 8 is fG1 and the focal length of the rear lens group 82 is fG2.

When the filter 3 is placed between the sixth lens element 60 and the image plane 4, an air gap between the sixth lens element 60 and the filter 3 along the optical axis I is G6F; a thickness of the filter 3 along the optical axis I is TF; an air gap between the filter 3 and the image plane 4 along the optical axis I is GFP. BFL is the back focal length of the optical imaging lens 1, namely a distance from the image-side surface 62 of the sixth lens element 60 to the image plane 4 along the optical axis I. Therefore, BFL=G6F+TF+GFP.

Furthermore, a focal length of the first lens element 10 is f1; a focal length of the second lens element 20 is f2; a focal length of the third lens element 30 is f3; a focal length of the fourth lens element 40 is f4; a focal length of the fifth lens element 50 is f5; a focal length of the sixth lens element 60 is f6; a refractive index of the first lens element 10 is n1; a refractive index of the second lens element 20 is n2; a refractive index of the third lens element 30 is n3; a refractive index of the fourth lens element 40 is n4; a refractive index of the fifth lens element 50 is n5; a refractive index of the sixth lens element 60 is n6; an Abbe number of the first lens element 10 is υ1; an Abbe number of the second lens element 20 is υ; an Abbe number of the third lens element 30 is υ3; and an Abbe number of the fourth lens element 40 is υ4; an Abbe number of the fifth lens element 50 is υ5; and an Abbe number of the sixth lens element 60 is υ6.

First Embodiment

Please refer to FIG. 6 which illustrates the first embodiment of the optical imaging lens 1 of the present invention. Please refer to FIG. 7A for the longitudinal spherical aberration at the first focusing state on the image plane 4 of the first embodiment; please refer to FIG. 7B for the field curvature aberration at the first focusing state on the sagittal direction; please refer to FIG. 7C for the field curvature aberration at the first focusing state on the tangential direction; please refer to FIG. 7D for the distortion aberration at the first focusing state; please refer to FIG. 7E for the longitudinal spherical aberration on the image plane 4 at the second focusing state of the first embodiment; please refer to FIG. 7F for the field curvature aberration on the sagittal direction at the second focusing state; please refer to FIG. 7G for the field curvature aberration on the tangential direction at the second focusing state; and please refer to FIG. 7H for the distortion aberration at the second focusing state. The Y axis of the spherical aberration in each embodiment is "field of view" for 1.0. The Y axis of the field curvature aberration and the distortion aberration in each embodiment stands for the "image height" (ImgH), which is 3.500 mm.

The optical imaging lens 1 of the first embodiment is mainly composed of an aperture stop 2, the front lens group 81, the rear lens group 82 and the image plane 4. The aperture stop 2 is provided at the side of the first lens element 10 of the front lens group 81 facing the object side A1. There are total six lens elements having refracting power in the front lens group 81 and in the rear lens group 82, namely the first lens element 10, the second lens element 20, the third lens element 30, the fourth lens element 40, the fifth lens element 50 and the sixth lens element 60. Wherein the front lens group 81 includes the first lens element 10, the second lens element 20 and the third lens element 30; the rear lens group 82 includes the fourth lens element 40, the fifth lens element 50 and the sixth lens element 60.

The first lens element 10 has positive refracting power. An optical axis region 13 of the object-side surface 11 of the first lens element 10 is convex and a periphery region 14 of the object-side surface 11 of the first lens element 10 is convex. An optical axis region 16 of the first lens element 10 is concave and a periphery region 17 of the image-side surface 12 of the first lens element 10 is concave. Besides, both the object-side surface 11 and the image-side surface 12 of the first lens element 10 are aspherical surfaces, but it is not limited thereto.

The second lens element 20 has positive refracting power. An optical axis region 23 of the second lens element 20 is convex and a periphery region 24 of the object-side surface 21 of the second lens element 20 is convex. An optical axis region 26 of the image-side surface 22 of the second lens element 20 is concave and a periphery region 27 of the image-side surface 22 of the second lens element 20 is convex. Besides, both the object-side surface 21 and the image-side surface 22 of the second lens element 20 are aspherical surfaces, but it is not limited thereto.

The third lens element 30 has positive refracting power. An optical axis region 33 of the object-side surface 31 of the third lens element 30 is convex and a periphery region 34 of the object-side surface 31 of the third lens element 30 is concave. An optical axis region 36 of the image-side surface 32 of the third lens element 30 is convex and a periphery region 37 of the image-side surface 32 of the third lens element 30 is convex. Besides, both the object-side surface 31 and the image-side surface 32 of the third lens element 30 are aspherical surfaces, but it is not limited thereto.

The fourth lens element 40 has negative refracting power. An optical axis region 43 of the fourth lens element 40 is concave and a periphery region 44 of the object-side surface 41 of the fourth lens element 40 is concave. An optical axis region 46 of the image-side surface 42 of the fourth lens element 40 is convex and a periphery region 47 of the image-side surface 42 of the fourth lens element 40 is concave. Besides, both the object-side surface 41 and the image-side surface 42 of the fourth lens element 40 are aspherical surfaces, but it is not limited thereto.

The fifth lens element 50 has negative refracting power. An optical axis region 53 of the object-side surface 51 of the fifth lens element 50 is concave and a periphery region 54 of the object-side surface 51 of the fifth lens element 50 is convex. An optical axis region 56 of the image-side surface 52 of the fifth lens element 50 is convex and a periphery region 57 of the image-side surface 52 of the fifth lens element 50 is concave. Besides, both the object-side surface 51 and the image-side surface 52 of the fifth lens element 50 are aspherical surfaces, but it is not limited thereto.

The sixth lens element 60 has positive refracting power. An optical axis region 63 of the object-side surface 61 of the sixth lens element 60 is convex and a periphery region 64 of the object-side surface 61 of the sixth lens element 60 is concave. An optical axis region 66 of the image-side surface 62 of the sixth lens element 60 is concave and a periphery region 67 of the image-side surface 62 of the sixth lens element 60 is convex. Besides, both the object-side surface 61 and the image-side surface 62 of the sixth lens element 60 are aspherical surfaces, but it is not limited thereto.

In the optical imaging lens element 1 of the present invention, from the first lens element 10 to the sixth lens element 60, all the 12 surfaces, such as the object-side surfaces 11/21/31/41/51/61 and the image-side surfaces 12/22/32/42/52/62 are aspherical surfaces, but they are not limited thereto. If a surface is aspherical, these aspheric coefficients are defined according to the following formula:

$$Z(Y) = \frac{Y^2}{R} \left/ \left( 1 + \sqrt{1 - (1+K)\frac{Y^2}{R^2}} \right) + \sum_{i=1}^{n} a_i \times Y^i \right.$$

In which:

Y represents a vertical distance from a point on the aspherical surface to the optical axis I;

Z represents the depth of an aspherical surface (the perpendicular distance between the point of the aspherical surface at a distance Y from the optical axis I and the tangent plane of the vertex on the optical axis I of the aspherical surface);

R represents the radius of curvature of the lens element surface close to the optical axis I;

K is a conic constant; and $a_i$ is the aspheric coefficient of the $i^{th}$ order, and the $a_2$ coefficient in each embodiment is 0.

The optical data of the first embodiment of the optical imaging lens 1 are shown in FIG. 26 while the aspheric surface data are shown in FIG. 27. In the following embodiments of the system of the optical imaging lens 1, the f-number of the entire optical imaging lens is Fno, EFL is the effective focal length at the first focusing state and EFLA is the effective focal length at the second focusing state, HFOV stands for the half field of view of the entire optical imaging lens 1, and the unit for the image height, the radius of curvature, the thickness and the focal length is in millimeters (mm). In this embodiment, EFL=9.261 mm; EFLA=7.342 mm; Fno=3.070 at the first focusing state; Fno=2.434 at the second focusing state; HFOV=20.527 degrees at the first focusing state; HFOV=19.538 degrees at the second focusing state; the focal length fG1 of the front lens group 81=6.153 mm; the focal length fG2 of the rear lens group 82=−9.444 mm; TTL=10.553 mm; ImgH=3.500 mm.

Second Embodiment

Figure 8:
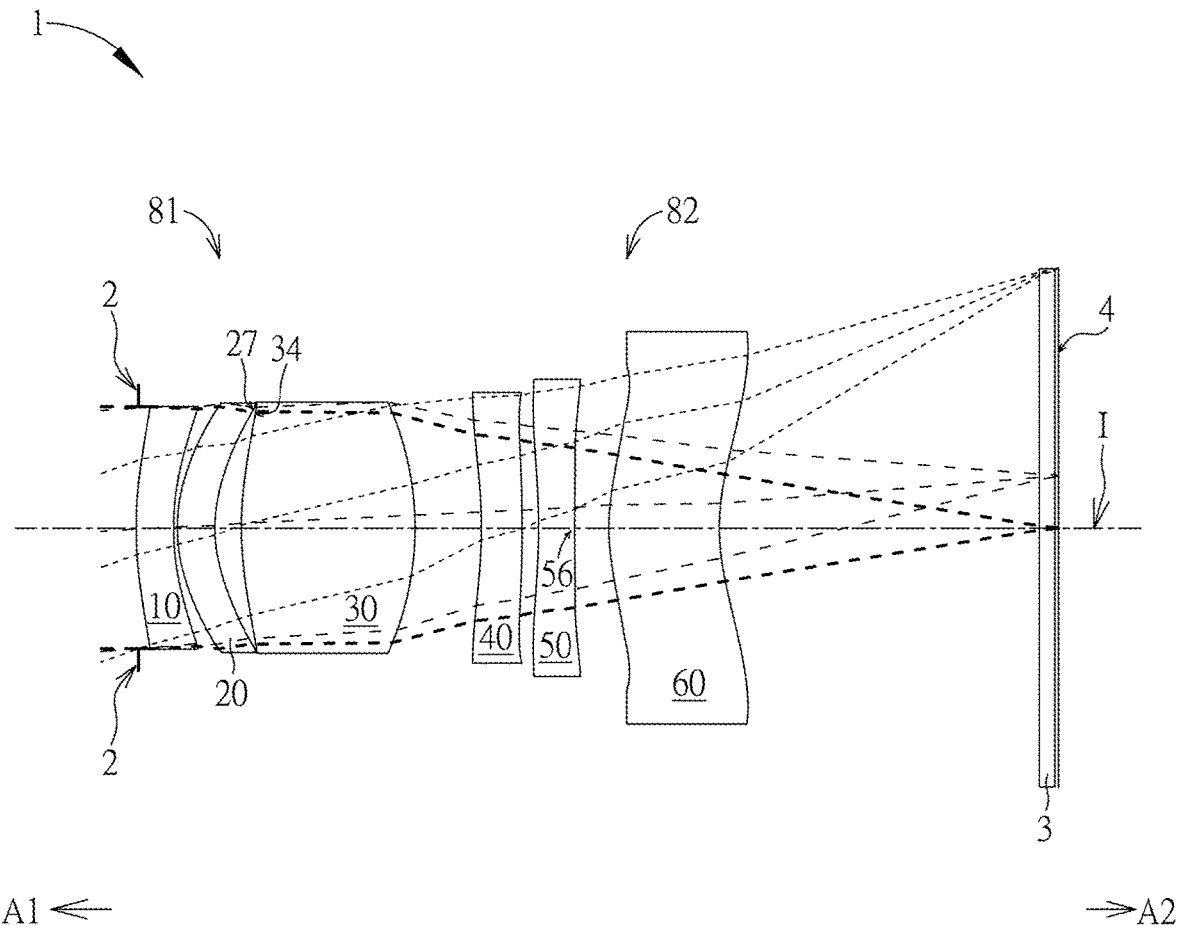
FIG. 8 illustrates a second embodiment of the optical imaging lens of the present invention.

Please refer to FIG. 8 which illustrates the second embodiment of the optical imaging lens 1 of the present invention. It is noted that from the second embodiment to the following embodiments, in order to simplify the figures, only the components different from what the first embodiment has, and the basic lens elements will be labeled in figures. Other components that are the same as what the first embodiment has, such as a convex surface or a concave surface, are omitted in the following embodiments. Please refer to FIG. 9A for the longitudinal spherical aberration on the image plane 4 at the first focusing state of the second embodiment, please refer to FIG. 9B for the field curvature aberration on the sagittal direction at the first focusing state, please refer to FIG. 9C for the field curvature aberration on the tangential direction at the first focusing state, please refer to FIG. 9D for the distortion aberration at the first focusing state, please refer to FIG. 9E for the longitudinal spherical aberration on the image plane 4 at the second focusing state of the second embodiment, please refer to FIG. 9F for the field curvature aberration on the sagittal direction at the second focusing state, please refer to FIG. 9G for the field curvature aberration on the tangential direction at the second focusing state, and please refer to FIG. 9H for the distortion aberration at the second focusing state. The components in this embodiment are similar to those in the first embodiment, but the optical data such as the refracting power, the radius of curvature, the lens element thickness, the surface aspheric coefficients or the back focal length in this embodiment are different from the optical data in the first embodiment. Besides, in this embodiment, the second lens element 20 has negative refracting power, the periphery region 27 of the image-side surface 22 of the second lens element 20 is concave, the periphery region 34 of the object-side surface 31 of the third lens element 30 is convex and the optical axis region 56 of the image-side surface 52 of the fifth lens element 50 is concave.

The optical data of the second embodiment of the optical imaging lens are shown in FIG. 28 while the aspheric surface data are shown in FIG. 29. In this embodiment, EFL=10.022 mm, EFLA=7.679 mm, Fno=3.070 at the first focusing state, Fno=2.352 at the second focusing state, HFOV=19.734 degrees at the first focusing state, HFOV=19.582 degrees at the second focusing state, the focal length fG1 of the front lens group 81=6.381 mm, the focal length fG2 of the rear lens group 82=−8.635 mm, TTL=11.872 mm, ImgH=3.500 mm. In particular, Fno of the optical imaging lens at the second focusing state in this embodiment is better than that of the optical imaging lens at the second focusing state in the first embodiment, TTL of the optical imaging lens in this embodiment is shorter than that of the optical imaging lens in the first embodiment, the longitudinal spherical aberration of the optical imaging lens at the first focusing state in this embodiment is better than that of the optical imaging lens in the first embodiment, the field curvature aberration on the sagittal direction of the optical imaging lens at the first focusing state in this embodiment is better than that on the sagittal direction of the optical imaging lens at the first focusing state in the first embodiment, the field curvature aberration on the tangential direction of the optical imaging lens at the first focusing state in this embodiment is better than that on the tangential direction of the optical imaging lens at the first focusing state in the first embodiment, the longitudinal spherical aberration of the optical imaging lens at the second focusing state in this embodiment is better than that of the optical imaging lens in the first embodiment, the field curvature aberration on the sagittal direction of the optical imaging lens at the second focusing state in this embodiment is better than that on the sagittal direction of the optical imaging lens at the second focusing state in the first embodiment, the field curvature aberration on the tangential direction of the optical imaging lens at the second focusing state in this embodiment is better than that on the tangential direction of the optical imaging lens at the second focusing state in the first embodiment, and the distortion aberration of the optical imaging lens at the second focusing state in this embodiment is better than that of the optical imaging lens at the second focusing state in the first embodiment.

Third Embodiment

Figure 10:
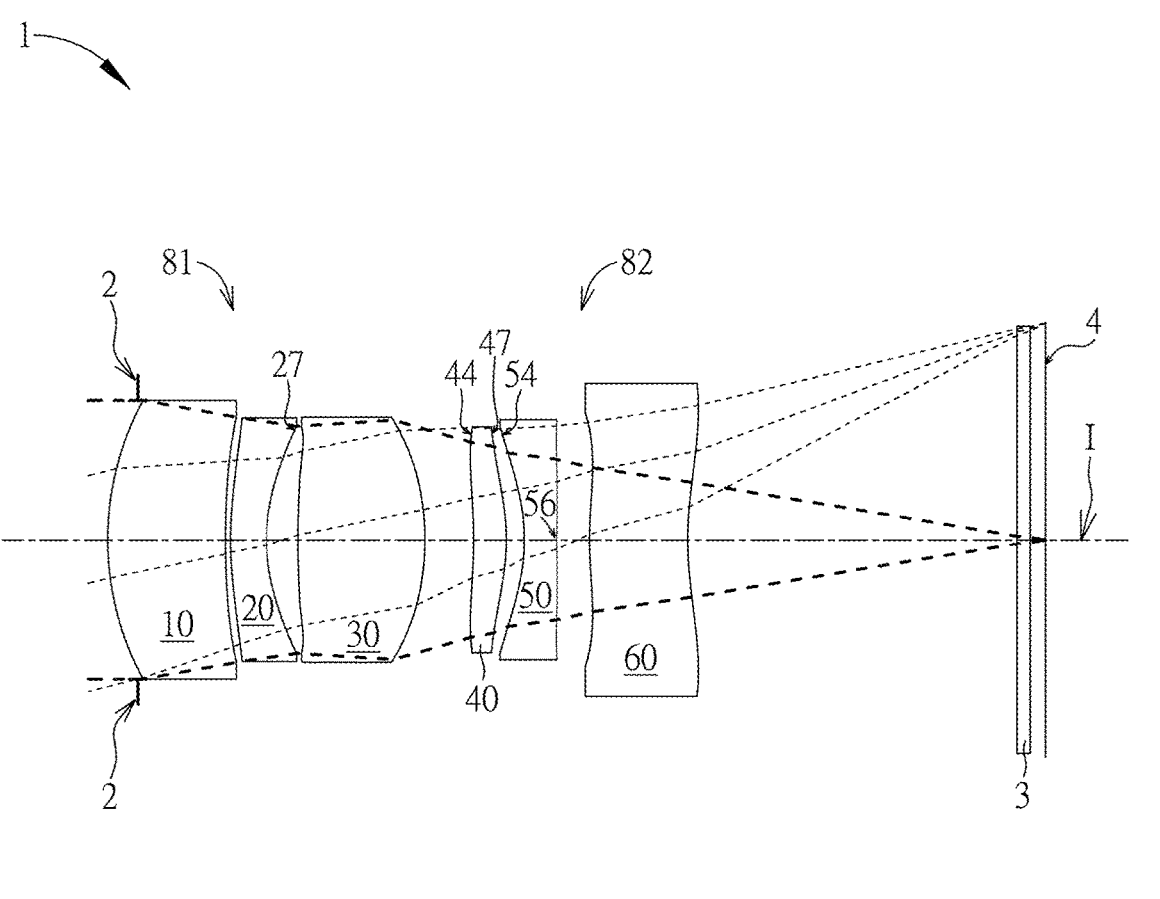
FIG. 10 illustrates a third embodiment of the optical imaging lens of the present invention.
Figures 11A, 11B, 11C, 11D:
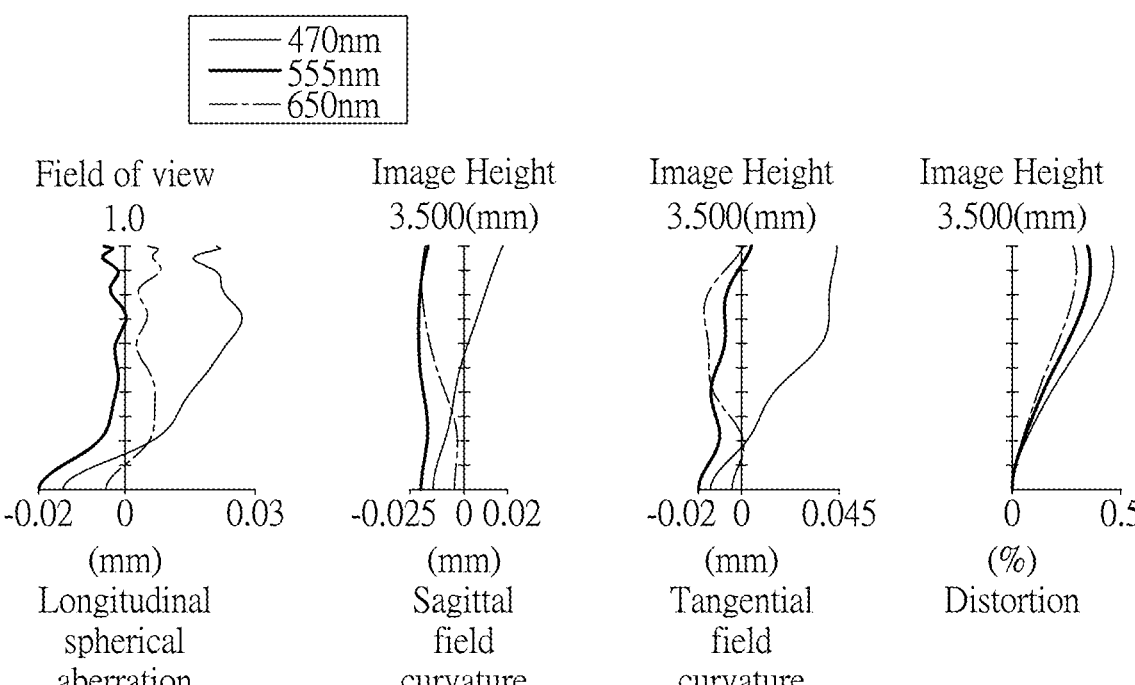
FIG. 11A illustrates the longitudinal spherical aberration on the image plane at the first focusing state of the third embodiment.
FIG. 11B illustrates the field curvature aberration on the sagittal direction at the first focusing state of the third embodiment.
FIG. 11C illustrates the field curvature aberration on the tangential direction at the first focusing state of the third embodiment.
FIG. 11D illustrates the distortion aberration at the first focusing state of the third embodiment.
Figures 11E, 11F, 11G, 11H:
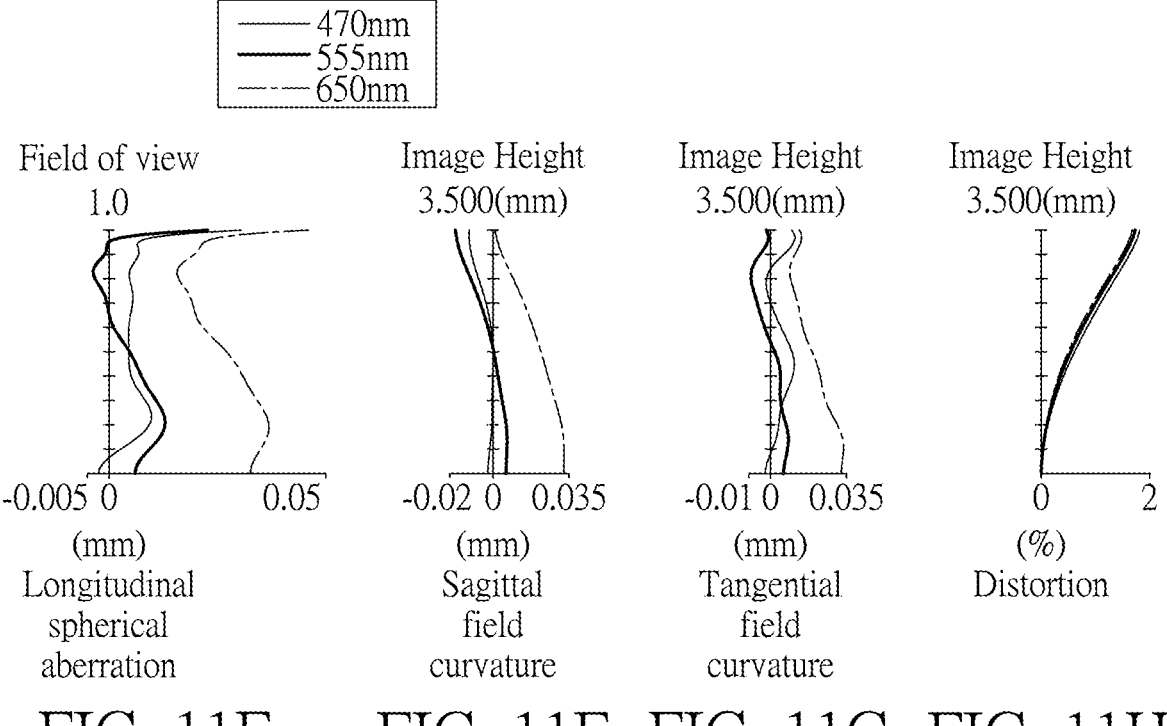
FIG. 11E illustrates the longitudinal spherical aberration on the image plane at the second focusing state of the third embodiment.
FIG. 11F illustrates the field curvature aberration on the sagittal direction at the second focusing state of the third embodiment.
FIG. 11G illustrates the field curvature aberration on the tangential direction at the second focusing state of the third embodiment.
FIG. 11H illustrates the distortion aberration at the second focusing state of the third embodiment.

Please refer to FIG. 10 which illustrates the third embodiment of the optical imaging lens 1 of the present invention. Please refer to FIG. 11A for the longitudinal spherical aberration on the image plane 4 at the first focusing state of the third embodiment; please refer to FIG. 11B for the field curvature aberration on the sagittal direction at the first focusing state; please refer to FIG. 11C for the field curvature aberration on the tangential direction at the first focusing state; and please refer to FIG. 11D for the distortion aberration at the first focusing state; please refer to FIG. 11E for the longitudinal spherical aberration on the image plane 4 at the second focusing state of the third embodiment; please refer to FIG. 11F for the field curvature aberration on the sagittal direction at the second focusing state; please refer to FIG. 11G for the field curvature aberration on the tangential direction at the second focusing state; and please refer to FIG. 11H for the distortion aberration at the second focusing state. The components in this embodiment are similar to those in the first embodiment, but the optical data such as the refracting power, the radius of curvature, the lens element thickness, the surface aspheric coefficients or the back focal length in this embodiment are different from the optical data in the first embodiment. Besides, in this embodiment, the second lens element 20 has negative refracting power, the periphery region 27 of the image-side surface 22 of the second lens element 20 is concave, the fourth lens element 40 has positive refracting power, the periphery region 44 of the object-side surface 41 of the fourth lens element 40 is convex, the periphery region 47 of the image-side surface 42 of the fourth lens element 40 is convex, the periphery region 54 of the object-side surface 51 of the fifth lens element 50 is concave and the optical axis region 56 of the image-side surface 52 of the fifth lens element 50 is concave.

The optical data of the third embodiment of the optical imaging lens are shown in FIG. 30 while the aspheric surface data are shown in FIG. 31. In this embodiment, EFL=13.827 mm, EFLA=9.266 mm, Fno=3.070 at the first focusing state, Fno=2.143 at the second focusing state, HFOV=14.132 degrees at the first focusing state, HFOV=13.823 degrees at the second focusing state, the focal length fG1 of the front lens group 81=8.221 mm, the focal length fG2 of the rear lens group 82=−9.306 mm, TTL=14.668 mm, ImgH=3.500 mm. In particular, Fno of the optical imaging lens at the second focusing state in this embodiment is better than that of the optical imaging lens at the second focusing state in the first embodiment, the longitudinal spherical aberration of the optical imaging lens at the first focusing state in this embodiment is better than that of the optical imaging lens at the first focusing state in the first embodiment, the field curvature aberration on the sagittal direction of the optical imaging lens at the first focusing state in this embodiment is better than that on the sagittal direction of the optical imaging lens at the first focusing state in the first embodiment, the field curvature aberration on the tangential direction of the optical imaging lens at the first focusing state in this embodiment is better than that on the tangential direction of the optical imaging lens at the first focusing state in the first embodiment, the distortion aberration of the optical imaging lens at the first focusing state in this embodiment is better than that of the optical imaging lens at the first focusing state in the first embodiment, the longitudinal spherical aberration of the optical imaging lens at the second focusing state in this embodiment is better than that of the optical imaging lens at the second focusing state in the first embodiment, the field curvature aberration on the sagittal direction of the optical imaging lens at the second focusing state in this embodiment is better than that on the sagittal direction of the optical imaging lens at the second focusing state in the first embodiment, and the field curvature aberration on the tangential direction of the optical imaging lens at the second focusing state in this embodiment is better than that on the tangential direction of the optical imaging lens at the second focusing state in the first embodiment.

Fourth Embodiment

Figure 12:
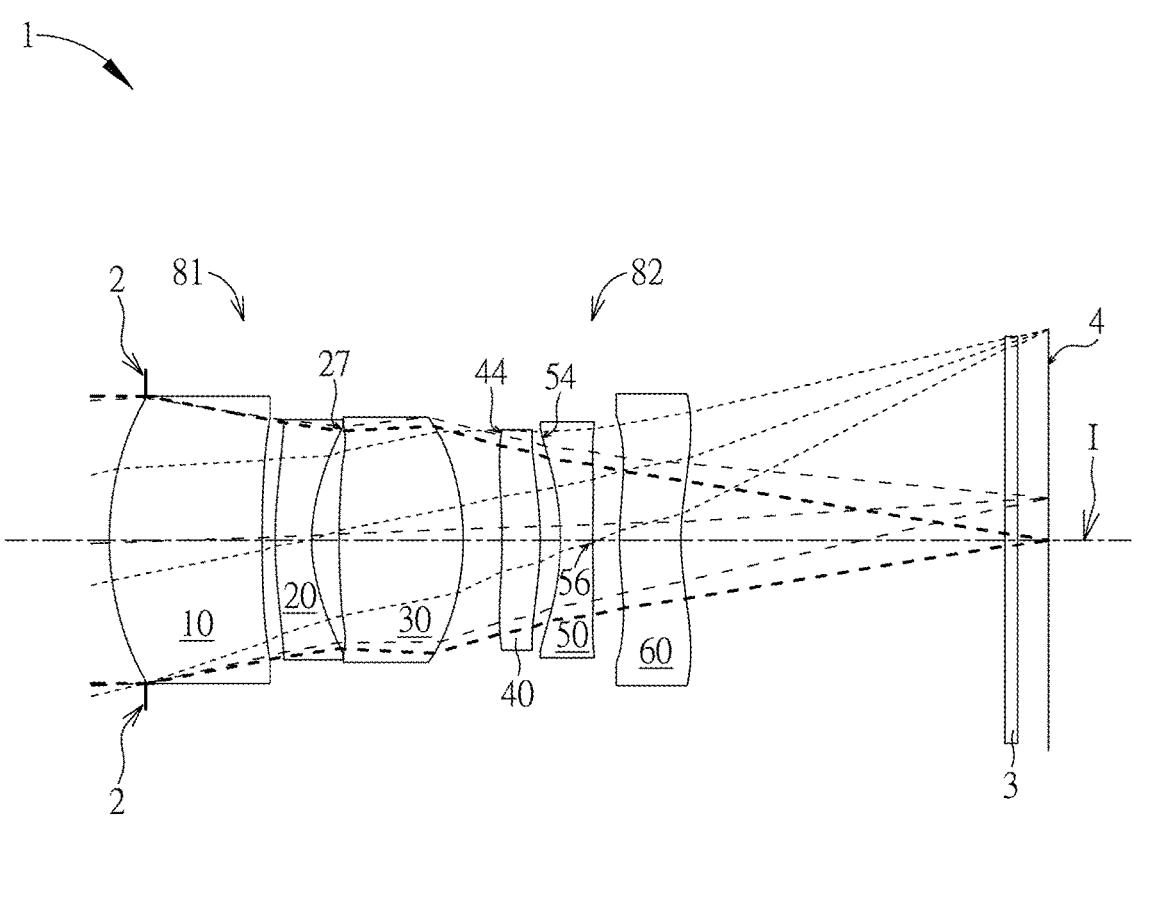
FIG. 12 illustrates a fourth embodiment of the optical imaging lens of the present invention.

Please refer to FIG. 12 which illustrates the fourth embodiment of the optical imaging lens 1 of the present invention. Please refer to FIG. 13A for the longitudinal spherical aberration on the image plane 4 at the first focusing state of the fourth embodiment; please refer to FIG. 13B for the field curvature aberration on the sagittal direction at the first focusing state; please refer to FIG. 13C for the field curvature aberration on the tangential direction at the first focusing state; and please refer to FIG. 13D for the distortion aberration at the first focusing state; please refer to FIG. 13E for the longitudinal spherical aberration on the image plane 4 at the second focusing state of the fourth embodiment; please refer to FIG. 13F for the field curvature aberration on the sagittal direction at the second focusing state; please refer to FIG. 13G for the field curvature aberration on the tangential direction at the second focusing state; and please refer to FIG. 13H for the distortion aberration at the second focusing state. The components in this embodiment are similar to those in the first embodiment, but the optical data such as the refracting power, the radius of curvature, the lens element thickness, the surface aspheric coefficients or the back focal length in this embodiment are different from the optical data in the first embodiment. Besides, in this embodiment, the second lens element 20 has negative refracting power, the periphery region 27 of the image-side surface 22 of the second lens element 20 is concave, the fourth lens element 40 has positive refracting power, the periphery region 44 of the object-side surface 41 of the fourth lens element 40 is convex, the periphery region 54 of the object-side surface 51 of the fifth lens element 50 is concave, the optical axis region 56 of the image-side surface 52 of the fifth lens element 50 is concave and the sixth lens element 60 has negative refracting power.

The optical data of the fourth embodiment of the optical imaging lens are shown in FIG. 32 while the aspheric surface data are shown in FIG. 33. In this embodiment, EFL=14.683 mm, EFLA=9.563 mm, Fno=3.070 at the first focusing state, Fno=2.025 at the second focusing state, HFOV=13.255 degrees at the first focusing state, HFOV=12.829 degrees at the second focusing state, the focal length fG1 of the front lens group 81=8.460 mm, the focal length fG2 of the rear lens group 82=−8.977 mm, TTL=14.890 mm, ImgH=3.500 mm. In particular, Fno of the optical imaging lens at the second focusing state in this embodiment is better than that of the optical imaging lens at the second focusing state in the first embodiment, the longitudinal spherical aberration of the optical imaging lens at the first focusing state in this embodiment is better than that of the optical imaging lens at the first focusing state in the first embodiment, the field curvature aberration on the sagittal direction of the optical imaging lens at the first focusing state in this embodiment is better than that on the sagittal direction of the optical imaging lens at the first focusing state in the first embodiment, the field curvature aberration on the tangential direction of the optical imaging lens at the first focusing state in this embodiment is better than that on the tangential direction of the optical imaging lens at the first focusing state in the first embodiment, the distortion aberration of the optical imaging lens at the first focusing state in this embodiment is better than that of the optical imaging lens at the first focusing state in the first embodiment, the longitudinal spherical aberration of the optical imaging lens at the second focusing state in this embodiment is better than that of the optical imaging lens at the second focusing state in the first embodiment, the field curvature aberration on the sagittal direction of the optical imaging lens at the second focusing state in this embodiment is better than that on the sagittal direction of the optical imaging lens at the second focusing state in the first embodiment, and the field curvature aberration on the tangential direction of the optical imaging lens at the second focusing state in this embodiment is better than that on the tangential direction of the optical imaging lens at the second focusing state in the first embodiment.

Fifth Embodiment

Figure 14:
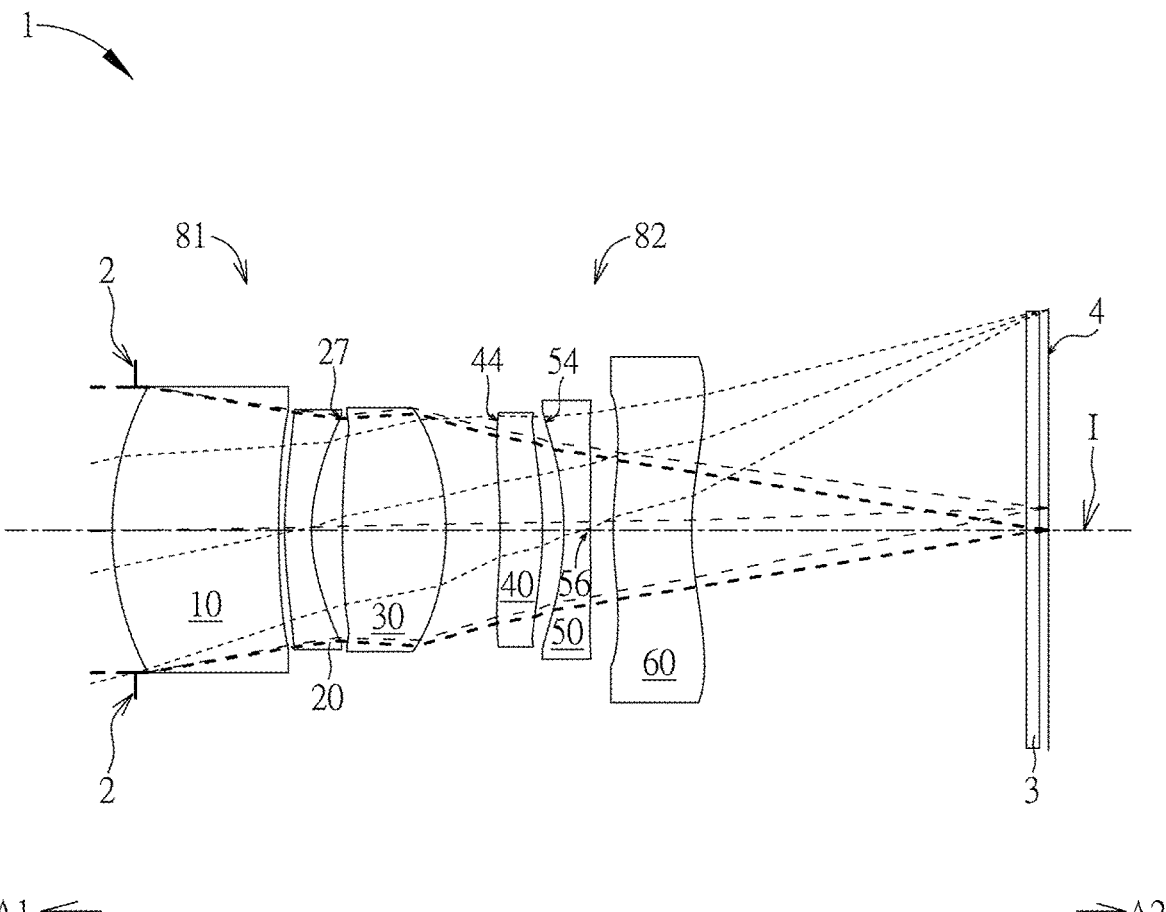
FIG. 14 illustrates a fifth embodiment of the optical imaging lens of the present invention.
Figures 15A, 15B, 15C, 15D:
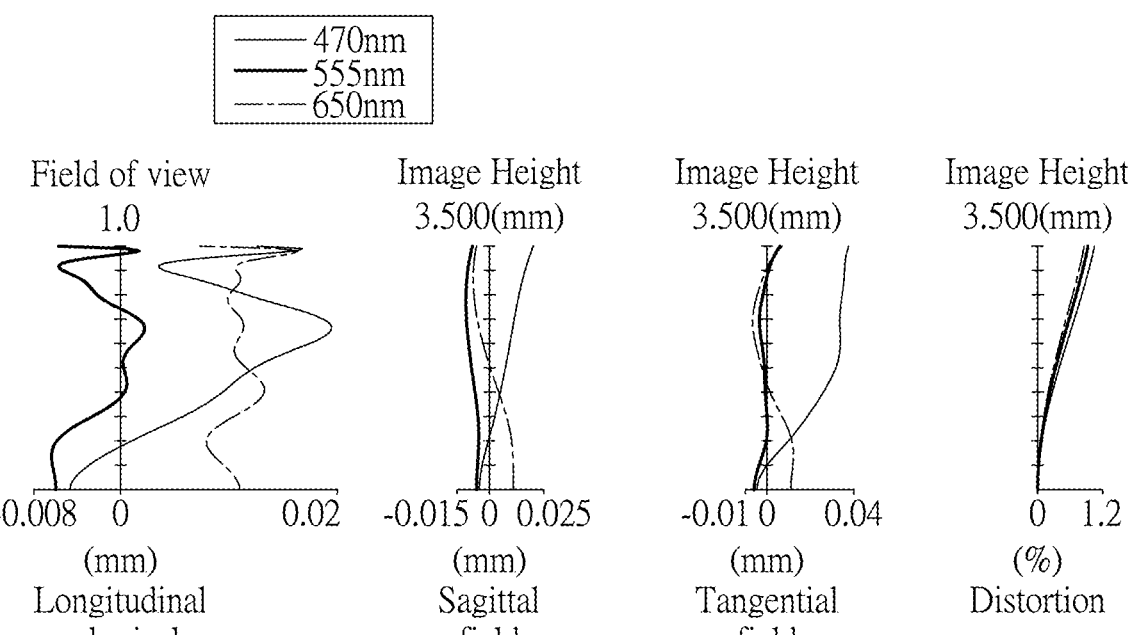
FIG. 15A illustrates the longitudinal spherical aberration on the image plane at the first focusing state of the fifth embodiment.
FIG. 15B illustrates the field curvature aberration on the sagittal direction at the first focusing state of the fifth embodiment.
FIG. 15C illustrates the field curvature aberration on the tangential direction at the first focusing state of the fifth embodiment.
FIG. 15D illustrates the distortion aberration at the first focusing state of the fifth embodiment.
Figures 15E, 15F, 15G, 15H:
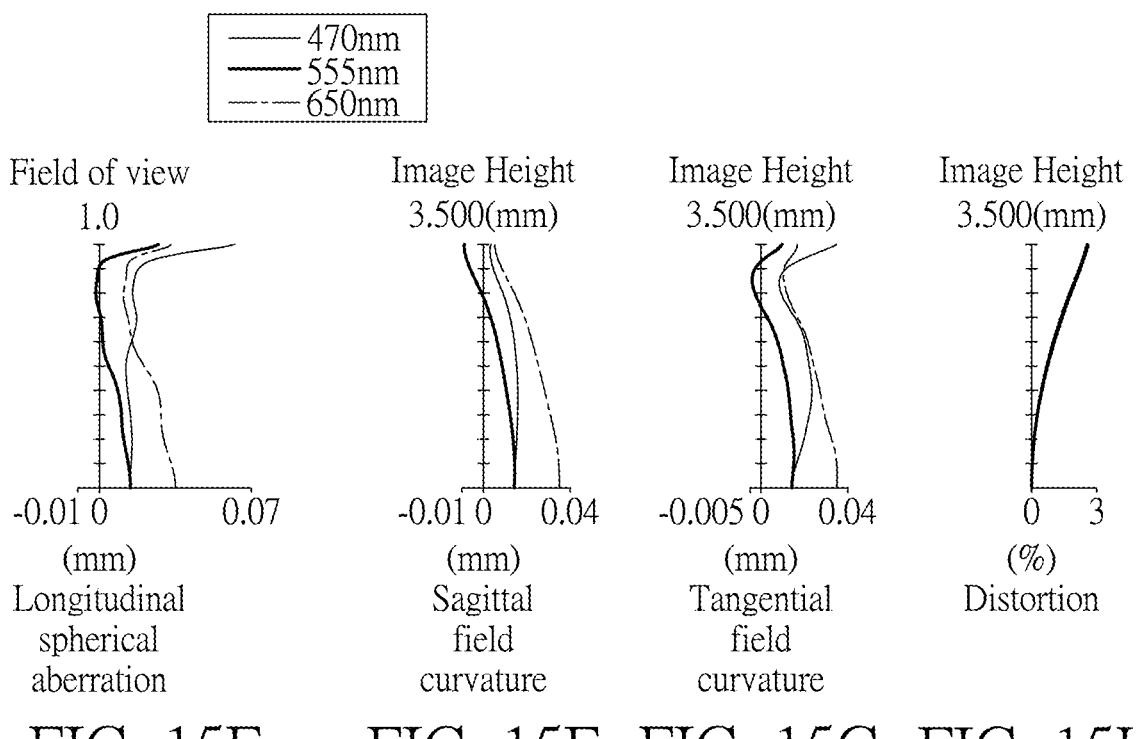
FIG. 15E illustrates the longitudinal spherical aberration on the image plane at the second focusing state of the fifth embodiment.
FIG. 15F illustrates the field curvature aberration on the sagittal direction at the second focusing state of the fifth embodiment.
FIG. 15G illustrates the field curvature aberration on the tangential direction at the second focusing state of the fifth embodiment.
FIG. 15H illustrates the distortion aberration at the second focusing state of the fifth embodiment.

Please refer to FIG. 14 which illustrates the fifth embodiment of the optical imaging lens 1 of the present invention. Please refer to FIG. 15A for the longitudinal spherical aberration on the image plane 4 at the first focusing state of the fifth embodiment; please refer to FIG. 15B for the field curvature aberration on the sagittal direction at the first focusing state; please refer to FIG. 15C for the field curvature aberration on the tangential direction at the first focusing state, please refer to FIG. 15D for the distortion aberration at the first focusing state, please refer to FIG. 15E for the longitudinal spherical aberration on the image plane 4 at the second focusing state of the fifth embodiment, please refer to FIG. 15F for the field curvature aberration on the sagittal direction at the second focusing state, please refer to FIG. 15G for the field curvature aberration on the tangential direction at the second focusing state, and please refer to FIG. 15H for the distortion aberration at the second focusing state. The components in this embodiment are similar to those in the first embodiment, but the optical data such as the refracting power, the radius of curvature, the lens element thickness, the surface aspheric coefficients or the back focal length in this embodiment are different from the optical data in the first embodiment. Besides, in this embodiment, the second lens element 20 has negative refracting power, the periphery region 27 of the image-side surface 22 of the second lens element 20 is concave, the fourth lens element 40 has positive refracting power, the periphery region 44 of the object-side surface 41 of the fourth lens element 40 is convex, the periphery region 54 of the object-side surface 51 of the fifth lens element 50 is concave, the optical axis region 56 of the image-side surface 52 of the fifth lens element 50 is concave and the sixth lens element 60 has negative refracting power.

The optical data of the fifth embodiment of the optical imaging lens are shown in FIG. 34 while the aspheric surface data are shown in FIG. 35. In this embodiment, EFL=13.936 mm, EFLA=9.071 mm, Fno=3.070 at the first focusing state, Fno=2.053 at the second focusing state, HFOV=13.965 degrees at the first focusing state, HFOV=13.688 degrees at the second focusing state, the focal length fG1 of the front lens group 81=8.380 mm, the focal length fG2 of the rear lens group 82=−9.187 mm, TTL=14.511 mm, ImgH=3.500 mm. In particular, Fno of the optical imaging lens at the second focusing state in this embodiment is better than that of the optical imaging lens at the second focusing state in the first embodiment, the longitudinal spherical aberration of the optical imaging lens at the first focusing state in this embodiment is better than that of the optical imaging lens at the first focusing state in the first embodiment, the field curvature aberration on the sagittal direction of the optical imaging lens at the first focusing state in this embodiment is better than that on the sagittal direction of the optical imaging lens at the first focusing state in the first embodiment, the field curvature aberration on the tangential direction of the optical imaging lens at the first focusing state in this embodiment is better than that on the tangential direction of the optical imaging lens at the first focusing state in the first embodiment, the distortion aberration of the optical imaging lens at the first focusing state in this embodiment is better than that of the optical imaging lens at the first focusing state in the first embodiment, the longitudinal spherical aberration of the optical imaging lens at the second focusing state in this embodiment is better than that of the optical imaging lens at the second focusing state in the first embodiment, the field curvature aberration on the sagittal direction of the optical imaging lens at the second focusing state in this embodiment is better than that on the sagittal direction of the optical imaging lens at the second focusing state in the first embodiment, and the field curvature aberration on the tangential direction of the optical imaging lens at the second focusing state in this embodiment is better than that on the tangential direction of the optical imaging lens at the second focusing state in the first embodiment.

Sixth Embodiment

Figure 16:
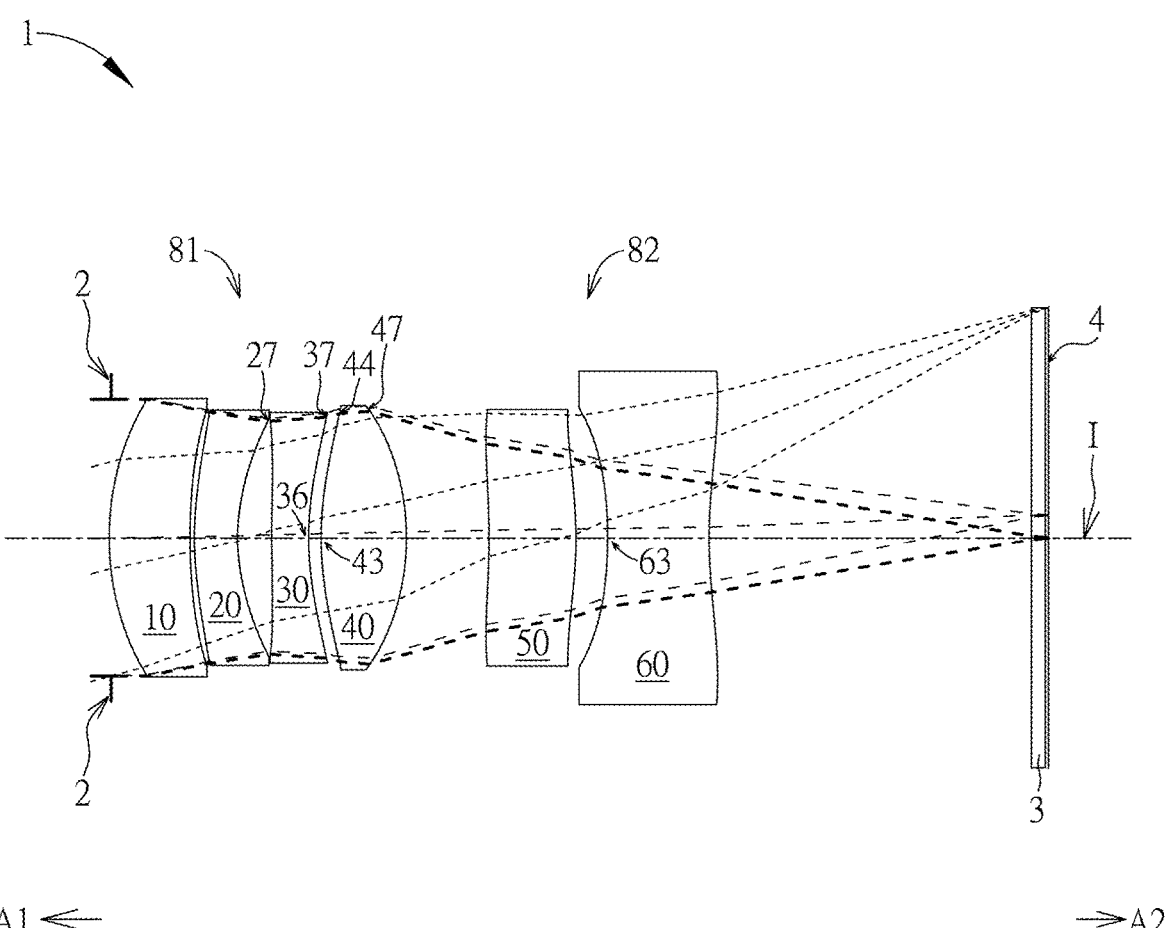
FIG. 16 illustrates a sixth embodiment of the optical imaging lens of the present invention.

Please refer to FIG. 16 which illustrates the sixth embodiment of the optical imaging lens 1 of the present invention. Please refer to FIG. 17A for the longitudinal spherical aberration on the image plane 4 at the first focusing state of the sixth embodiment, please refer to FIG. 17B for the field curvature aberration on the sagittal direction at the first focusing state, please refer to FIG. 17C for the field curvature aberration on the tangential direction at the first focusing state, please refer to FIG. 17D for the distortion aberration at the first focusing state, please refer to FIG. 17E for the longitudinal spherical aberration on the image plane 4 at the second focusing state of the sixth embodiment, please refer to FIG. 17F for the field curvature aberration on the sagittal direction at the second focusing state, please refer to FIG. 17G for the field curvature aberration on the tangential direction at the second focusing state, and please refer to FIG. 17H for the distortion aberration at the second focusing state. The components in this embodiment are similar to those in the first embodiment, but the optical data such as the refracting power, the radius of curvature, the lens element thickness, the surface aspheric coefficients or the back focal length in this embodiment are different from the optical data in the first embodiment. Besides, in this embodiment, the front lens group 81 includes the first lens element 10, the second lens element 20, the third lens element 30 and the fourth lens element 40, the rear lens group 82 includes the fifth lens element 50 and the sixth lens element 60, the second lens element 20 has negative refracting power, the periphery region 27 of the image-side surface 22 of the second lens element 20 is concave, the third lens element 30 has negative refracting power, the optical axis region 36 of the image-side surface 32 of the third lens element 30 is concave, the periphery region 37 of the image-side surface 32 of the third lens element 30 is concave, the fourth lens element 40 has positive refracting power, the optical axis region 43 of the object-side surface 41 of the fourth lens element 40 is convex, the periphery region 44 of the object-side surface 41 of the fourth lens element 40 is convex, the periphery region 47 of the image-side surface 42 of the fourth lens element 40 is convex, the fifth lens element 50 has positive refracting power, the sixth lens element 60 has negative refracting power and the optical axis region 63 of the object-side surface 61 of the sixth lens element 60 is concave.

The optical data of the sixth embodiment of the optical imaging lens are shown in FIG. 36 while the aspheric surface data are shown in FIG. 37. In this embodiment, EFL=12.910 mm, EFLA=8.696 mm, Fno=3.070 at the first focusing state, Fno=2.118 at the second focusing state, HFOV=15.167 degrees at the first focusing state, HFOV=15.198 degrees at the second focusing state, the focal length fG1 of the front lens group 81=7.735 mm, the focal length fG2 of the rear lens group 82=−8.328 mm, TTL=13.997 mm, ImgH=3.500 mm. In particular, Fno of the optical imaging lens at the second focusing state in this embodiment is better than that of the optical imaging lens at the second focusing state in the first embodiment, the longitudinal spherical aberration of the optical imaging lens at the first focusing state in this embodiment is better than that of the optical imaging lens at the first focusing state in the first embodiment, the field curvature aberration on the sagittal direction of the optical imaging lens at the first focusing state in this embodiment is better than that on the sagittal direction of the optical imaging lens at the first focusing state in the first embodiment, the field curvature aberration on the tangential direction of the optical imaging lens at the first focusing state in this embodiment is better than that on the tangential direction of the optical imaging lens at the first focusing state in the first embodiment, the distortion aberration of the optical imaging lens at the first focusing state in this embodiment is better than that of the optical imaging lens at the first focusing state in the first embodiment, the longitudinal spherical aberration of the optical imaging lens at the second focusing state in this embodiment is better than that of the optical imaging lens at the second focusing state in the first embodiment, the field curvature aberration on the sagittal direction of the optical imaging lens at the second focusing state in this embodiment is better than that on the sagittal direction of the optical imaging lens at the second focusing state in the first embodiment, the field curvature aberration on the tangential direction of the optical imaging lens at the second focusing state in this embodiment is better than that on the tangential direction of the optical imaging lens at the second focusing state in the first embodiment and the distortion aberration of the optical imaging lens at the second focusing state in this embodiment is better than that of the optical imaging lens at the second focusing state in the first embodiment.

Seventh Embodiment

Figure 18:
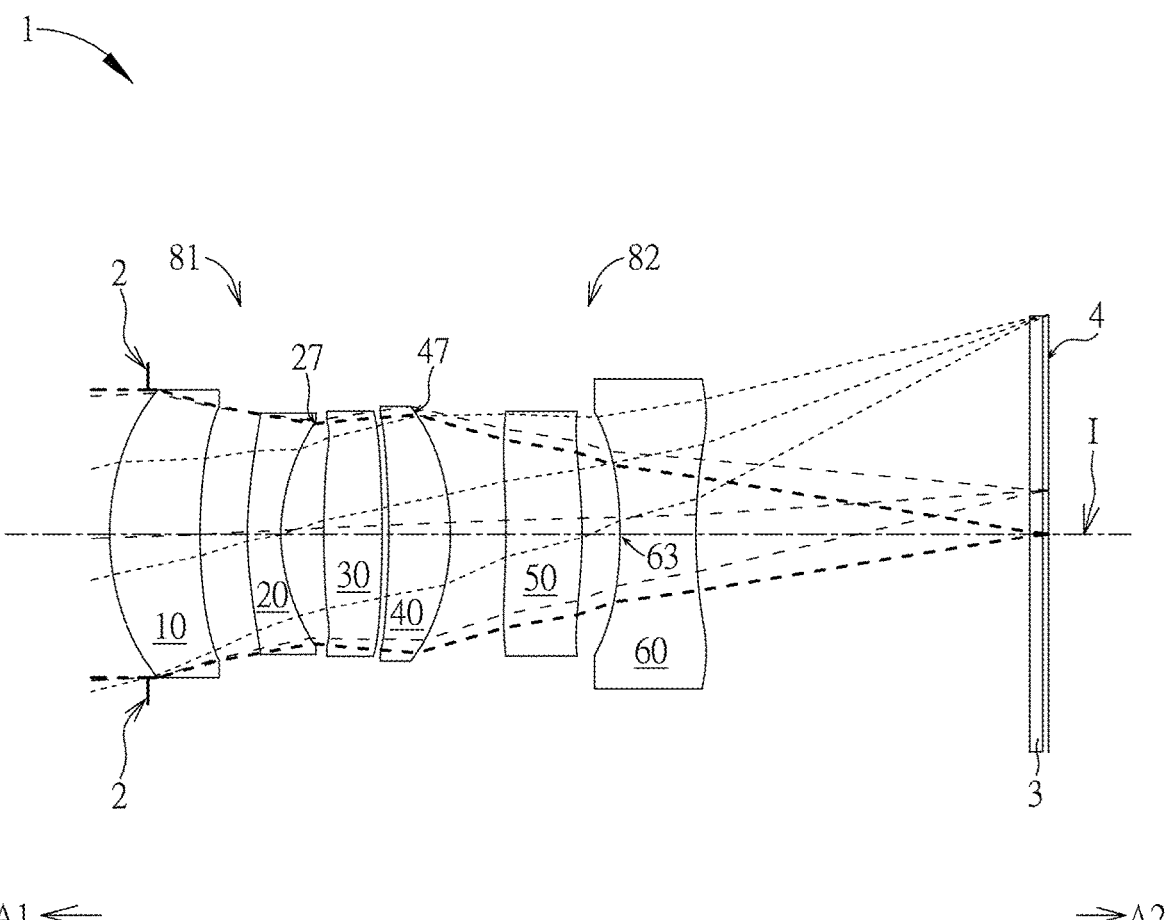
FIG. 18 illustrates a seventh embodiment of the optical imaging lens of the present invention.

Please refer to FIG. 18 which illustrates the seventh embodiment of the optical imaging lens 1 of the present invention. Please refer to FIG. 19A for the longitudinal spherical aberration on the image plane 4 at the first focusing state of the seventh embodiment, please refer to FIG. 19B for the field curvature aberration on the sagittal direction at the first focusing state, please refer to FIG. 19C for the field curvature aberration on the tangential direction at the first focusing state, please refer to FIG. 19D for the distortion aberration at the first focusing state, please refer to FIG. 19E for the longitudinal spherical aberration on the image plane 4 at the second focusing state of the seventh embodiment, please refer to FIG. 19F for the field curvature aberration on the sagittal direction at the second focusing state, please refer to FIG. 19G for the field curvature aberration on the tangential direction at the second focusing state, and please refer to FIG. 19H for the distortion aberration at the second focusing state. The components in this embodiment are similar to those in the first embodiment, but the optical data such as the refracting power, the radius of curvature, the lens element thickness, the surface aspheric coefficients or the back focal length in this embodiment are different from the optical data in the first embodiment. Besides, in this embodiment, the front lens group 81 includes the first lens element 10, the second lens element 20, the third lens element 30 and the fourth lens element 40, the rear lens group 82 includes the fifth lens element 50 and the sixth lens element 60, the second lens element 20 has negative refracting power, the periphery region 27 of the image-side surface 22 of the second lens element 20 is concave, the fourth lens element 40 has positive refracting power, the periphery region 47 of the image-side surface 42 of the fourth lens element 40 is convex, the fifth lens element 50 has positive refracting power, the sixth lens element 60 has negative refracting power and the optical axis region 63 of the object-side surface 61 of the sixth lens element 60 is concave.

The optical data of the seventh embodiment of the optical imaging lens are shown in FIG. 38 while the aspheric surface data are shown in FIG. 39. In this embodiment, EFL=14.138 mm, EFLA=9.052 mm, Fno=3.070 at the first focusing state, Fno=2.009 at the second focusing state, HFOV=13.811 degrees at the first focusing state, HFOV=13.831 degrees at the second focusing state, the focal length fG1 of the front lens group 81=8.369 mm, the focal length fG2 of the rear lens group 82=−8.544 mm, TTL=14.693 mm, ImgH=3.500 mm. In particular, Fno of the optical imaging lens at the second focusing state in this embodiment is better than that of the optical imaging lens at the second focusing state in the first embodiment, the longitudinal spherical aberration of the optical imaging lens at the first focusing state in this embodiment is better than that of the optical imaging lens at the first focusing state in the first embodiment, the field curvature aberration on the sagittal direction of the optical imaging lens at the first focusing state in this embodiment is better than that on the sagittal direction of the optical imaging lens at the first focusing state in the first embodiment, the field curvature aberration on the tangential direction of the optical imaging lens at the first focusing state in this embodiment is better than that on the tangential direction of the optical imaging lens at the first focusing state in the first embodiment, the distortion aberration of the optical imaging lens at the first focusing state in this embodiment is better than that of the optical imaging lens at the first focusing state in the first embodiment, the longitudinal spherical aberration of the optical imaging lens at the second focusing state in this embodiment is better than that of the optical imaging lens at the second focusing state in the first embodiment, the field curvature aberration on the sagittal direction of the optical imaging lens at the second focusing state in this embodiment is better than that on the sagittal direction of the optical imaging lens at the second focusing state in the first embodiment, and the field curvature aberration on the tangential direction of the optical imaging lens at the second focusing state in this embodiment is better than that on the tangential direction of the optical imaging lens at the second focusing state in the first embodiment.

Eighth Embodiment

Figure 20:
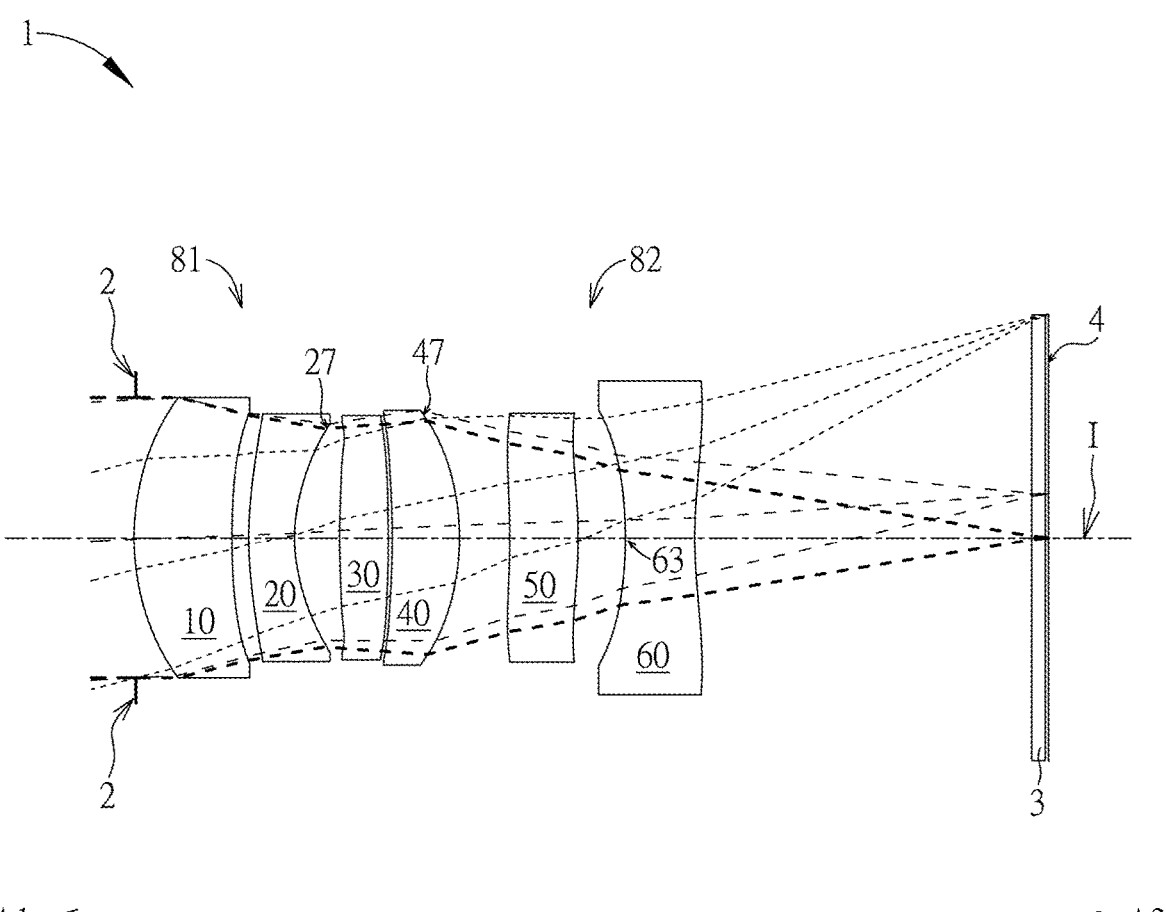
FIG. 20 illustrates an eighth embodiment of the optical imaging lens of the present invention.

Please refer to FIG. 20 which illustrates the eighth embodiment of the optical imaging lens 1 of the present invention. Please refer to FIG. 21A for the longitudinal spherical aberration on the image plane 4 at the first focusing state of the eighth embodiment; please refer to FIG. 21B for the field curvature aberration on the sagittal direction at the first focusing state, please refer to FIG. 21C for the field curvature aberration on the tangential direction at the first focusing state, please refer to FIG. 21D for the distortion aberration at the first focusing state, please refer to FIG. 21E for the longitudinal spherical aberration on the image plane 4 at the second focusing state of the eighth embodiment, please refer to FIG. 21F for the field curvature aberration on the sagittal direction at the second focusing state, please refer to FIG. 21G for the field curvature aberration on the tangential direction at the second focusing state, and please refer to FIG. 21H for the distortion aberration at the second focusing state. The components in this embodiment are similar to those in the first embodiment, but the optical data such as the refracting power, the radius of curvature, the lens element thickness, the surface aspheric coefficients or the back focal length in this embodiment are different from the optical data in the first embodiment. Besides, in this embodiment, the front lens group 81 includes the first lens element 10, the second lens element 20, the third lens element 30 and the fourth lens element 40, the rear lens group 82 includes the fifth lens element 50 and the sixth lens element 60, the second lens element 20 has negative refracting power, the periphery region 27 of the image-side surface 22 of the second lens element 20 is concave, the fourth lens element 40 has positive refracting power, the periphery region 47 of the image-side surface 42 of the fourth lens element 40 is convex, the fifth lens element 50 has positive refracting power, the sixth lens element 60 has negative refracting power and the optical axis region 63 of the object-side surface 61 of the sixth lens element 60 is concave.

The optical data of the eighth embodiment of the optical imaging lens are shown in FIG. 40 while the aspheric surface data are shown in FIG. 41. In this embodiment, EFL=13.496 mm, EFLA=8.844 mm, Fno=3.070 at the first focusing state, Fno=2.021 at the second focusing state, HFOV=14.396 degrees at the first focusing state, HFOV=14.464 degrees at the second focusing state, the focal length fG1 of the front lens group 81=8.134 mm, the focal length fG2 of the rear lens group 82=−8.712 mm, TTL=14.055 mm, ImgH=3.500 mm. In particular, Fno of the optical imaging lens at the second focusing state in this embodiment is better than that of the optical imaging lens at the second focusing state in the first embodiment, the longitudinal spherical aberration of the optical imaging lens at the first focusing state in this embodiment is better than that of the optical imaging lens at the first focusing state in the first embodiment, the field curvature aberration on the sagittal direction of the optical imaging lens at the first focusing state in this embodiment is better than that on the sagittal direction of the optical imaging lens at the first focusing state in the first embodiment, the field curvature aberration on the tangential direction of the optical imaging lens at the first focusing state in this embodiment is better than that on the tangential direction of the optical imaging lens at the first focusing state in the first embodiment, the distortion aberration of the optical imaging lens at the first focusing state in this embodiment is better than that of the optical imaging lens at the first focusing state in the first embodiment, the longitudinal spherical aberration of the optical imaging lens at the second focusing state in this embodiment is better than that of the optical imaging lens at the second focusing state in the first embodiment, the field curvature aberration on the sagittal direction of the optical imaging lens at the second focusing state in this embodiment is better than that on the sagittal direction of the optical imaging lens at the second focusing state in the first embodiment, and the field curvature aberration on the tangential direction of the optical imaging lens at the second focusing state in this embodiment is better than that on the tangential direction of the optical imaging lens at the second focusing state in the first embodiment.

Ninth Embodiment

Figure 22:
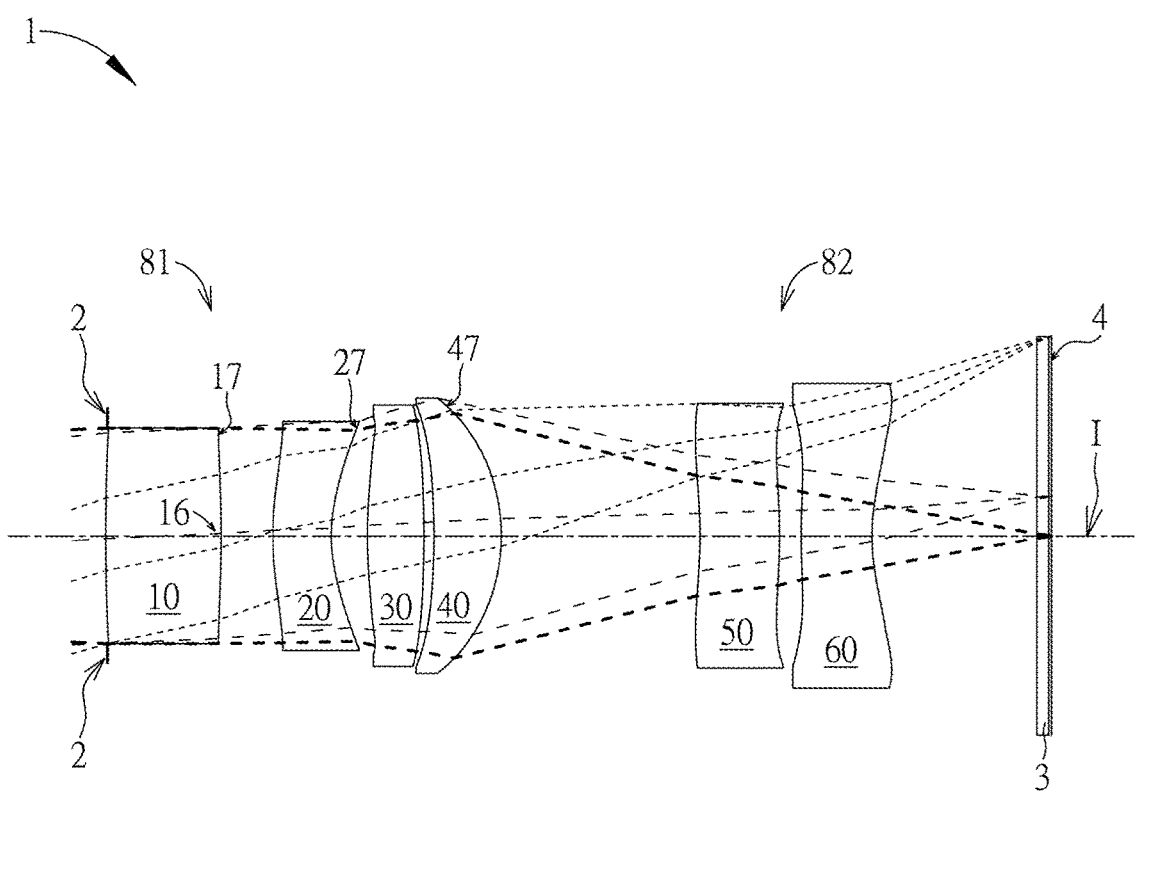
FIG. 22 illustrates a ninth embodiment of the optical imaging lens of the present invention.

Please refer to FIG. 22 which illustrates the ninth embodiment of the optical imaging lens 1 of the present invention. Please refer to FIG. 23A for the longitudinal spherical aberration on the image plane 4 at the first focusing state of the ninth embodiment, please refer to FIG. 23B for the field curvature aberration on the sagittal direction at the first focusing state, please refer to FIG. 23C for the field curvature aberration on the tangential direction at the first focusing state, please refer to FIG. 23D for the distortion aberration at the first focusing state, please refer to FIG. 23E for the longitudinal spherical aberration on the image plane 4 at the second focusing state of the ninth embodiment, please refer to FIG. 23F for the field curvature aberration on the sagittal direction at the second focusing state, please refer to FIG. 23G for the field curvature aberration on the tangential direction at the second focusing state, and please refer to FIG. 23H for the distortion aberration at the second focusing state. The components in this embodiment are similar to those in the first embodiment, but the optical data such as the refracting power, the radius of curvature, the lens element thickness, the surface aspheric coefficients or the back focal length in this embodiment are different from the optical data in the first embodiment. Besides, in this embodiment, the front lens group 81 includes the first lens element 10, the second lens element 20, the third lens element 30 and the fourth lens element 40, the rear lens group 82 includes the fifth lens element 50 and the sixth lens element 60, the optical axis region 16 of the first lens element 10 is convex, the periphery region 17 of the image-side surface 12 of the first lens element 10 is convex, the second lens element 20 has negative refracting power, the periphery region 27 of the image-side surface 22 of the second lens element 20 is concave, the fourth lens element 40 has positive refracting power, the periphery region 47 of the image-side surface 42 of the fourth lens element 40 is convex and the sixth lens element 60 has negative refracting power.

The optical data of the ninth embodiment of the optical imaging lens are shown in FIG. 42 while the aspheric surface data are shown in FIG. 43. In this embodiment, EFL=11.624 mm, EFLA=8.463 mm, Fno=3.070 at the first focusing state, Fno=2.235 at the second focusing state, HFOV=16.508 degrees at the first focusing state, HFOV=17.386 degrees at the second focusing state, the focal length fG1 of the front lens group 81=7.208 mm, the focal length fG2 of the rear lens group 82=−8.656 mm, TTL=16.330 mm, ImgH=3.500 mm. In particular, Fno of the optical imaging lens at the second focusing state in this embodiment is better than that of the optical imaging lens at the second focusing state in the first embodiment, the longitudinal spherical aberration of the optical imaging lens at the first focusing state in this embodiment is better than that of the optical imaging lens at the first focusing state in the first embodiment, the field curvature aberration on the sagittal direction of the optical imaging lens at the first focusing state in this embodiment is better than that of the optical imaging lens at the first focusing state in the first embodiment, the field curvature aberration on the tangential direction of the optical imaging lens at the first focusing state in this embodiment is better than that of the optical imaging lens at the first focusing state in the first embodiment, the distortion aberration of the optical imaging lens at the first focusing state in this embodiment is better than that of the optical imaging lens at the first focusing state in the first embodiment, the longitudinal spherical aberration of the optical imaging lens at the second focusing state in this embodiment is better than that of the optical imaging lens at the second focusing state in the first embodiment, the field curvature aberration on the sagittal direction of the optical imaging lens at the second focusing state in this embodiment is better than that of the optical imaging lens at the second focusing state in the first embodiment, and the field curvature aberration on the tangential direction of the optical imaging lens at the second focusing state in this embodiment is better than that of the optical imaging lens at the second focusing state in the first embodiment.

Tenth Embodiment

Figure 24:
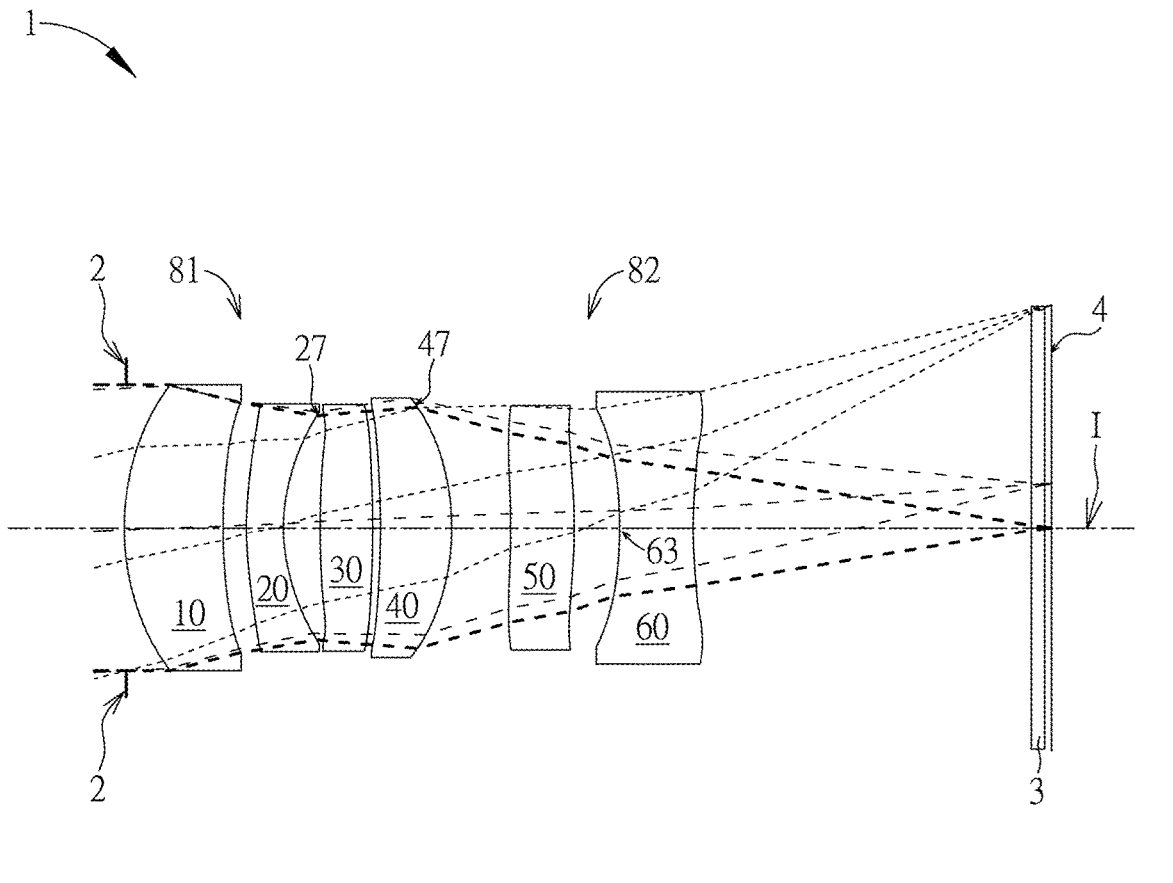
FIG. 24 illustrates a tenth embodiment of the optical imaging lens of the present invention.

Please refer to FIG. 24 which illustrates the tenth embodiment of the optical imaging lens 1 of the present invention. Please refer to FIG. 25A for the longitudinal spherical aberration on the image plane 4 at the first focusing state of the tenth embodiment, please refer to FIG. 25B for the field curvature aberration on the sagittal direction at the first focusing state, please refer to FIG. 25C for the field curvature aberration on the tangential direction at the first focusing state, please refer to FIG. 25D for the distortion aberration at the first focusing state, please refer to FIG. 25E for the longitudinal spherical aberration on the image plane 4 at the second focusing state of the tenth embodiment, please refer to FIG. 25F for the field curvature aberration on the sagittal direction at the second focusing state, please refer to FIG. 25G for the field curvature aberration on the tangential direction at the second focusing state, and please refer to FIG. 25H for the distortion aberration at the second focusing state. The components in this embodiment are similar to those in the first embodiment, but the optical data such as the refracting power, the radius of curvature, the lens element thickness, the surface aspheric coefficients or the back focal length in this embodiment are different from the optical data in the first embodiment. Besides, in this embodiment, the front lens group 81 includes the first lens element 10, the second lens element 20, the third lens element 30 and the fourth lens element 40, the rear lens group 82 includes the fifth lens element 50 and the sixth lens element 60, the second lens element 20 has negative refracting power, the periphery region 27 of the image-side surface 24 of the second lens element 20 is concave, the fourth lens element 40 has positive refracting power, the periphery region 47 of the image-side surface 42 of the fourth lens element 40 is convex, the fifth lens element 50 has positive refracting power, the sixth lens element 60 has negative refracting power and the optical axis region 63 of the object-side surface 61 of the sixth lens element 60 is concave.

The optical data of the tenth embodiment of the optical imaging lens are shown in FIG. 44 while the aspheric surface data are shown in FIG. 45. In this embodiment, EFL=13.809 mm, EFLA=8.963 mm, Fno=3.070 at the first focusing state, Fno=2.029 at the second focusing state, HFOV=14.083 degrees at the first focusing state, HFOV=14.128 degrees at the second focusing state, the focal length fG1 of the front lens group 81=8.235 mm, the focal length fG2 of the rear lens group 82=−8.649 mm, TTL=14.241 mm, ImgH=3.500 mm. In particular, Fno of the optical imaging lens at the second focusing state in this embodiment is better than that of the optical imaging lens at the second focusing state in the first embodiment, the longitudinal spherical aberration of the optical imaging lens at the first focusing state in this embodiment is better than that of the optical imaging lens at the first focusing state in the first embodiment, the field curvature aberration on the sagittal direction of the optical imaging lens at the first focusing state in this embodiment is better that of the optical imaging lens at the first focusing state in the first embodiment, the field curvature aberration on the tangential direction of the optical imaging lens at the first focusing state in this embodiment is better than that of the optical imaging lens at the first focusing state in the first embodiment, the distortion aberration of the optical imaging lens at the first focusing state in this embodiment is better than that of the optical imaging lens at the first focusing state in the first embodiment, the longitudinal spherical aberration of the optical imaging lens at the second focusing state in this embodiment is better than that of the optical imaging lens at the second focusing state in the first embodiment, the field curvature aberration on the sagittal direction of the optical imaging lens at the second focusing state in this embodiment is better than that of the optical imaging lens at the second focusing state in the first embodiment, and the field curvature aberration on the tangential direction of the optical imaging lens at the second focusing state in this embodiment is better that of the optical imaging lens at the second focusing state in the first embodiment.

Some important ratios in each embodiment at the first focusing state or at the second focusing state are shown in FIG. 46, in FIG. 47, in FIG. 48, and in FIG. 49.

Each embodiment of the present invention provides an optical imaging lens of six lens elements which is light, thin, short and small in size, has excellent imaging quality, has good optical performance, has an infinite object distance, is capable of macro focusing and is technically possible. For example, the satisfaction of the design of the following lens surface shape or refracting power configuration or parameters may effectively optimize the imaging quality of the optical imaging lens 1. Furthermore, or to realize the corresponding advantageous efficacy:

1. When the first lens element 10 has positive refracting power, it is able to effectively converge the incident rays coming from different angles. If it is further to go with that the periphery region 57 of the image-side surface 52 of the fifth lens element 50 is concave, the optical axis region 66 of the image-side surface 62 of the sixth lens element 60 is concave and the periphery region 67 of the image-side surface 62 of the sixth lens element 60 is convex, it is advantageous to improve the marginal aberration on the image plane 4. When the object is moved from the infinite distance to the macro focusing state or moved from the macro focusing state to the infinite distance, the optical imaging lens 1 may form a first focusing state and a second focusing state to fulfill the purpose of focus adjustment. If the effective focal length of the two focusing states satisfies the ratio limitation of $(TTL*\Delta HFOV)/\Delta G \leq 19.500$ degrees, it is able to maintain good imaging quality while focusing in addition to keeping the volume of the optical imaging lens 1. Wherein, the preferable range of $(TTL*\Delta HFOV)/\Delta G$ is 0.100 degrees $\leq (TTL*\Delta HFOV)/\Delta G \leq 19.500$ degrees.

2. When the first lens element 10 has positive refracting power to go with that the optical axis region 23 of the object-side surface 21 of the second lens element 20 is convex or the periphery region 24 of the object-side surface 21 of the second lens element 20 is convex, it is able to effectively converge the incident rays coming from different angles. The further design with that the optical axis region 53 of the object-side surface 51 of the fifth lens element 50 is concave, the periphery region 57 of the image-side surface 52 of the fifth lens element 50 is concave and the periphery region 67 of the image-side surface 62 of the sixth lens element 60 is convex, the combinations of the surface shapes are advantageous to improve the marginal aberration on the image plane 4. When the object is moved from the infinite distance to the macro focusing state or moved from the macro focusing state to the infinite distance, the optical imaging lens 1 may form the first focusing state and the second focusing state by moving the rear lens group 82 along the optical axis I to fulfill the purpose of focus adjustment. If the effective focal length of the two focusing states satisfies the ratio limitation of $(TTL*\Delta HFOV)/\Delta G \leq 19.500$ degrees, it is able to maintain good imaging quality while focusing in addition to keeping the volume of the optical imaging lens 1.

3. When the first lens element 10 has positive refracting power, it is able to effectively converge the incident rays coming from different angles. To go with that the optical axis region 66 of the image-side surface 62 of the sixth lens element 60 is concave and the periphery region 67 of the image-side surface 62 of the sixth lens element 60 is convex, it is able to effectively improve the aberration. When the object is moved from the infinite distance to the macro focusing state or moved from the macro focusing state to the infinite distance, the optical imaging lens 1 may form the first focusing state and the second focusing state by moving the rear lens group 82 along the optical axis I to fulfill the purpose of focus adjustment. If the effective focal length of the two focusing states satisfies the ratio limitation of $EFL/EFLA \geq 1.300$, it is able to maintain good imaging quality while focusing in addition to controlling the volume of the optical imaging lens 1. If it further satisfies one of that (a) the third lens element 30 has positive refracting power, or (b) the optical axis region 36 of the image-side surface 32 of the third lens element 30 is convex, or (c) the periphery region 57 of the image-side surface 52 of the fifth lens element 50 is concave, it is more advantageous to focus the imaging rays to help keep the TTL of the optical imaging lens 1 while to maintain good imaging quality.

4. When the second lens element 20 has negative refracting power, it is able to correct the distortion aberration and the longitudinal spherical aberration which are caused by the first lens element 10. To go with that the optical axis region 66 of the image-side surface 62 of the sixth lens element 60 is concave and the periphery region 67 of the image-side surface 62 of the sixth lens element 60 is convex, it effectively improves the marginal aberration on the image plane 4. When the object is moved from the infinite distance to the macro focusing state or moved from the macro focusing state to the infinite distance, the optical imaging lens 1 may form the first focusing state and the second focusing state by moving the rear lens group 82 along the optical axis I to fulfill the purpose of focus adjustment. If the effective focal length of the two focusing states satisfies the ratio limitation of $EFL/EFLA \geq 1.300$, it is able to maintain good imaging quality while focusing in addition to controlling the volume of the optical imaging lens 1.

5. In addition to 1. to 4., if the optical imaging lens 1 has the front lens group 81 with positive refracting power and the rear lens group 82 with negative refracting power, objects of different object distances may have good imaging quality by converging the imaging rays by the front lens group 81 to go with the rear lens group 82 of negative refracting power to move along the optical axis I. The optical imaging lens 1 fulfills the purpose of focusing while maintaining a fixed volume by moving the rear lens group 82 along the optical axis I.

6. The optical imaging lens 1 correspondingly forms the first focusing state and the second focusing state to have an effective focused image and good imaging quality when the object is moved from the infinite distance to a distance 40 mm to 55 mm in front of the optical imaging lens 1.

7. When the materials of the lens elements satisfy the following limitations, the chromatic aberration and spherical aberration generated during the focusing process at different object distances may be effectively suppressed to facilitate that the optical imaging lens 1 has overall good resolution.
$(\upsilon 4 + \upsilon 5)/\upsilon 6 \leq 1.700$, and the preferable range is $1.300 \leq (\upsilon 4 + \upsilon 5)/\upsilon 6 \leq 1.700$.

8. When the first focusing state and the second focusing state of the optical imaging lens 1 satisfy the following ratio limitation, it may ensure the optical imaging lens 1 to maintain good imaging quality in both focusing states:

EFL/EFLA≥1.300, and the preferable range is 1.300≤EFL/EFLA≤1.700.

9. To ensure imaging quality, reduce the lens volume and take the assembly fabrication into consideration, the lens thickness and the air gaps should be properly reduced or kept in a certain range. The embodiments of the present invention may have better arrangements when the numerical limitations of the following conditions are satisfied:

TTL/(AAG+BFL)≤1.900, and the preferable range is 1.500≤TTL/(AAG+BFL)≤1.900;

(T1+G12+T2)/T6≤3.300, and the preferable range is 0.700≤(T1+G12+T2)/T6≤3.300;

ALT/(G34+T4)≤5.800, and the preferable range is 1.400≤ALT/(G34+T4)≤5.800;

AAG/(T3+T5)≤3.000, and the preferable range is 0.600≤AAG/(T3+T5)≤3.000;

(T2+G23+T3)/G5637.000, and the preferable range is 2.500≤(T2+G23+T3)/G5637.000;

T6/Tmin≤3.000, and the preferable range is 1.200≤T6/Tmin≤4.000;

TTL/(T2+G23)≥10.000, and the preferable range is 9.700≤TTL/(T2+G23)≤17.000;

(G34+T4+G45)/T6≤4.300, and the preferable range is 1.000≤(G34+T4+G45)/T634.300;

TL/(G23+T4)≥5.000, and the preferable range is 5.000≤TL/(G23+T4)≤12.500;

AAG/T223.500, and the preferable range is 3.500≤AAG/T2≤13.000;

T1/(G12+G23)≥1.000, and the preferable range is 1.000≤T1/(G12+G23)≤4.800;

TTL/BFL≤5.500, and the preferable range is 2.200≤TTL/BFL≤5.500;

T6/G56≤3.400, and the preferable range is 1.300≤T6/G56≤3.400;

EFL/(T2+G23) 27.000, and the preferable range is 5.000≤EFL/(T2+G23)≤16.500;

ALT/Tmin≤17.000, and the preferable range is 7.200≤ALT/Tmin≤17.000;

(T3+T4)/(G23+T5)≥1.000, and the preferable range is 1.000≤(T3+T4)/(G23+T5)≤3.500;

TTL/ALT≤2.800, and the preferable range is 1.800≤TTL/ALT≤2.800;

TTL/Tavg≤15.000, and the preferable range is 11.000≤TTL/Tavg≤15.000;

TL/(Tmax+Tmin)≤7.500, and the preferable range is 3.800≤TL/(Tmax+Tmin)≤7.500;

BFL/Tmax≤4.000, and the preferable range is 1.000≤BFL/Tmax≤4.000.

Any arbitrary combination of the parameters of the embodiments can be selected additionally to increase the lens limitation so as to facilitate the design of the same structure of the present invention.

In the light of the unpredictability of the optical imaging lens, the satisfactions of above conditional formulas suggest that the optical imaging lens which has improved imaging quality, a reduced volume or better assembly yield under the configurations of the present invention to improve the drawbacks of prior art. The use of plastic material for the lens elements of the embodiments of the present invention may further reduce the weight of the lens and save the cost.

The ranges including a maximum value or a minimum value of the combinations or ratio relationships of the aforementioned optical parameters in the embodiments of the present invention are all implementable and all belong to the scope disclosed by the invention.

The contents in the embodiments of the invention include but are not limited to a focal length, a thickness of a lens element, an Abbe number, or other optical parameters. For example, in the embodiments of the invention, an optical parameter A and an optical parameter B are disclosed, wherein the ranges of the optical parameters, comparative relation between the optical parameters, and the range of a conditional expression covered by a plurality of embodiments are specifically explained as follows:

(1) The ranges of the optical parameters are, for example, $\alpha2 \leq A \leq \alpha1$ or $\beta2 \leq B \leq \beta1$, where $\alpha1$ is a maximum value of the optical parameter A among the plurality of embodiments, $\alpha2$ is a minimum value of the optical parameter A among the plurality of embodiments, $\beta1$ is a maximum value of the optical parameter B among the plurality of embodiments, and $\beta2$ is a minimum value of the optical parameter B among the plurality of embodiments.

(2) The comparative relation between the optical parameters is that A is greater than B or A is less than B, for example.

(3) The range of a conditional expression covered by a plurality of embodiments is in detail a combination relation or proportional relation obtained by a possible operation of a plurality of optical parameters in each same embodiment. The relation is defined as E, and E is, for example, A+B or A–B or A/B or A*B or (A*B) ½, and E satisfies a conditional expression $E \leq \gamma1$ or $E \geq \gamma2$ or $\gamma2 \leq E \leq \gamma1$, where each of $\gamma1$ and $\gamma2$ is a value obtained by an operation of the optical parameter A and the optical parameter B in a same embodiment, $\gamma1$ is a maximum value among the plurality of the embodiments, and $\gamma2$ is a minimum value among the plurality of the embodiments.

The ranges of the aforementioned optical parameters, the aforementioned comparative relations between the optical parameters, and a maximum value, a minimum value, and the numerical range between the maximum value and the minimum value of the aforementioned conditional expressions are all implementable and all belong to the scope disclosed by the invention. The aforementioned description is for exemplary explanation, but the invention is not limited thereto.

The embodiments of the invention are all implementable. In addition, a combination of partial features in a same embodiment can be selected, and the combination of partial features can achieve the unexpected result of the invention with respect to the prior art. The combination of partial features includes but is not limited to the surface shape of a lens element, a refracting power, a conditional expression or the like, or a combination thereof. The description of the embodiments is for explaining the specific embodiments of the principles of the invention, but the invention is not limited thereto. Specifically, the embodiments and the drawings are for exemplifying, but the invention is not limited thereto.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical imaging lens, from an object side to an image side in order along an optical axis comprising: a first lens element, a second lens element, a third lens element, a fourth lens element, a fifth lens element and a sixth lens element, the first lens element to the sixth lens element each having an object-side surface facing toward the object side and allowing imaging rays to pass through as well as an image-side surface facing toward the image side and allowing the imaging rays to pass through, wherein the optical imaging lens correspondingly forms a first focusing state and a second focusing state when an object moves from an infinite distance to a close distance, wherein:

when a surface of a lens element has at least one transition point, a line tangent to the transition point is perpendicular to the optical axis, a region located radially outside of a farthest transition point from the optical axis to an optical boundary is defined as a periphery region; when the surface of the lens element has no transition point, the periphery region is defined as a region of 50%-100% of a distance between the optical axis and the optical boundary of the surface of the lens element;

the first lens element has positive refracting power;

a periphery region of the image-side surface of a fifth lens element is concave; and an optical axis region of the image-side surface of the sixth lens element is concave, and a periphery region of the image-side surface of the sixth lens element is convex;

wherein lens elements included by the optical imaging lens are only six lens elements, TTL is a distance from the object-side surface of the first lens element to an image plane along the optical axis, ΔHFOV is an absolute value of a difference of a half field of view of the optical imaging lens between the first focusing state and the second focusing state, and ΔG is an absolute value of a difference of a sum of five air gaps of the optical imaging lens between the first focusing state and the second focusing state to satisfy 0.100 degrees≤TTL*ΔHFOV/ΔG≤19.500 degrees.

2. The optical imaging lens of claim 1, wherein AAG is a sum of five air gaps from the first lens element to the sixth lens element along the optical axis, and BFL is a distance from the image-side surface of the sixth lens element to the image plane along the optical axis, and the optical imaging lens satisfies the relationship: TTL/(AAG+BFL)≤1.900.

3. The optical imaging lens of claim 1, wherein T1 is a thickness of the first lens element along the optical axis, T2 is a thickness of the second lens element along the optical axis, T6 is a thickness of the sixth lens element along the optical axis and G12 is an air gap between the first lens element and the second lens element along the optical axis, and the optical imaging lens satisfies the relationship: (T1+G12+T2)/T6≤3.300.

4. The optical imaging lens of claim 1, wherein ALT is a sum of thicknesses of all the six lens elements along the optical axis, T4 is a thickness of the fourth lens element along the optical axis, and G34 is an air gap between the third lens element and the fourth lens element along the optical axis, and the optical imaging lens satisfies the relationship: ALT/(G34+T4)≤5.800.

5. The optical imaging lens of claim 1, wherein AAG is a sum of five air gaps from the first lens element to the sixth lens element along the optical axis, T3 is a thickness of the third lens element along the optical axis, and T5 is a thickness of the fifth lens element along the optical axis, and the optical imaging lens satisfies the relationship: AAG/(T3+T5)≤3.000.

6. The optical imaging lens of claim 1, wherein T2 is a thickness of the second lens element along the optical axis, T3 is a thickness of the third lens element along the optical axis, G23 is an air gap between the second lens element and the third lens element along the optical axis, and G56 is an air gap between the fifth lens element and the sixth lens element along the optical axis, and the optical imaging lens satisfies the relationship: (T2+G23+T3)/G56≤7.000.

7. The optical imaging lens of claim 1, wherein T6 is a thickness of the sixth lens element along the optical axis, and Tmin is a minimal lens element thickness among the first lens element and the sixth lens element along the optical axis, and the optical imaging lens satisfies the relationship: T6/Tmin≤3.000.

8. An optical imaging lens, from an object side to an image side in order along an optical axis comprising: a first lens element, a second lens element, a third lens element, a fourth lens element, a fifth lens element and a sixth lens element, the first lens element to the sixth lens element each having an object-side surface facing toward the object side and allowing imaging rays to pass through as well as an image-side surface facing toward the image side and allowing the imaging rays to pass through, wherein the optical imaging lens correspondingly forms a first focusing state and a second focusing state when an object moves from an infinite distance to a close distance, wherein:

when a surface of a lens element has at least one transition point, a line tangent to the transition point is perpendicular to the optical axis, a region located radially outside of a farthest transition point from the optical axis to an optical boundary is defined as a periphery region; when the surface of the lens element has no transition point, the periphery region is defined as a region of 50%-100% of a distance between the optical axis and the optical boundary of the surface of the lens element;

the first lens element has positive refracting power;

an optical axis region of the object-side surface of the second lens element is convex;

an optical axis region of the object-side surface of the fifth lens element is concave and a periphery region of the image-side surface of a fifth lens element is concave; and a periphery region of the image-side surface of the sixth lens element is convex; wherein lens elements included by the optical imaging lens are only six lens elements, TTL is a distance from the object-side surface of the first lens element to an image plane along the optical axis, ΔHFOV is an absolute value of a difference of a half field of view of the optical imaging lens between the first focusing state and the second focusing state, and ΔG is an absolute value of a difference of a sum of five air gaps of the optical imaging lens between the first focusing state and the second focusing state to satisfy 0.100 degrees≤TTL*ΔHFOV/ΔG≤19.500 degrees.

9. The optical imaging lens of claim 8, wherein T2 is a thickness of the second lens element along the optical axis, and G23 is an air gap between the second lens element and the third lens element along the optical axis, and the optical imaging lens satisfies the relationship: TTL/(T2+G23)≥10.000.

10. The optical imaging lens of claim 8, wherein T4 is a thickness of the fourth lens element along the optical axis, T6 is a thickness of the sixth lens element along the optical axis, G34 is an air gap between the third lens element and the fourth lens element along the optical axis, and G45 is an air gap between the fourth lens element and the fifth lens element along the optical axis, and the optical imaging lens satisfies the relationship: (G34+T4+G45)/T6≤4.300.

11. The optical imaging lens of claim 8, wherein TL is a distance from the object-side surface of the first lens element to the image-side surface of the sixth lens element along the optical axis, T4 is a thickness of the fourth lens element along the optical axis, and G23 is an air gap between the second lens element and the third lens element along the optical axis, and the optical imaging lens satisfies the relationship: TL/(G23+T4)≥5.000.

12. The optical imaging lens of claim 8, wherein AAG is a sum of five air gaps from the first lens element to the sixth lens element along the optical axis, and T2 is a thickness of the second lens element along the optical axis, and the optical imaging lens satisfies the relationship: AAG/T2≥3.500.

13. The optical imaging lens of claim 8, wherein T1 is a thickness of the first lens element along the optical axis, G12 is an air gap between the first lens element and the second lens element along the optical axis, and G23 is an air gap between the second lens element and the third lens element along the optical axis, and the optical imaging lens satisfies the relationship: T1/(G12+G23)≥1.000.

14. The optical imaging lens of claim 8, wherein υ4 is an Abbe number of the fourth lens element, υ5 is an Abbe number of the fifth lens element and υ6 is an Abbe number of the sixth lens element, and the optical imaging lens satisfies the relationship: (υ4+υ5)/υ6≤1.700.

15. An optical imaging lens, from an object side to an image side in order along an optical axis comprising: a first lens element, a second lens element, a third lens element, a fourth lens element, a fifth lens element and a sixth lens element, the first lens element to the sixth lens element each having an object-side surface facing toward the object side and allowing imaging rays to pass through as well as an image-side surface facing toward the image side and allowing the imaging rays to pass through, wherein the optical imaging lens correspondingly forms a first focusing state and a second focusing state when an object moves from an infinite distance to a close distance, wherein:

when a surface of a lens element has at least one transition point, a line tangent to the transition point is perpendicular to the optical axis, a region located radially outside of a farthest transition point from the optical axis to an optical boundary is defined as a periphery region; when the surface of the lens element has no transition point, the periphery region is defined as a region of 50%-100% of a distance between the optical axis and the optical boundary of the surface of the lens element;

the first lens element has positive refracting power;

a periphery region of the object-side surface of the second lens element is convex;

an optical axis region of the object-side surface of the fifth lens element is concave and a periphery region of the image-side surface of a fifth lens element is concave; and a periphery region of the image-side surface of the sixth lens element is convex; wherein lens elements included by the optical imaging lens are only six lens elements, TTL is a distance from the object-side surface of the first lens element to an image plane along the optical axis, ΔHFOV is an absolute value of a difference of a half field of view of the optical imaging lens between the first focusing state and the second focusing state, and ΔG is an absolute value of a difference of a sum of five air gaps of the optical imaging lens between the first focusing state and the second focusing state to satisfy 0.100 degrees≤TTL*ΔHFOV/ΔG≤19.500 degrees.

16. The optical imaging lens of claim 15, wherein BFL is a distance from the image-side surface of the sixth lens element to the image plane along the optical axis, and the optical imaging lens satisfies the relationship: TTL/BFL≤5.500.

17. The optical imaging lens of claim 15, wherein T6 is a thickness of the sixth lens element along the optical axis, and G56 is an air gap between the fifth lens element and the sixth lens element along the optical axis, and the optical imaging lens satisfies the relationship: T6/G56≤3.400.

18. The optical imaging lens of claim 15, wherein EFL is an effective focal length of the first focusing state, T2 is a thickness of the second lens element along the optical axis, and G23 is an air gap between the second lens element and the third lens element along the optical axis, and the optical imaging lens satisfies the relationship: EFL/(T2+G23)≥7.000.

19. The optical imaging lens of claim 15, wherein ALT is a sum of thicknesses of all the six lens elements along the optical axis, and Tmin is a minimal lens element thickness among the first lens element and the sixth lens element along the optical axis, and the optical imaging lens satisfies the relationship: ALT/Tmin≤17.000.

20. The optical imaging lens of claim 15, wherein T3 is a thickness of the third lens element along the optical axis, T4 is a thickness of the fourth lens element along the optical axis, T5 is a thickness of the fifth lens element along the optical axis, and G23 is an air gap between the second lens element and the third lens element along the optical axis, and the optical imaging lens satisfies the relationship: (T3+T4)/(G23+T5)≥1.000.

* * * * *